(12) United States Patent
Yamada

(10) Patent No.: US 7,903,896 B2
(45) Date of Patent: Mar. 8, 2011

(54) IMAGE PROCESSING METHOD, IMAGE PROCESSING APPARATUS AND COMPUTER-READABLE MEDIUM FOR CORRECTING AN IMAGE

(75) Inventor: Rui Yamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 1054 days.

(21) Appl. No.: 10/570,302

(22) PCT Filed: Aug. 10, 2004

(86) PCT No.: PCT/JP2004/011477
§ 371 (c)(1),
(2), (4) Date: Nov. 15, 2006

(87) PCT Pub. No.: WO2005/025235
PCT Pub. Date: Mar. 17, 2005

(65) Prior Publication Data
US 2007/0165960 A1      Jul. 19, 2007

(30) Foreign Application Priority Data

Sep. 4, 2003  (JP) ................................ 2003-312630
Feb. 6, 2004  (JP) ................................ 2004-030527

(51) Int. Cl.
*G06K 9/40* (2006.01)
*H04N 9/73* (2006.01)
*G06K 9/00* (2006.01)

(52) U.S. Cl. ...................................... 382/254; 348/223.1

(58) Field of Classification Search .................. 382/164, 382/167, 173, 197, 209, 218–220, 254, 260–264, 382/274–275, 284, 293, 299; 348/223.1, 348/416.1, 584, 699, E13.014–E13.065; 375/240.16, E7.105; 358/540
See application file for complete search history.

(56) References Cited

U.S. PATENT DOCUMENTS
5,617,490 A * 4/1997 Kume et al. ................... 382/275
(Continued)

FOREIGN PATENT DOCUMENTS
EP        1 558 025 A2   1/2005
(Continued)

OTHER PUBLICATIONS

Supplementary Partial European Search Report for European Application No. EP-04 77 1464 (Nov. 23, 2009). J.C. Carr et al., "Reconstruction and Representation of 3D Objects with Radial Basis Function", ACM SIGGRAPH 2001, Los Angeles, CA, pp. 67-76, Aug. 12-17, 2001.

*Primary Examiner* — Amir Alavi
(74) *Attorney, Agent, or Firm* — Finnegan, Henderson, Farabow, Garrett and Dunner, L.L.P.

(57) ABSTRACT

To efficiently execute correction of pixel values of a motion-presence area of captured image data. In correction processing for pixel values of a particular area such as a motion-presence area, initial values of the differences or ratios between white balance adjusted image data and flash image data are set, and conversion of the initial values is performed in accordance with a smoothing filter or a conversion expression whose weight is set on the basis of flash image data, and estimated values of image differences or image ratios in the motion-presence area are calculated to apply the estimated values to execute pixel value correction of the motion-presence area. In addition, after white balance adjustment using a low resolution image and pixel value correction of the motion-presence section, a high resolution corrected image is generated on the basis of the correspondence of a corrected image to low resolution image data.

22 Claims, 20 Drawing Sheets

U.S. PATENT DOCUMENTS

| | | | |
|---|---|---|---|
| 5,706,416 A * | 1/1998 | Mann et al. | 345/427 |
| 5,808,681 A | 9/1998 | Kitajima | |
| 5,982,951 A * | 11/1999 | Katayama et al. | 382/284 |
| 6,157,677 A * | 12/2000 | Martens et al. | 375/240.16 |
| 6,269,175 B1 * | 7/2001 | Hanna et al. | 382/107 |
| 6,426,988 B2 * | 7/2002 | Yamada et al. | 378/4 |
| 6,618,511 B1 * | 9/2003 | Mancuso et al. | 382/293 |
| 7,002,624 B1 | 2/2006 | Uchino et al. | |
| 7,085,418 B2 * | 8/2006 | Kaneko et al. | 382/219 |
| 2001/0028696 A1 * | 10/2001 | Yamada et al. | 378/4 |
| 2002/0057838 A1 * | 5/2002 | Steger | 382/197 |
| 2007/0041664 A1 * | 2/2007 | Yamada | 382/299 |
| 2007/0165960 A1 * | 7/2007 | Yamada | 382/254 |

FOREIGN PATENT DOCUMENTS

| | | |
|---|---|---|
| EP | 1 549 080 A1 | 6/2005 |
| JP | 8-32839 | 2/1996 |
| JP | 8-51632 | 2/1996 |
| JP | 8-340542 | 12/1996 |
| JP | 2000-307940 | 11/2000 |
| JP | 2000-308068 | 11/2000 |
| JP | 2001-078202 | 3/2001 |
| JP | 2001-358986 | 12/2001 |

* cited by examiner

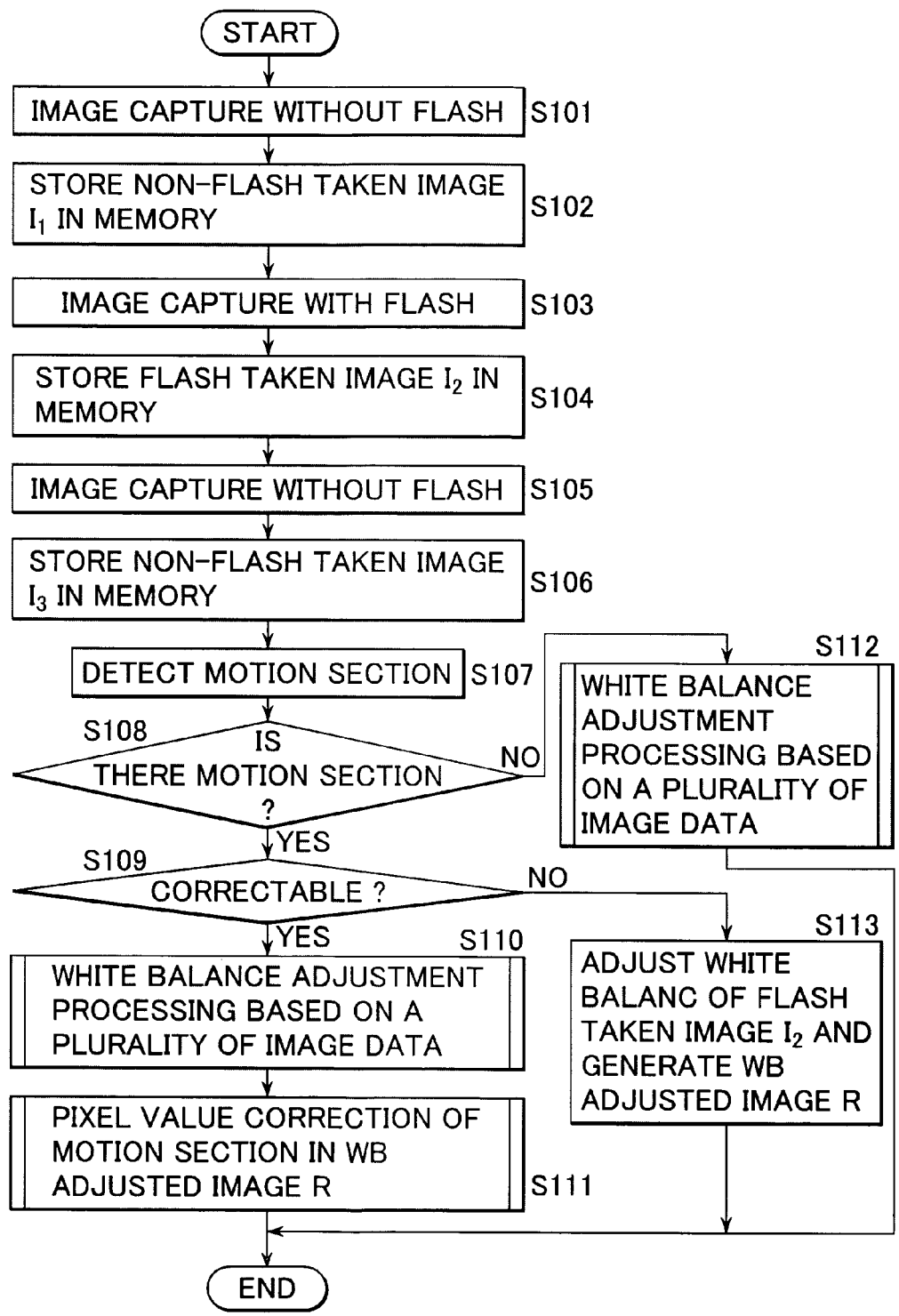

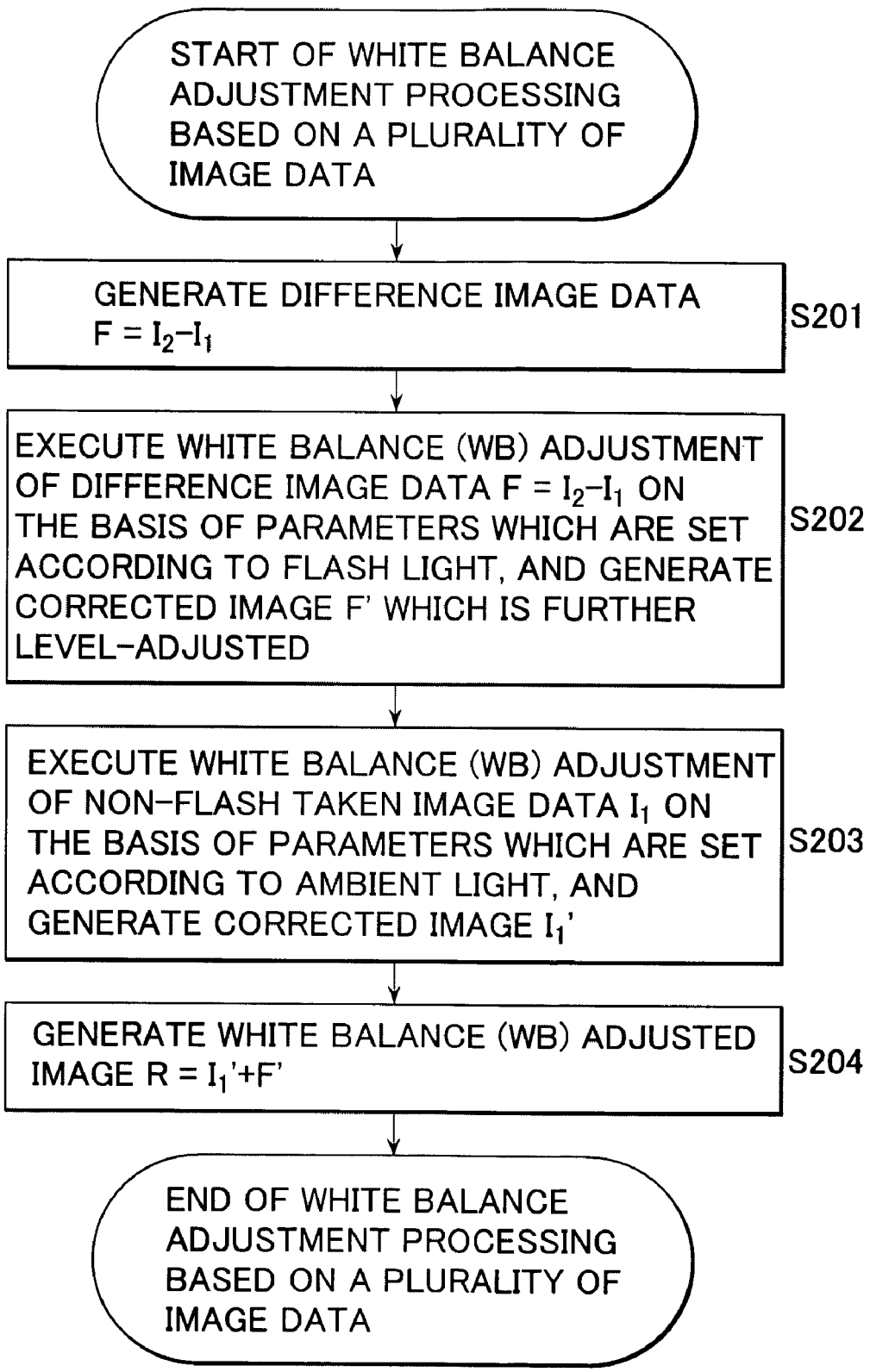

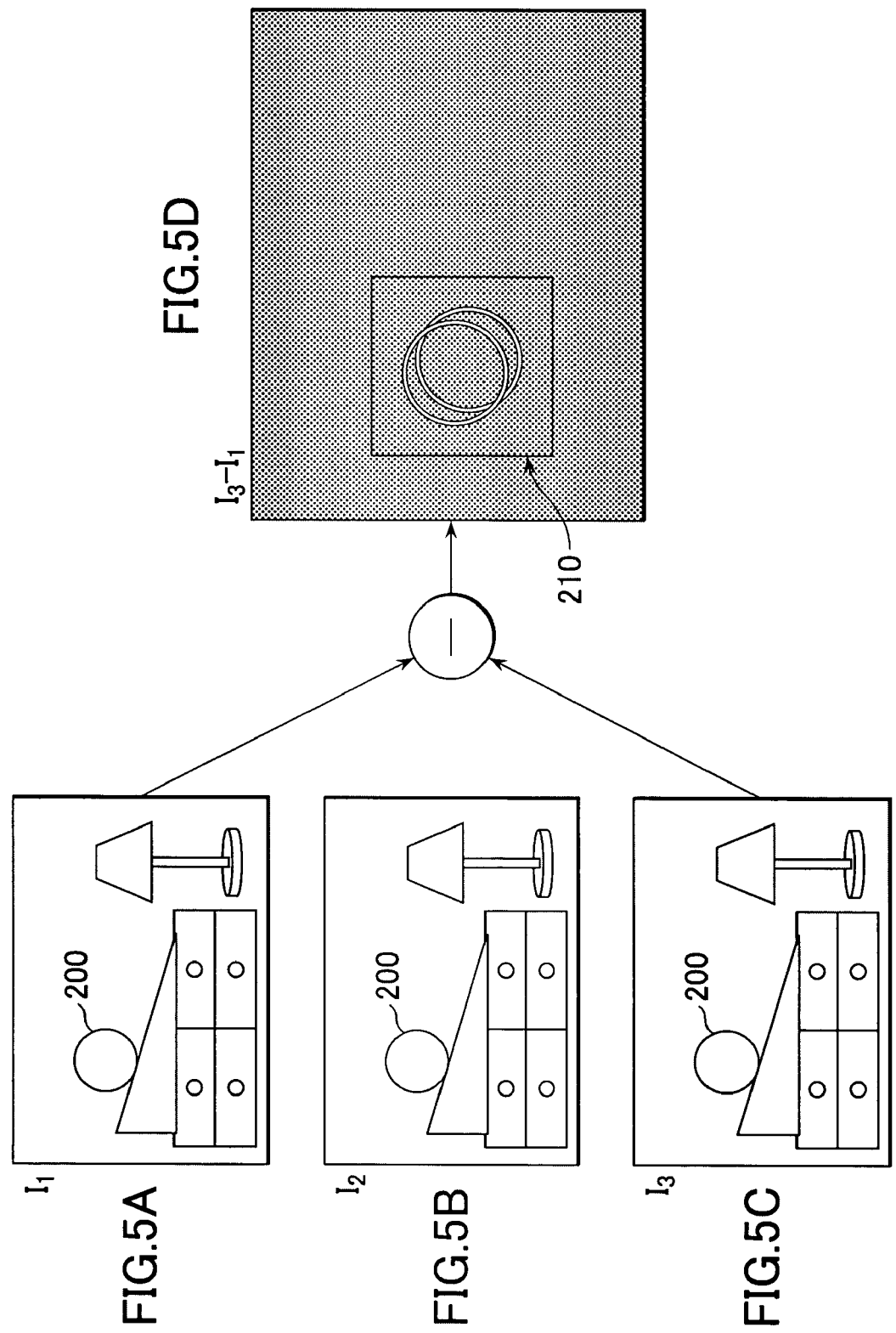

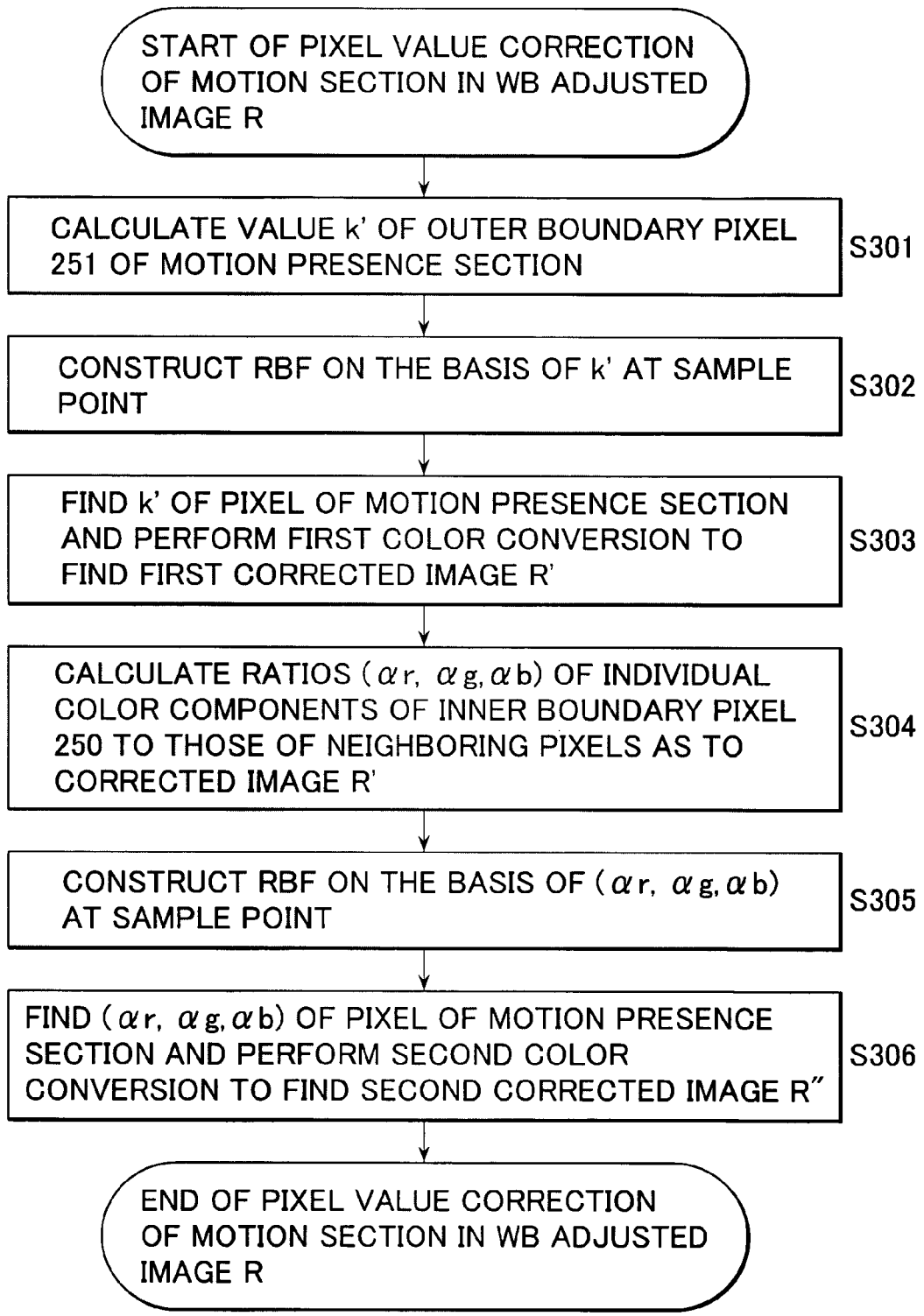

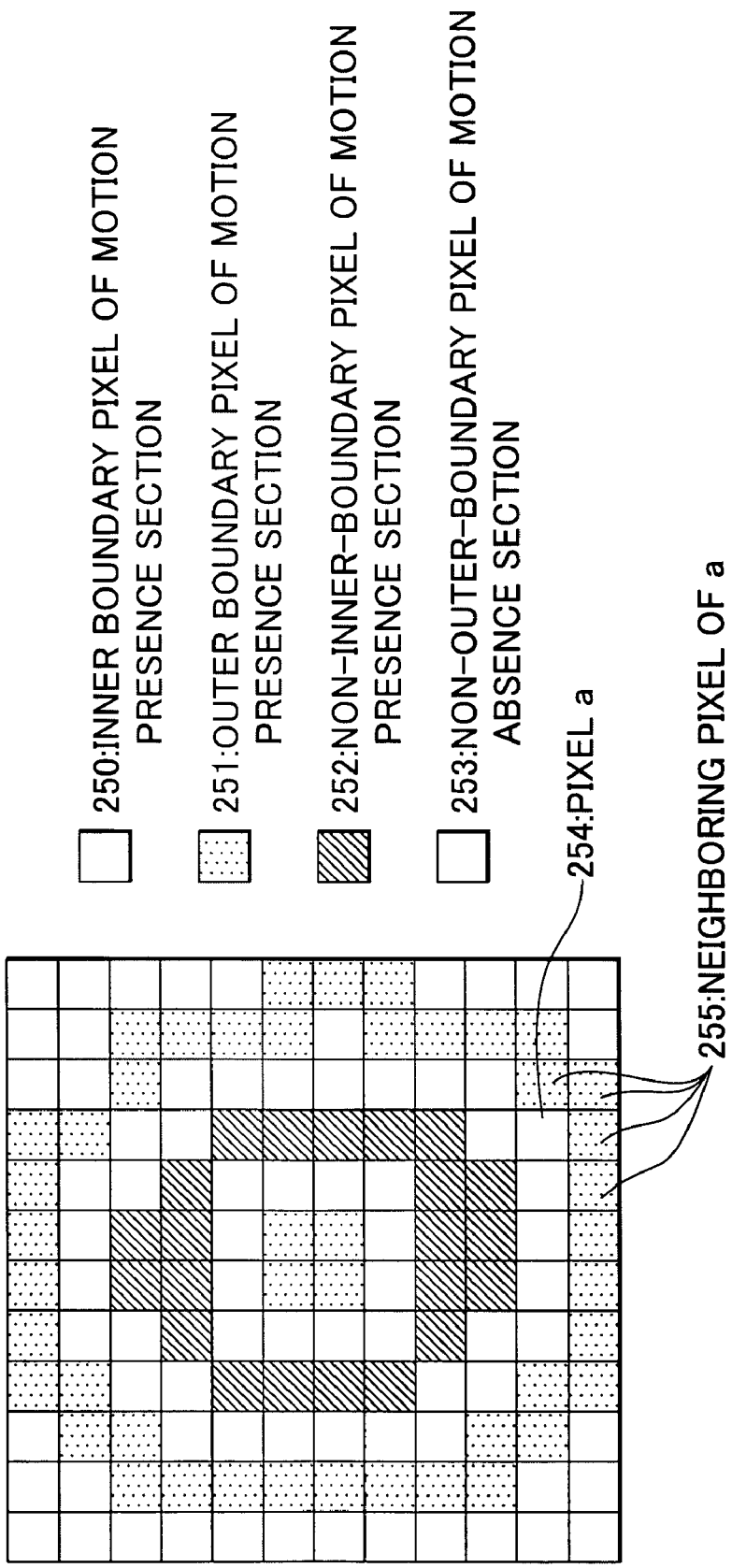

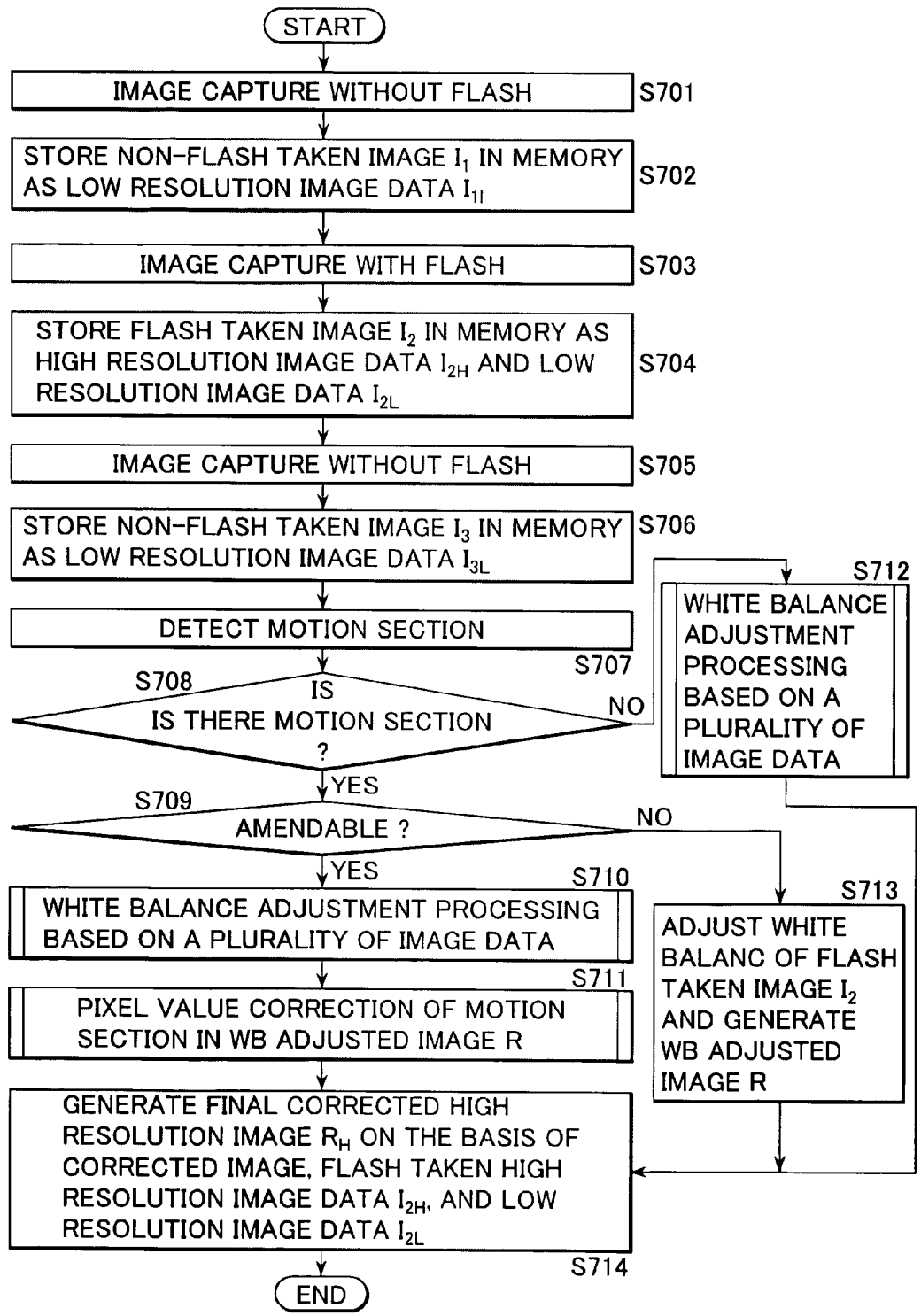

IMAGE PROCESSING METHOD, IMAGE PROCESSING APPARATUS AND COMPUTER-READABLE MEDIUM FOR CORRECTING AN IMAGE

This application is a 371 of PCT/JP04/11477 filed on Aug. 10, 2004.

TECHNICAL FIELD

The present invention relates to an image processing method and an image processing device as well as a computer program, and more specifically, to an image processing method and an image processing device as well as a computer program each of which for enabling image adjustment to alleviate the problem of difference in color temperature between ambient light and flash light by using a plurality of images and which enables efficient high-speed correction processing even in the case where an image shake occurs between a plurality of images used for image adjustment.

BACKGROUND ART

Flashes (electrical flashes or strobes) are used as auxiliary light sources during camera photography. In recent years, DSCs (Digital Still Cameras) are rapidly spreading, and flash photography is often performed with DSCs as well. Flashes can be used to perform various kinds of photography such as fill-in light (a technique for weakening a shadow which appears extremely strongly on the face of a person or the like), backlight compensation (a technique for preventing the face of a person from losing shadow detail when the person standing with the sun behind is photographed), catch light (a technique for beautifully photographing the pupil of an eye with a twinkling "light spot" reflected in the pupil), and daylight synchronized flash (daylight synchro, a technique which uses flash as auxiliary light rays in the daytime or evening). On the other hand, when flash photography is performed, there is a case where color balance is impaired or loss of highlight detail occurs. One object of the present invention is to provide appropriate means capable of correcting undesirable phenomena which occur during flash photography.

In general, in digital cameras, white balance (WB) is performed so that an image of a white subject can be taken in white light. For example, white balance adjustment is performed in such a manner that when an image is to be taken in a light component environment, such as natural light, illumination light or flash (strobe, in which the color temperature of light irradiated toward a subject is high and blue (B) light is strong, sensitivity to blue light is suppressed, whereas when an image is to be taken in a light component environment in which the color temperature of light irradiated toward a subject is low and red (B) light is strong, sensitivity to red light is suppressed and sensitivity to blue (B) light is made relatively high.

White balance adjustment generally executes adjustment processing in which adjustment parameters are set according to light sources to be used during image capture. For example when image capture with flash is performed, white balance adjustment is performed in accordance with parameters corresponding to light components of flash light used.

However, if image capture with flash is performed when there is ambient light other than flash light, two kinds of lights, i.e., flash light and ambient light, are irradiated to a subject and reflected light therefrom reaches the image pickup element of the camera, whereby image capture is performed. In the case of this image capture, if white balance adjustment is carried out according to flash light, the section of the subject which is irradiated with a large amount of flash light is adjusted to natural color. However, if white balance adjustment according to parameter settings matched to the light components of flash light is performed on an area which is out of the reach of flash light and is captured in reflected light of only ambient light, for example, a background image area, appropriate white balance adjustment is not executed and the area is outputted as an area having unnatural color.

Conversely, if white balance adjustment matched to a background section, i.e., white balance adjustment based on the assumption that the image is taken with only ambient light, is executed on the entire captured image, the section irradiated with a large amount of flash light is adjusted to unnatural color.

To cope with this problem, several constructions have been proposed. For example, Patent Document 1 (Japanese Patent Application Publication Hei8-51632) discloses a construction which acquires an image taken without flash and an image taken with flash, divides each of these two captured images into blocks, making a comparison between their luminance values in units of one block, and performs different white balance adjustment on each block of the image taken with flash on the basis of the result of the comparison between the luminance values.

During white balance adjustment, any one of white balance adjustment matched to flash light, white balance adjustment matched to light intermediate between flash light and ambient light and white balance adjustment matched to ambient light is selected and executed. However, this construction needs to perform processing in units of blocks, resulting in problems such as the occurrence of block distortion and the problem that no correct processing can be effected when a subject moves.

Patent Document 2 (Japanese Patent Application Publication JP-A-2000-308068) discloses the following processing construction. Namely, an image is taken with flash with a fully open aperture and a short exposure time, and after that, an image is taken without flash under the originally intended exposure conditions. The former and the latter are respectively called a first image and a second image. In addition, in the first image, pixels having not less than a predetermined level are registered as a main subject area, and the other pixels are registered as a background area. After that, the first image is subjected to white balance adjustment matched to flash light and the second image is subjected to white balance adjustment matched to ambient light, and the main subject area of the first image and the background area of the second area are combined to generate a final recorded image.

However, in this construction, it is impossible to correctly effect white balance adjustment of a subject irradiated with both ambient light and flash light.

Patent Document 3 (Japanese Patent Application Publication JP-A-2000-307940) discloses a construction in which image shake detection means is added to the above-mentioned construction of Patent Document 2. In this construction, if it is determined that a shake has occurred, the above-mentioned first image is used as a recorded image without modification and the processing of combining the first image and the second image is not executed. Accordingly, if a shake is detected, unnaturalness due to the difference in color temperature between flash light and ambient light cannot be solved.

Patent Document 4 (Japanese Patent Application Publication Hei8-340542) discloses a construction which performs division on the luminance of each pixel of an image taken with flash and the luminance of the corresponding pixel of an image taken without flash to find the contribution of flash light, and performs white balance adjustment on the image taken with flash, on the basis of this contribution.

In this construction, an image taken with mixed reflected lights of flash light and ambient light is simply interpolated with white balance parameters for flash light and ambient light on the basis of the contribution of flash light, thereby generating a final image. However, if a physical reflection model of light is taken into account, components originating from flash light and components originating from ambient light should be independently processed, and it is impossible to generate an optimum result image merely by processing the image taken with mixed reflected lights of flash light and ambient light.

[Patent Document 1]
  Japanese Patent Application Publication Hei8-51632
[Patent Document 2]
  Japanese Patent Application Publication JP-A-2000-308068
[Patent Document 3]
  Japanese Patent Application Publication JP-A-2000-307940
[Patent Document 4]
  Japanese Patent Application Publication Hei8-340542

DISCLOSURE OF THE INVENTION

Problem to be Solved by the Invention

The present invention has been conceived in view of the problems of the above-mentioned related art, and provides an image processing method and an image processing device as well as a computer program each of which is capable of performing optimum image adjustment on an image taken under an environment where ambient light and flash light are mixed, and which is capable of performing pixel value correction such as optimum white balance adjustment efficiently at high speed without failure even when an image shake is detected.

Means for Solving the Problems

In a first aspect, a preferred embodiment of the present invention provides an image processing method including the steps of: calculating an image difference or image ratio on the basis of corresponding pixel value of first image data and second image data having different pixel values; calculating estimated values based on the image difference or the image ratio in a particular area of image data; and generating a corrected image of the particular area on the basis of the second image data and the estimated values of the image difference or the image ratio in the particular area which have been calculated in the estimated-value calculation step.

Further, another preferred embodiment of the present invention is characterized in that when $A(x, y)$ denotes a pixel value vector of each pixel $(x, y)$ of the first image data and $B(x, y)$ denotes a pixel value vector of the corresponding pixel $(x, y)$ of the second image data, the image difference $d(x, y)$ is a vector calculated as:

$$d(x,y)=A(x,y)-B(x,y)$$

and the image ratio $d(x, y)$ is:

$$d(x,y)=A(x,y)/(B(x,y)+e)$$

where e is a vector calculated as a fixed value.

Further, another preferred embodiment of the image processing method of the present invention is characterized in that the first image data is a white balance adjusted image R subjected to pixel value adjustment on the basis of a no flash-assisted captured image and a flash captured image, the second image data is a flash image $I_2$, and the particular area is a motion-presence area in which a motion of a subject is detected; where $R(x, y)$ denotes a pixel value vector of each pixel $(x, y)$ of the white balance adjusted image R and $I_2(x, y)$ denotes a pixel value vector of the corresponding pixel $(x, y)$ of the flash image $I_2$, the image difference $d(x, y)$ is a vector calculated as:

$$d(x,y)=R(x,y)-I_2(x,y)$$

and the image ratio $d(x, y)$ is:

$$d(x,y)=R(x,y)/(I_2(x,y)+e)$$

where e is a vector calculated as a fixed value; and the corrected image generation step is a step of generating a corrected image of the motion-presence area on the basis of the flash image $I_2$ and the estimated values of the image difference or the image ratio in the motion-presence area which are calculated in the estimated value calculation step.

Further, another preferred embodiment of the image processing method of the present invention is characterized in that the estimated-value calculation step includes an initial-value setting step of setting initial values of image differences or image ratios of the particular area of the image data on the basis of image differences or image ratios determined in an area in the vicinity of the particular area, and a smoothing processing execution step of executing smoothing processing based on a smoothing filter as to the initial values set in the initial-value setting step.

Further, another preferred embodiment of the image processing method of the present invention is characterized in that the initial-value setting step is a step of setting an initial value of an initial-value-setting target pixel on the basis of an image difference or an image ratio of a pixel in the vicinity of the initial-value setting target pixel for which the image difference or image ratio is already set.

Further, another preferred embodiment of the image processing method of the present invention is characterized in that the initial-value setting step includes a step of applying a mask image in order to discriminate between the initial-value-setting target pixel and pixel to which the image difference or image ratio is already set.

Further, another preferred embodiment of the image processing method of the present invention is characterized in that the corrected-image generation step is a step of generating the corrected image of the particular area on the basis of the second image data and the estimated values of the image differences or the image ratios in the particular area which are calculated in the estimated-value calculation step. In processing using image differences, the corrected-image generation step is executed as a step of adding the estimated values of the image differences of the particular area calculated in the estimated-value calculation step to the second image data in the particular area, whereas in processing using image ratios, the corrected-image generation step is executed as a step of multiplying the estimated values of the image differences of the particular area calculated in the estimated-value calculation step by the second image data in the particular area.

Further, another preferred embodiment of the image processing method of the present invention is characterized in that the first image data are a white balance adjusted image R subjected to pixel value adjustment on the basis of a no flash-assisted captured image and a flash captured image, the second image data are an flash image $I_2$, and the particular area is a motion-presence area in which a motion of a subject is detected. In processing using image differences, the corrected-image generation step is executed as a step of adding the estimated values of the image differences in the particular area calculated in the estimated-value calculation step to the flash image $I_2$ in the motion-presence area, whereas in processing using image ratios, the corrected-image generation step is executed as a step of multiplying the estimated values of the image ratio in the particular area calculated in the estimated-value calculation step by the flash image $I_2$ in the motion-presence area.

Further, another preferred embodiment of the image processing method of the present invention is characterized in that the estimated-value calculation step includes an initial-value setting step of setting initial values of image differences or image ratios of the particular area of the image data on the basis of image differences or image ratio determined in an area in the vicinity of the particular area, and a filtering processing step of executing pixel value conversion processing according to a pixel value conversion expression corresponding to filtering processing using a filter whose weight is set on the basis of the second image data, as to the initial values set in the initial-value setting step, and correcting the image differences or the image ratio of the particular area.

Further, another preferred embodiment of the image processing method of the present invention is characterized in that the initial-value setting step is a step of setting an initial value of an initial-value-setting target pixel on the basis of an image difference or an image ratio of a pixel in the vicinity of the initial-value setting target pixel to which the image difference or the image ratio is already set.

Further, another preferred embodiment of the image processing method of the present invention is characterized in that the initial-value setting step includes a step of applying a mask image in order to discriminate between the initial-value-setting target pixel and the pixel to which the image difference or the image ratio is already set.

Further, another preferred embodiment of the image processing method of the present invention is characterized in that the first image data is a white balance adjusted image R subjected to pixel value adjustment on the basis of a no flash-assisted captured image and a flash captured image, the second image data are a flash image $I_2$, and the particular area is a motion-presence area in which a motion of a subject is detected; and in that the filtering processing step is a step of executing pixel value correction processing using an expression containing a function whose weight is set according to the pixel values of pixels constituting image data of the flash image $I_2$.

Further, another preferred embodiment of the image processing method of the present invention is characterized in that the filtering processing step is a step of executing pixel value correction processing using the following conversion expression:

$$d'(x, y, ch) = \frac{1}{\sum_{i,j} w(|I_2(x, y, ch) - I_2(i, j, ch)|)}$$

$$\sum_{i,j} \{w(|I_2(x, y, ch) - I_2(i, j, ch)|) d(i, j, ch)\}$$

where $d(x, y, ch)$ and $I_2(y, y, ch)$ are a value corresponding to a difference image or image ratio d of each channel [ch] at a pixel position (x, y), and a pixel value of the flash image $I_2$, respectively; $d'(x, y, ch)$ is an updated pixel value of the image difference d of the channel [ch] at the pixel position (x, y); i and j are reference pixel positions which are used for calculating the updated value d' of the value d at the pixel position (x, y). When k denotes an arbitrary natural number, $x-k \leq i \leq x+k$ and $y-k \leq j \leq y+k$, and $w(x)$ is a weighting function which sets a weight according to the pixel values of pixels constituting image data of the flash image $I_2$.

Further, another preferred embodiment of the image processing method of the present invention is characterized in that the weighting function $w(x)$ in the conversion expression is a function expressed by the following expression:

$$w(x) = \exp\left(-\frac{x^2}{2\sigma^2}\right).$$

Further, another preferred embodiment of the image processing method of the present invention is characterized in that the reference pixel positions i, j which are used for calculating the updated value d' of the value of the pixel position (x, y) in the above conversion expression are $x-k \leq i \leq x+k$ and $y-k \leq j \leq y+k$, where k is an arbitrary natural number and k is any of 1, 2 and 3.

Further, another preferred embodiment of the image processing method of the present invention is characterized by further including: a step of storing no flash-assisted low resolution image data $I_{1L}$ based on a no flash-assisted captured image in a memory; a step of storing flash-assisted high resolution image data $I_{2H}$ based on a flash captured image and flash resolution image data $I_{2L}$ in a memory; a step of storing no flash-assisted low resolution image data $I_{3L}$ based on a no flash-assisted take image in a memory; and a step of detecting a motion-presence area on the basis of the no flash-assisted low resolution image data $I_{1L}$ and the no flash-assisted low resolution image data $I_{3L}$. The no flash-assisted low resolution image data $I_{1L}$ is set as the first image data and the flash-assisted low resolution image data $I_{2L}$ is set as the second image data, and the estimated values are calculated to generate a white balance adjusted image R subjected to white balance adjustment processing and pixel value correction processing for the motion area. In the corrected-image generation step, a high resolution final corrected image $R_H$ is generated on the basis of corresponding pixel values of the pixel value adjusted image R, the flash-assisted high resolution image data $I_{2H}$ and the flash-assisted low resolution image data $I_{2L}$.

Further, another preferred embodiment of the image processing method of the present invention is characterized in that the corrected-image generation step has a step of acquiring pixel value conversion information on the corresponding pixels of the pixel value adjusted image R relative to the flash-assisted low resolution image data $I_{2L}$ and a step of executing pixel value conversion of the flash-assisted high resolution image data $I_{2H}$.

Further, in a second aspect, another preferred embodiment of the present invention provides an image processing device characterized by: means for calculating image differences or image ratios on the basis of corresponding pixel values of first image data and second image data having different pixel values; estimation means for calculating estimated values based on the image differences or the image ratios, in a particular area of image data; and generation means for generating a corrected image of the particular area on the basis of the second image data and the estimated values of the image differences or the image ratios in the particular area which have been calculated in the estimated-value calculation step.

Further, another preferred embodiment of the image processing apparatus of the present invention is characterized in that the estimation means includes an initial-value setting section for setting initial values of image differences or image ratios of the particular area of the image data on the basis of image differences or image ratios determined in an area in the vicinity of the particular area, and a smoothing processing section for executing smoothing processing based on a smoothing filter as to the initial values set in the initial-value setting section.

Further, another preferred embodiment of the image processing apparatus of the present invention is characterized in that the estimated-value calculation step includes an initial-value setting section for setting initial values of image differences or image ratios of the particular area of the image data on the basis of image differences or image ratios determined in an area in the vicinity of the particular area, and a filtering processing section for executing pixel value conversion processing according to a pixel value conversion expression corresponding to filtering processing using a filter whose weight is set on the basis of the second image data, as to the initial values set in the initial-value setting section, and correcting the image differences or the image ratios of the particular area.

Further, in a third aspect, another preferred embodiment of the present invention provides a computer program for executing image processing, characterized by: a step for calculating image differences or image ratios on the basis of corresponding pixel values of first image data and second image data having different pixel values; an estimated-value calculation step of calculating estimated values based on the image differences or the image ratios, in a particular area of image data; and a corrected-image generation step of generating a corrected image of the particular area on the basis of the second image data and the estimated values of the image differences or the image ratios in the particular area which have been calculated in the estimated-value calculation step.

Further, another preferred embodiment of the computer program of the present invention further includes: a step of storing no flash-assisted low resolution image data $I_{1L}$ based on a no flash-assisted captured image in a memory; a step of storing flash-assisted high resolution image data $I_{2H}$ based on a flash captured image and flash resolution image data $I_{2L}$ in a memory; a step of storing no flash-assisted low resolution image data $I_{3L}$ based on a no flash-assisted take image in a memory; and a step of detecting a motion-presence area on the basis of the no flash-assisted low resolution image data $I_{1L}$ and the no flash-assisted low resolution image data $I_{3L}$. The no flash-assisted low resolution image data $I_{1L}$ is set as the first image data and the flash-assisted low resolution image data $I_{2L}$ is set as the second image data, and the estimated values are calculated to generate a white balance adjusted image R subjected to white balance adjustment processing and pixel value correction processing for the motion area. In the corrected-image generation step, a high resolution final corrected image $R_H$ is generated on the basis of corresponding pixel values of the pixel value adjusted image R, the flash-assisted high resolution image data $I_{2H}$ and the flash-assisted low resolution image data $I_{2L}$.

The computer program according to a preferred embodiment of the present invention is a computer program capable of being provided by storage media and communication media which provide computer programs in computer-readable formats to general-purpose computer systems capable of executing various program codes, for example, storage media such as CDs, FDs and MOs or communication media such as networks. By providing this program in a computer-readable format, processing according to the program is realized on a computer system.

Further objects, features and advantages of the present invention will become apparent from the following detailed description of embodiments of the present invention with reference to the accompanying drawings. Incidentally, the term "system" used herein means a logical collection construction of a plurality of devices, and is not limited to a construction in which individual constituent devices are incorporated in a same housing.

EFFECT OF THE INVENTION

According to the preferred embodiments of the present invention, it is possible to efficiently execute correction processing of the pixel values of a particular area such as a motion-presence area on the basis of pixel values of a motion absence area, for example, white balance adjusted image data, and flash image data of the particular area such as the motion-presence area. Accordingly, it is possible to generate an image smoothly connected to the white balance adjusted image data, and it is also possible to generate an image which reflects texture information on the flash image data of the motion-presence area.

According to the preferred embodiments of the present invention, in pixel value correction processing for a motion-presence area, after initial values of the difference or the ratio between white balance adjusted image data and flash image data are set in the motion-presence area, smoothing is performed by a smoothing filter and estimated values of the image difference or the image ratio in the motion-presence area are calculated to execute pixel value correction of the motion-presence area on the basis of the estimated values, whereby high speed processing using reduced amount of calculation is realized.

Furthermore, according to the preferred embodiments of the present invention, in correction for a motion-presence-section pixel area, filtering processing according to a pixel value conversion expression using a coefficient determined to take into account the pixel values of the flash captured image $I_2$ is performed. Accordingly, pixel value correction which reflects the texture of the flash captured image $I_2$ is performed and the fuzziness of edge sections, the blur of colors and the like are solved even in the motion-presence area, whereby it is possible to generate an image which reflects the texture of the flash captured image $I_2$.

Furthermore, according to the preferred embodiment of the present invention, after white balance adjustment using low resolution images and pixel value correction of a motion-presence section have been executed, it is possible to generate a high resolution corrected image on the basis of the correspondence of corrected image data to low resolution image data, whereby high speed processing can be achieved with a small memory amount and a high resolution corrected image can be finally acquired.

BEST MODE FOR CARRYING OUT THE INVENTION

A plurality of embodiments of an image processing method and an image processing device according to the present invention will be described below with reference to the accompanying drawings.

Embodiment 1

First, a description will be given as to Embodiment 1 of an image processing method and an image processing device according to a preferred embodiment of the present invention, both of which execute optimum white balance adjustment processing for image capture under environments in which ambient light and flash light are mixed.

FIG. 1 is a block diagram showing the construction of an image pickup apparatus according to the present embodiment. As shown in FIG. 1, the image pickup apparatus according to the present embodiment is made of a lens 101, a diaphragm 102, a solid state image pickup element 103, a correlated double sampling circuit 104, an A/D converter 105, a DSP block 106, a timing generator 107, a D/A converter 108, a video encoder 109, a video monitor 110, a codec (CODEC) 111, a memory 112, a CPU 113, an input device 114, a flash control device 115 and a flash device 116.

The input device 114 denotes operating buttons such as a recording button provided on a camera body. The DSP block 106 is a block which has a signal processing processor and an image RAM and is constructed so that the signal processing processor can perform preprogrammed image processing on image data stored in the image RAM. The DSP block is hereinafter referred to simply as the DSP.

The general operation of the present embodiment will be described below.

Incident light which has reached the solid state image pickup element 103 through an optical axis, first of all, reaches individual light receiving elements on its image pickup surface, and is converted to electrical signals by photoelectric conversion at the respective light receiving elements. The electrical signals are subjected to noise reduction by the correlated double sampling circuit 104 and are converted to digital signals by the A/D converter 105, and then are temporarily stored in an image memory in the digital signal processing section (DSP) 106. Incidentally, during image capture, if necessary, the flash device 116 can be made to flash by means of the flash control device 115.

While image pickup is being performed, the timing generator 107 controls the signal processing system to maintain image capture at a fixed frame rate. A stream of pixels is also sent to the digital signal processing section (DSP) 106 at a fixed rate, and after appropriate image processing has been performed, image data is sent to either or both of the D/A converter 108 and the codec (CODEC) 111. The D/A converter 108 converts the image data sent from the digital signal processing section (DSP) 106 into an analog signal, and the video encoder 109 converts the analog signal to a video signal, so that the video signal can be monitored on the video monitor 110. This video monitor 110 assumes the role of a camera viewfinder in the present embodiment. The codec (CODEC) 111 encodes the image data sent from the digital signal processing section (DSP) 106, and the encoded image data is recorded on the memory 112. The memory 112 may be, for example, a recording device which uses a semiconductor, a magnetic recording medium, a magneto-optical recording medium, an optical recording medium or the like.

The entire system of a digital video camera according to the present embodiment is as described above, and in the present embodiment, the present invention is realized as image processing in the digital signal processing section (DSP) 106. This image processing will be described below in detail.

As described above, the image processing section of the present embodiment is actually realized by the digital signal processing section (DSP) 106. Accordingly, in the construction of the present embodiment, the operation of the image processing section is realized in such a manner that an arithmetic unit sequentially executes operations written in predetermined program codes, on a stream of input image signals in the inside of the digital signal processing section (DSP) 106.

In the following, the order in which individual processing steps of the program are executed will be described with reference to a flowchart. However, the present invention may be constructed not in the form of a program which will be described in the present embodiment, but by incorporating a hardware circuit which realizes processing equivalent to functions which will be described below.

FIG. 2 is a flowchart for describing the procedure of white balance (WB) adjustment processing to be executed on a stream of input image signals, in the inside of the digital signal processing section (DSP) 106.

In Step S101, image capture is performed without flash by using an aperture and a shutter speed which are set in advance, and in Step S102, this no flash-assisted captured image is stored in a memory as image data $I_1$. In Step S103, similarly to Step S101, image capture is performed with flash by using an aperture and a shutter speed which is set in advance, similarly to Step S101, and in Step S104, this flash captured image is stored in the memory as image data $I_2$.

Then, in Step S105, image capture is again performed without flash by using an aperture and a shutter speed which is set in advance, similarly to Step S101, and in Step S106, this no flash-assisted captured image is stored in the memory as image data $I_3$.

Incidentally, the image capture of Steps S101, S103 and S105 is executed as continuous image capture, for example, continuous image capture at intervals of 1/100 seconds. White balance (WB) adjustment processing is performed by using a plurality of images obtained in the respective image capture steps, and one image datum adjusted in white balance (WB) is generated.

In addition, the image data $I_1$, $I_2$ and $I_3$ stored in the memory in Steps S101, S104 and S106 are images corrected for hand shake. Namely, if a hand shake occurs during the capture of the three images $I_1$, $I_2$ and $I_3$, these images are corrected for hand shake before they are stored in the memory. Specifically, if the captured images are images blurred by the hand shake, correction of the hand shake is executed between Steps S101 and S102, between Steps S103 and S104, and between Steps S105 and S106, and the corrected images are stored in the memory. Accordingly, the image data $I_1$, $I_2$ and $I_3$ stored in the memory become like images which are continuously taken with the camera fixed to a tripod.

Incidentally, as hand shake correction processing, it is possible to apply conventionally known processing. For example, it is possible to apply methods which have heretofore widely used, such as a method of detecting a deviation by using an acceleration sensor and shifting a lens, a method of taking an image of resolution higher than an objective resolution by using an image pickup element and reading out an appropriate section to prevent the occurrence of a deviation, and further, a method of correcting hand shake through only image processing without using any sensor.

Then, in Step S107, it is detected whether an image shake due to a motion of a subject itself has occurred during the capture of the three images in Steps S101, S103 and S105. The processing of detecting whether an image shake due to a motion of a subject itself has occurred is performed by comparing two of the three images. For example, the image $I_1$ and the image $I_3$ can be used to detect a motion section. As one example, there is a method of finding the difference between each pixel in the image $I_1$ and in the image $I_3$, and registering the corresponding pixels as a section in which a motion has occurred, if the difference is not less than a certain threshold. If it is determined that there is not an image shake due to a motion of the subject itself (Step S108: No), the process proceeds to Step S112. If a motion is detected (Step S108: Yes), the process proceeds to Step S109.

In Step S109, it is determined whether correction processing for performing appropriate white balance (WB) adjustment can be executed as to the motion section detected in Step S107. This decision processing adopts, for example, a method of making a decision based on the ratio of the number of the pixels registered as the motion section to the number of pixels of the entire image. For example, if the ratio [ratioA] of the number of the pixels registered as the motion section to the number of pixels of the entire image is not less than a certain preset threshold [Threshold], it is determined that correction is impossible, whereas if the ratio is less than the threshold, it is determined that correction is possible.

If it is determined in Step S109 that correction is impossible, the process proceeds to Step S113, whereas if it is determined that correction is possible, the process proceeds to Step S110.

In Step S113, white balance (WB) adjustment is performed on the flash image $I_2$ and an output image R is generated, and the process comes to an end. Parameter values to be used for white balance may adopt parameters which are set according to ambient light components, or parameters which are set according to flash light components, or parameters which are set on the basis of intermediate components between ambient light and flash light. White balance (WB) adjustment in which these parameters are set is executed. Incidentally, this white balance adjustment method is a method which has heretofore been performed, and its detailed description is omitted herein. The parameters used are parameters represented by a 3×3 matrix, and are a matrix to be applied to conversion of color components which constitute the color of each pixel. A matrix in which the components other than its diagonal components are set to 0s is applied to the 3×3 matrix.

White balance (WB) adjustment processing based on a plurality of image data in Steps S110 and S112 will be described below. Steps S110 and S112 execute the same processing. Details of this processing will be described with reference to FIG. 3.

In Step S201, the difference between the components of the flash image $I_2$ and the components of the respective colors of the pixels of the no flash-assisted captured image $I_1$ is found, and the difference image $F=I_2-I_1$ is generated and stored in the memory. If the subject does not move between Step S101 in which image capture has been performed without flash light and Step S103 in which image capture has been performed with flash light, the difference image $F=I_2-I_1$ becomes equivalent to an image which is picked up by the solid state image pickup element of the camera when the subject is illuminated with only flash light with no ambient light existing at all and only the flash light is reflected from the subject and enters the solid state image pickup element. Then, in Step S202, white balance (WB) adjustment matched to the color temperature of the flash light is executed on the image F. Namely, white balance (WB) adjustment is executed on the difference image data F on the basis of the parameters which are set according to the flash light. Furthermore, if the flash light is excessively bright or dark, level adjustment is performed so that the brightness of the image becomes optimum, whereby a corrected image F' is generated.

Then, in Step S203, white balance (WB) adjustment matched to ambient light is executed on the no flash-assisted captured image data $I_1$. Namely, white balance (WB) adjustment is executed on the no flash-assisted captured image data $I_1$ on the basis of parameters which are set according to the ambient light, whereby a corrected image $I_1'$ is generated.

This is executed by white balance (WB) adjustment which has heretofore been widely known. For example, it is possible to use a technique described in Japanese Patent Application Publication JPA 2001-78202. In JPA-2001-78202, object color component data and the spectral distribution of ambient light are found as illumination component data from the difference image F between the image $I_2$ taken with flash and the image $I_1$ taken without flash and the spectral characteristics of existing flashes. White balance (WB) adjustment of the image $I_1$ is executed by using this illumination component data.

Then, in Step S204, the difference image F' and the corrected image $I_1'$ are added together to generate a white balance (WB) adjusted image R. Through the above-mentioned steps, as to a section where no motion is present, the white balance (WB) adjusted image R becomes an image in which its components due to the flash light and its components due to the ambient light are independently adjusted in white balance (WB).

FIG. 4 is a view for describing the principle of the generation of the white balance (WB) adjusted image R on the basis of the two images, which is executed in accordance with the flow of FIG. 3, that is to say, a view for describing the principle of the generation of the white balance (WB) adjusted image R on the basis of the flash captured image data $I_1$ and the no flash-assisted image $I_2$.

FIG. 4A is a view in which a pixel lying at a certain coordinate position (x, y) in the flash image $I_2$ is represented as a vector V3 in an RGB space. The vector V3 has (ir, ig and ib) as the values of (R, G and B). This vector V3 is a pixel value which is acquired on the basis of illumination light containing both an ambient light component and a flash light component.

Accordingly, this vector V3 is equivalent to the sum of a vector V1 which is based on a pixel value at the same coordinates (x, y) acquired from image capture with only an ambient light component, i.e., the pixel value of the no flash-assisted captured image data $I_1$, and a vector V2 made of pixel value components of an image acquired when image capture is performed under the hypothetical condition that ambient light is absent and only flash light is present.

Accordingly, the pixel value of the vector V2, i.e., the pixel value of the image acquired when image capture is performed under the hypothetical condition that ambient light is absent and only flash light is present, is acquired by subtracting the pixel value represented by the vector V1 from the vector V3. This result is shown by the vector V2 in FIG. 4B. As to the pixel value represented by the vector V2 which is based on the condition that only flash light is irradiated, white balance adjustment is executed in accordance with the parameters which are set on the basis of flash light components, thereby finding a corrected pixel value to find a vector V2' made of the corrected pixel value. An image formed by the pixel value represented by this vector V2' corresponds to the corrected image F' obtained as the result of white balance adjustment in Step S202 of FIG. 3. Namely, the processing of FIGS. 4A and 4B corresponds to Steps S201 and 202 in the flow of FIG. 3.

FIG. 4C shows the processing of executing white balance adjustment of the pixel value corresponding to the vector V1 which is based on the pixel value of the no flash-assisted captured image data $I_1$, in accordance with the parameters which are set on the basis of ambient light components, thereby finding a corrected pixel value to find a vector V1' made of the corrected pixel value. An image formed by the pixel value represented by this vector V1' corresponds to the corrected image $I_1'$ obtained as the result of white balance adjustment in Step S203 of FIG. 3. Namely, the processing of FIG. 4C corresponds to Step S203 in the flow of FIG. 3.

FIG. 4D shows the processing of adding together the pixel value represented by the vector V2' corresponding to the corrected image F' shown in FIG. 4B and the pixel value represented by the vector V1' corresponding to the corrected image $I_1$' shown in FIG. 4C, and generating the white balance adjusted image data R having a final white balance adjusted pixel value. Namely, the white balance adjusted pixel value at the certain coordinates (x, y) is a pixel value obtained by adding together the pixel value represented by the vector V2' corresponding to the corrected image F' shown in FIG. 4B and the pixel value represented by the vector V1' corresponding to the corrected image $I_1$' shown in FIG. 4C. Namely, the processing of FIG. 4D corresponds to Step S204 in the flow of FIG. 3.

Accordingly, the white balance adjustment processing of the present embodiment is constructed so that an image containing both ambient light components and flash light components is separated into two images, i.e., an image taken with only ambient light components and an image taken with only flash light components, and as to the image taken with only ambient light components, white balance adjustment is executed in accordance with parameters which are set on the basis of the ambient light components, whereas as to the image taken with only flash light components, white balance adjustment is executed in accordance with parameters which are set on the basis of the flash light components, whereby these corrected pixel values are again added together to obtain the final white balance adjusted image R. In this manner, the two light components are independently subjected to white balance adjustment with the parameters suited to the respective light components, whereby appropriate white balance adjustment is executed. Namely, it is possible to generate an adjusted image which looks as if it were captured under a situation where ambient light and flash light had the same color.

Returning to the flow of FIG. 2, the steps will be further described below. When the white balance adjustment processing based on the above-mentioned plurality of images is performed in Step S112, the white balance adjusted image R is outputted as a final output image, and the process comes to an end.

On the other hand, the case where the white balance adjustment processing based on the above-mentioned plurality of images is performed in Step S110 means the case where it is determined that an image shake due to a motion of the subject itself has occurred and the image shake is correctable. As to the image area of the image shake due to the motion of the subject itself, i.e., a motion section area, in the white balance adjusted image R generated in Step S110, pixel value correction processing is executed in Step S111. Namely, exceptional processing is performed on the pixel values of the motion section detected in Step S107, thereby modifying the white balance adjusted image R. As modification processing, there is, for example, a method of inputting the pixel values of the flash image $I_2$ corresponding to the section in which the motion is detected, referring to the pixel values of a section in which a motion is absent, in the white balance adjusted image R, determining the pixel values of the section in which the motion is detected, and synthesizing a final image.

This synthesis method will be described below. The color of an object appearing in an image is obtained by light being reflected from the object and being made incident on and picked up by an image pickup element. For example, if a certain object is red on an image under a white light source, the object has the characteristics of highly reflecting visible light of frequencies corresponding to red and absorbing light of frequencies corresponding to the other colors. Namely, it can be said that an object has peculiar reflectance with respect to lights of different frequencies. In the following, the reflectance of an object for lights relative to RGB color components is denoted by $(o_r, o_g, o_b)$, and light of certain color temperature is denoted by $(l_r, l_g, l_b)$. When light produced by the light $(l_r, l_g, l_b)$ being reflected from the object $(o_r, o_g, o_b)$ is picked up as an image by a camera, the values $(i_r, i_g, i_b)$ of pixels which constitute the picked-up image are expressed by the following expression (Expression 1):

$$(i_r, i_g, i_b) = (k*l_r*o_r, k*l_g*o_g, k*l_b*o_b) \quad \text{(Expression 1)}$$

In the above expression, k is a scalar value representing the intensity of light.

It is now assumed that there are two irradiation lights such as ambient light and flash light and there are a light source 1 $(l_{1r}, l_{1g}, l_{1b})$ and a light source 2 $(l_{2r}, l_{2g}, l_{2b})$. If light produced by these two lights being reflected from the certain object $(o_r, o_g, o_b)$ is picked up by a camera, the pixel value $(i_r, i_g, i_b)$ of the image picked up by the camera can be expressed by the following expression (Expression 2):

$$(i_r, i_g, i_b) = ((k_1*l_{1r}+k_2*l_{2r})*o_r, (k_1*l_{1g}+k_2*l_{2g})*o_g, (k_1*l_{1b}+k_2*l_{2b})*o_b) \quad \text{(Expression 2)}$$

In this expression, k1 is a scholar value representing the intensity of the light source 1, and k2 is a scalar value representing the intensity of the light source 2.

Letting $o_r' = k_1*o_r$, $o_g' = k_1*o_g$ and $o_b' = k_1*o_b$, the above expression (Expression 2) can be transformed into the following expression (Expression 3):

$$(i_r, i_g, i_b) = ((l_{1r}+k'*l_{2r})*o_r', (l_{1g}+k'*l_{2g})*o_g', (l_{1b}+k'*l_{2b})*o_b') \quad \text{(Expression 3)}$$

In this expression, $k' = k_2/k_1$, and k' is the light intensity scalar ratio of the two light sources. Namely, k' is the intensity scalar ratio of lights respectively irradiated from the light source 1 and the light source 2, in the section of a subject which is picked up by a pixel of interest.

A certain pixel value $(i_r, i_g, i_b)$ on an image $I_2$ picked up by the two kinds of lights, ambient light and flash light, being reflected from the object will be considered here. It is assumed that in the above expression (Expression 3), the light source 1 is ambient light and the light source 2 is flash light. The color $(l_{1r}, l_{1g}, l_{1b})$ of the ambient light can be measured by a method used in automatic white balance adjustment which has heretofore been performed. Since the color $(l_{2r}, l_{2g}, l_{2b})$ of the flash light is peculiar to flash devices, this color is known and can be set in advance. Furthermore, if k' is known, the pixel $(i_r, i_g, i_b)$ can be decomposed into ambient light components $(l_{1r}*o_r', l_{1g}*o_g', l_{1b}*o_b')$ and flashlight components $(k'*l_{2r}*o_r', k'*l_{2g}*o_g', k'*l_{2b}*o_b')$. The ambient light components and the flash light components are separated and are independently WB processed, and if the resultant images are added together and reconstructed, it is possible to solve the unnaturalness of the image due to the difference in color temperature between the ambient light and the flash light.

The pixel value correction of Step S111 is executed in accordance with the above-mentioned processing as to the motion section detected in Step S107 in the flow described with reference to FIG. 2. A specific processing example will be described below.

As described above, in Step S107, it is detected whether an image shake due to a motion of the subject itself has occurred, during the capture of the three images in Steps S101, S103 and S105. This processing of detecting whether an image shake due to a motion of the subject itself has occurred is performed by comparing two of the three images.

For example, as shown in FIG. 5, in the case where a ball 200 is rolling while A the no flash-assisted image $I_1$, B the flash image $I_2$, and C the no flash-assisted image $I_3$ are being continuously captured, a difference image D $I_3-I_1$ between the image $I_1$ of A and the image $I_3$ of C is acquired to detect an area 210 in which an image shake due to the motion of the subject itself is occurring.

A specific processing procedure for the pixel value correction processing of the motion section will be described below with reference to FIGS. 6 and 7. FIG. 6 is a flowchart showing the specific processing procedure for the pixel value correction processing of the motion section, and FIG. 7 shows a pixel area containing the motion section which is a correction target, i.e., the area 210 shown in FIG. 5.

As shown in FIG. 7, in an image area which is determined to be moving, the in the vicinity of pixels of an image area determined to be not moving (pixels each arranged at a position surrounded by 8 pixels) are defined as inner boundary pixels 250 of a motion-presence section. In addition, in the image area which is determined to be moving, the pixels other than the inner boundary pixels 250 are defined as motion-presence non-inner-boundary pixels 252.

In addition, in the image area which is determined to be not moving, pixels arranged at the in the vicinity of positions of the image area determined to be moving (pixels each arranged at a position surrounded by 8 pixels) are defined as outer boundary pixels 251 of the motion-presence section. In addition, in the image area which is determined to be not moving, the pixels other than the outer boundary pixels 251 of the motion-presence section are defined as motion absence non-outer-boundary pixels 253.

As to any of the pixels of the motion-presence section, the ratio of the intensity (scalar value) $k_1$ of the light source 1 (ambient light) to the intensity (scalar value) $k_2$ of the light source 2 (flash light), i.e., the light intensity scalar ratio $k'=k_2/k_1$, is unknown. It is assumed here that an objective image which is correctly adjusted in white balance (WB) and is corrected for its motion section has a pixel construction in which the pixel values of the motion-presence section and its motion absence section are smoothly varied.

Under this assumption, the value of the light intensity scalar ratio k' is found with regard to each of the motion-presence section outer boundary pixels 251. As to each of these motion-presence section outer boundary pixels 251, the ambient light components $(l_{1r}*o_r', l_{1g}*o_g', l_{1b}*o_b')$ in the above-mentioned expression (Expression 3) are equal to the values of the corresponding pixel in the no flash-assisted captured image data $I_1$, whereby the value of the light intensity scalar ratio $k'=k_2/k_1$ can be found on the basis of the pixel values $(i_r, i_g, i_b)$ of the flash image $I_2$ and the expression (Expression 3). The processing of calculating the ratio: $k'=k_2/k_1$ of the intensity (scalar value) $k_1$ of the light source 1 (ambient light) to the intensity (scalar value) $k_2$ of the light source 2 (flash light) is the processing of Step S301 of FIG. 6.

From the processing of this step S301, the light intensity scalar ratio k' is found with regard to each of the motion-presence section outer boundary pixels 251. However, the values of the light intensity scalar ratios k' corresponding to the respective pixels contained in the motion-presence section are unknown. However, the values of the light intensity scalar ratios k' corresponding to these respective pixels contained in the motion-presence section are interpolated from the calculated values of k' corresponding to the motion-presence section outer boundary pixels 251. As one example of the interpolation method, processing using radial basis functions (RBFs: Radial Basis Functions) can be enumerated.

As a reference document regarding interpolation of data using radial basis functions (RBFs), for example, J. C. Carr, et al, "Reconstruction and Representation of 3D Objects with Radial Basis Function," ACM SIGGRAPH 2001, Los Angeles, Calif., pp. 67-76, 12-17 Aug. 2001 can be enumerated.

The Radial Basis Functions (radial basis functions) are functions whose value monotonously decreases (or increases) with the increasing distance from the central point so that its contour lines form hyper spheres (in the case of three dimensions, circles or ellipses). It has been known that if the problem of estimating the values of heights of unknown points by constructing a function which passes sample points having known heights and becomes as smooth as possible is to be solved, an RBF centered at the known sample points may be superimposed.

Specifically, if sample points are present in a two-dimensional space, the sample points are defined as follows:

$$\{\vec{c}_i = (c_i^x, c_i^y)\} (1 \leq i \leq n),$$

where $c_i^x$ and $c_i^y$ respectively represent an x coordinate value and a y coordinate value at the sample point i. Letting $\{hi\}= (1 \leq i \leq n)$ denote heights at the respective points, the desired function:

$$f(\vec{x})$$

is expressed as the following expression (Expression 4) by using an RBF:

$$f(\vec{x}) = p(\vec{x}) + \sum_{j=1}^{n} d_j \phi(\vec{x} - \vec{c}_j) \qquad \text{(Expression 4)}$$

Here, $p(\vec{x})$ is:

$$p(\vec{x}) = p_0 + p_1 x + p_2 y$$

Incidentally, an example of the base function:

$$\phi(\vec{x})$$

is:

$$\phi(\vec{x}) = |\vec{x}|, \text{ or } \phi(\vec{x}) = |\vec{x}|^2 \log|\vec{x}|$$

However, $\{d_i\}$ $(1 \leq i \leq n)$, $\{p_i\}$ $(0 \leq i \leq 2)$ cannot be specified with only the above expression (Expression 4). For this reason, $\{d_i\}$ $(1 \leq i \leq n)$, $\{p_i\}$ $(0 \leq i \leq 2)$ which satisfies the following expression (Expression 5) is found:

$$\sum_{j=1}^{n} d_j = \sum_{j=1}^{n} d_j c_j^x = \sum_{j=1}^{n} d_j c_j^y = 0 \qquad \text{(Expression 5)}$$

Therefore, from the following expression:

$$f(\vec{c}_i) = h_i = p(\vec{c}_i) + \sum_{j=1}^{n} d_j \phi(\vec{c}_i - \vec{c}_j)$$

and the expression (Expression 5), it is possible to find (the number of unknown numbers n+3, the number of expressions n+3) $\{d_i\}$ $(1 \leq i \leq n)$, $\{p_i\}$ $(0 \leq i \leq 2)$.

If the light intensity scalar ratios k' in the motion-presence section non-outer-boundary pixels 251 are used as samples and the following expression:

$$f(\vec{x})$$

is constructed, the light intensity scalar ratio k' at an arbitrary position can be found.

This processing is an RBF construction processing based on the light intensity scalar ratios k' at the sample points in Step S302 shown in FIG. 6 (k' in the motion-presence section non-outer-boundary pixels 251).

Through this RBF construction processing, estimation is performed on the ratios of the intensity (scalar value) $k_1$ of the light source 1 (ambient light) to the intensity (scalar value) $k_2$ of the light source 2 (flash light), which ratios correspond to the respective pixels on the flash image $I_2$ in the section determined to be moving, i.e., the light intensity scalar ratios $k':k'=k_2/k_1$ corresponding to the respective pixels contained in the motion-presence section. The estimated light intensity scalar ratios k' corresponding to the respective pixels are used to decompose the motion-presence area section of the image $I_2$ into ambient light components and flash components, and white balance (WB) adjustment processing is individually executed according to the color temperatures of the respective lights.

Namely, since the light intensity scalar ratio k' is found at each pixel position in the motion-presence section, this k' and the pixel value ($i_r$, $i_g$ and $i_b$) at each pixel position in the flash image $I_2$ as well as the known light component ($1_{1r}$, $1_{1g}$, $1_{1b}$) of the light source 1 (ambient light) and the known light component ($1_{2r}$, $1_{2g}$, $1_{2b}$) of the light source 2 (flash light) are substituted into the above-mentioned expression (Expression 3), whereby the reflectance ($o_r'$, $o_g'$, $o_b'$) of the subject based on only the light source 1 (ambient light) is found.

Furthermore, the pixel value of the subject in the case of being irradiated with only the ambient light components: ($1_{1r}*o_r'$, $1_{1g}*o_g'$, $1_{1b}*o_b'$), and the pixel value of the subject in the case of being irradiated with only the flash light components: ($k'*1_{2r}*o_r'$, $k'*1_{2g}*o_g'$, $k'*1_{2b}*o_b'$), are found, and the two white balance adjustments which are based on the independent settings of the parameters corresponding to the respective light components as mentioned above with reference to FIGS. 3 and 4 are executed on the respective pixel values, and the final white balance adjusted pixel value is calculated by the processing of re-synthesizing these adjusted data.

The procedure of correction of pixel values of a motion-presence section can be summarized as the following processing of a to f.

a. First, as data corresponding to pixels of a motion absence section in the vicinity of the motion-presence section, the light intensity scalar ratio of two kinds of light sources, i.e., light irradiated from only the first light source and light irradiated with only ambient light without the first light source, is found as to each portion of a subject whose image is picked up by any one of the pixels.

b. A radial basis function (RBF: Radial Basis Function) is applied to calculate a light intensity scalar ratio corresponding to each of the pixels of the motion-presence section.

c. On the basis of the light intensity scalar ratio corresponding to each of the pixels of the motion-presence section, the pixel value of each of the pixels of the motion-presence section in an image corresponding to an image captured under an environment irradiated by only the first light source is calculated as a first pixel value.

d. On the basis of the light intensity scalar ratio corresponding to each of the pixels of the motion-presence section, the pixel value of each of the pixels of the motion-presence section in an image corresponding to an image captured under an environment irradiated by ambient light which does not include the first light source is calculated as a second pixel value.

e. Pixel value adjustment processing (white balance adjustment) is executed on the basis the first pixel value, and pixel value adjustment processing (white balance adjustment) is executed on the basis the second pixel value.

f. The generated two adjusted pixel values are added together.

In this manner, the white balance (WB) adjusted pixel values relative to the pixels contained in the motion section are overwritten onto the image data R generated in Step S110 of FIG. 2, to find a first corrected image data R. Namely, only the pixel values of the motion section due to the motion of the subject in the captured image are reset in Step S111, and are overwritten onto the white balance adjusted image R generated in Step S110, to find the first corrected image data R'.

Incidentally, as mentioned previously in the processing flow of FIG. 3, in the case where the level correction of the flash light (S202) has been performed, equivalent level correction is performed during the calculation of the pixel values of the motion section, and after that, addition is performed on the white balance adjusted pixel values based on the ambient light and the flash light component.

In this manner, the pixel values of the motion section are reset, and the pixels of the image R which correspond to the motion section are rewritten. This processing is the processing of Step S303 of FIG. 6.

However, in the first corrected image R' found by overwriting the white balance adjusted image R generated in Step S110 with the pixel values which have been reset in the motion-presence section, there is a case where the pixels of the motion absence section of the original image R and the boundary of the reset pixels of the motion-presence section are not smoothly connected. A cause of this case can be considered to be that the color of the ambient light failed to be correctly measured or a loss of highlight detail has occurred in the flash captured image $I_2$. For this reason, to cope with that case, further color conversion processing for smoothing a boundary portion is executed.

Specifically, the processing of Steps S304 to S306 in FIG. 6 is performed. In Step S304, the ratios of the pixel value of a certain pixel a 254 among the motion-presence section inner boundary pixels 250 of the first corrected image R' (refer to FIG. 7) to the average value of the values in the first corrected image R' of motion-presence section outer boundary pixels (pixels 255 in FIG. 7) among the in the vicinity of pixels of the pixel a 254 (pixels arranged at positions contained in the surrounding 8 pixels) are found with respect to individual color components ($\alpha_r$, $\alpha_g$, $\alpha_b$). These ratios are stored as color component data corresponding to the pixel a 254.

Similarly, ratios relative to the individual color components ($\alpha_r$, $\alpha_g$, $\alpha_b$) which correspond to the respective pixels arranged at all positions among the motion-presence section inner boundary pixels 250 are calculated as pixel color component ratio data, and are stored as color component ratio data corresponding to the respective pixels.

Then, in Step S305, an RBF based on the color component ratio data is constructed by using all of the motion-presence section inner boundary pixels 250 as sample points. Finally, in Step S306, as to each of the pixels of the motion-presence section, color component ratio data ($\alpha_r$, $\alpha_g$, $\alpha_b$) which correspond to the respective pixels of the motion-presence section are found on the basis of the RBF based on the constructed color component ratio data, and the pixel values of the respective pixels which are set in the first corrected image R' are multiplied by the color component ratio data ($\alpha_r$, $\alpha_g$, $\alpha_b$) of the corresponding images, whereby new pixel values are calculated to execute second color conversion in which these pixel values are substituted for the pixels of the motion-presence section. A second corrected image R" obtained by executing this color conversion processing is provided as an output image. This processing is the processing of Step S306 of FIG. 6.

Incidentally, if the motion-presence section image and the motion absence section image in the first corrected image R' obtained by performing the processing of Steps S301 to S303 in FIG. 6 are smoothly connected at the boundary therebetween, the processing of Step S304 to Step S306 may be omitted.

The above description has referred to a method using an RBF, with regard to a method of interpolating points with values given at sample points other than the points, but this method is not limitative and other methods may be used to perform interpolation. The above-mentioned processing is a specific processing example of Step S111 of FIG. 2. In this manner, if the image shake based on the motion of the subject itself is detected from the continuously captured images, processing according to the flow shown in FIG. 6 is executed, and the second corrected image R" or the first corrected image R' generated by the above-mentioned processing is provided as a final output image.

Incidentally, if it is known in advance that the subject itself does not move, the processing of Steps S107 to S111 of FIG. 2 are not necessary. In addition, since the decision in Step S108 is necessarily "No", the decision processing of Step S108 need not be performed, so that Steps S105 and S106 for creating and storing data to be used for the decision of Step S108 are also unnecessary.

Accordingly, if it is known in advance that the subject itself does not move, the no flash-assisted captured image $I_3$ which is captured in Step S105 is an unnecessary image, and in this case, two images, i.e., the no flash-assisted captured image $I_1$ and the flash captured image $I_2$, need only to be captured.

In this specification, the term "flash" has been used to describe an illuminating device which emits light in the case of a dark subject, but this device is also called a strobe. Accordingly, the present invention is not limited to flashes and can be generally applied to illuminating devices which emit light in the case of dark subjects.

As described hereinabove, in the present embodiment, as to images which are respectively captured under a plurality of different light irradiations such as flash light and ambient light, images each captured under an environment illuminated with a single kind of light are acquired or generated, and white balance adjustments according to parameters which are set on the basis of the color components (color temperatures) of the respective irradiation lights are respectively executed on the images each captured under an environment illuminated with a single kind of light, and these adjusted images are synthesized. Accordingly, it is possible to realize appropriate white balance adjustment processing in which the difference in color temperature between flash light and ambient light is reduced.

FIG. 8 is a block diagram showing the functional construction of a digital signal processing section (DSP) (which corresponds to the DSP 106 in FIG. 1) which executes processing according to the present embodiment.

The processing in the digital signal processing section (DSP) shown in FIG. 8 will be described, while referring to the flowchart shown in FIG. 2.

In Steps S101 to S106 of FIG. 2, the no flash-assisted captured image $I_1$, the flash captured image $I_2$, and the no flash-assisted captured image $I_3$ are respectively stored in frame memories 301, 302 and 303. Incidentally, as the image storing frame memories, a memory constructed in the digital signal processing section (DSP) or a bus-connected memory (the memory 112 of FIG. 1) may also be used.

The motion detection processing of Step S107 is executed by a motion detection section 309. This is executed as detection processing using difference data based on the no flash-assisted captured image $I_1$ and the no flash-assisted captured image $I_3$ as described previously with reference to FIG. 5.

The white balance adjustment processing based on the above-mentioned plurality of images in Step S112 is the processing described previously with reference to FIGS. 3 and 4.

First, the difference image $F=I_2-I_1$ is found in a difference image calculation section 304 on the basis of the no flash-assisted captured image $I_1$ and the flash captured image $I_2$ (FIG. 3, S201). Then, white balance adjustment processing according to parameters which are set on the basis of the components of flash light is executed by a white balance adjustment section 307 as to the difference image data $F=I_2-I_1$, i.e., the image F corresponding to an image captured under the condition that only flash light is irradiated (FIG. 3, Step S202). Furthermore, white balance adjustment processing according to parameters which are set on the basis of an estimated value of ambient light components which is estimated by an ambient light component estimation section 306 is executed on the no flash-assisted captured image $I_1$ by a white balance adjustment section 305 (FIG. 3, S203).

Furthermore, the pixel values of the two images acquired by these two white balance adjustment processings are added together in a pixel value addition section 308 (FIG. 3, S204).

If the captured image does not contain a motion section, no processing is executed in a motion-section corrected pixel value calculation section 310 and image data having the pixel values added together in the pixel value addition section 308 is outputted via an output switching section 312 as a white balance adjusted image. The image data is outputted to the D/A converter 108 which executes digital/analog conversion (refer to FIG. 1), the codec 111 which executes coding processing, or the like.

On the other hand, if a motion area of the subject itself is detected in the motion detection section 309 as the result of the motion detection using the difference data based on the no flash-assisted captured image $I_1$ and the no flash-assisted captured image $I_3$, the correction (conversion) of the pixel values of the motion-presence section which has previously been described with reference to FIGS. 6 and 7 is, furthermore, performed in the motion-section corrected pixel value calculation section 310, and an image having pixel value data in which corrected pixel values are substituted for the motion-presence section is outputted via the output switching section 312.

A white balance adjustment section 311 executes the processing of Step S113 in the processing flow of FIG. 2. Namely, if it is determined that correction is impossible, for example, in the case where a motion area is detected in the motion detection section 309 but the proportion of the motion area in the entire image is high, the white balance adjustment section 311 receives the input of the flash captured image $I_2$, executes white balance adjustment according to preset parameters, and outputs this adjusted image via the output switching section 312.

The construction shown in FIG. 8 is shown to be divided into individual processing sections for the convenience of description of its function, but actual processing can be executed by a processor in the DSP in accordance with a program which executes processing according to each of the above-mentioned processing flows.

In the above-mentioned white balance adjustment processing, reference has been made to a construction example in which, as described with reference to FIGS. 3 and 4, image data based on a single kind of irradiated light is found as to an ambient light component and a flash light component and as to each of those image data, white balance adjustment processing according to parameters which are set on the basis of the corresponding one of the ambient light component and the flash light is executed.

The following description refers to a construction example in which white balance adjustment processing according to parameters which are set on the basis of ambient light is executed on the difference image data $F=I_2-I_1$ corresponding to the condition that only flash light is irradiated.

FIG. 9 shows a white balance adjustment processing flow based on a plurality of image data in the present embodiment, which flow corresponds to the flow of FIG. 3 in the previously-mentioned embodiment.

In Step S401, the differences between the components of the flash image $I_2$ and the components of the respective colors of the pixels of the no flash-assisted captured image $I_1$ are found, and the difference image $F=I_2-I_1$ is generated and stored in the memory. The difference image $F=I_2-I_1$ becomes equivalent to an image which is picked up by the solid state image pickup element of the camera when the subject is irradiated with only flash light with no ambient light existing at all and only the flash light is reflected from the subject and enters the solid state image pickup element. Then, in Step S402, white balance (WB) adjustment matched to the color temperature of ambient light is executed on the image F, thereby generating the corrected image F'. Namely, white balance (WB) adjustment is executed on the difference image data F on the basis of parameters which are set according to the color temperature of ambient light, whereby the corrected image F' is generated.

At this time, by directly comparing each of the pixels of the difference image F and the corresponding one of the pixels of the no flash-assisted captured image $I_1$, white balance adjustment processing is executed so that flash light matches the color of ambient light. As a specific example of this WB processing, a pixel $(r_i, g_i, b_i)$ of the no flash-assisted captured image $I_1$ which is at the same position as a pixel $(r_f, g_f, b_f)$ of the difference image F is employed to execute pixel value conversion using the following Expressions 6 and 7 as to the R and B components of the pixel of the difference image F according to the level of the G signal of the pixel of the no flash-assisted captured image $I_1$:

$$r_f' = r_f * (g_i/g_f) \quad \text{(Expression 6)}$$

$$b_f' = b_f * (g_i/g_f) \quad \text{(Expression 7)}$$

Then, $r_f'$ and $r_f$ as well as $b_f'$ and $b_f$ are compared to obtain the following values:

$$a_r = r_f'/r_f' = (r_i * g_f)/(r_f * g_i) \quad \text{(Expression 8)}$$

$$a_b = b_f'/b_f' = (b_i * g_f)/(b_f * g_i) \quad \text{(Expression 9)}$$

A WB parameter is found by averaging $a_r$ and $a_b$ which are found from Expressions 8 and 9, with respect to all pixels. The R component and the B component of each pixel of the image F are multiplied by the found parameter, whereby white balance adjustment is performed. Through this processing, the image F is converted to an image which looks as if it were taken under flash light having the same color as ambient light, and this image is stored as the image F'.

Further, in Step S403, the difference image F' and the no flash-assisted captured image $I_1$ are synthesized to generate a first white balance adjusted image $R_1$. The first white balance adjusted image $R_1$ is an image in which the color temperatures of ambient light and flash light are coincident with each other.

Finally, in Step S404, white balance adjustment is further executed on the first white balance adjusted image $R_1$, whereby a second white balance adjusted image $R_2$ is generated.

As a parameter for WB in Step S404, a value which is set by a user may be used, or known automatic white balance techniques may also be used to convert the first white balance adjusted image $R_1$ so that the final second white balance adjusted image $R_2$ has natural hue.

According to the processing of this embodiment, it is possible to achieve white balance adjustment which takes the components of ambient light into greater account. Specifically, it is possible to achieve adjustment according to ambient light; for example, if ambient light is reddish owing to a sunset or the like, i.e., contains a large amount of R component, the entire image is adjusted with a reddish hue.

FIG. 10 is a block diagram showing the functional construction of the digital signal processing section (DSP) (corresponding to the DSP 106 of FIG. 1) which executes processing according to the present embodiment.

The processing in the digital signal processing section (DSP) shown in FIG. 10 will be described, while referring to the flowchart shown in FIG. 9.

In Steps S101 to S106 of FIG. 2, the no flash-assisted captured image $I_1$, the flash captured image $I_2$, and the no flash-assisted captured image $I_3$ are respectively stored in frame memories 401, 402 and 403.

The difference image data $F=I_2-I_1$ is found in a difference image calculation section 404 on the basis of the no flash-assisted captured image $I_1$ and the flash captured image $I_2$ (FIG. 9, S401). Then, white balance adjustment processing according to parameters which are set on the basis of ambient light components is executed by a white balance adjustment section 405 as to the difference image data $F=I_2-I_1$, i.e., the image F corresponding to an image captured under the condition that only flash light is irradiated (FIG. 9, Step S402). Furthermore, the pixel values of the difference image F' acquired by this white balance adjustment processing and those of the no flash-assisted captured image $I_1$ are added together in a pixel value addition section 406, whereby the first white balance adjusted image $R_1$ is generated (FIG. 9, S403). Furthermore, in a white balance adjustment section 407, white balance adjustment is performed on the first white balance adjusted image $R_1$, whereby the second white balance adjusted image $R_2$ is generated.

If the captured image does not contain a motion section, no processing is executed in a motion-part corrected pixel value calculation section 409 and the second white balance adjusted image $R_2$ is outputted via an output switching section 411 as a white balance adjusted image. The image $R_2$ is outputted to the D/A converter 108 which executes digital/analog conversion (refer to FIG. 1), the codec 111 which executes coding processing, or the like.

On the other hand, if a motion area of the subject itself is detected in the motion detection section 408 as the result of the motion detection using the difference data based on the no flash-assisted captured image $I_1$ and the no flash-assisted captured image $I_3$, the correction (conversion) of the pixel values of the motion-presence section which has previously been described with reference to FIGS. 6 and 7 is, furthermore, performed in the motion-part corrected pixel value calculation section 409, and an image having pixel value data in which corrected pixel values are substituted for the motion-presence section is outputted via the output switching section 411.

A white balance adjustment section 410 executes the processing of Step S113 in the processing flow of FIG. 2. Namely, if it is determined that correction is impossible, for example, in the case where a motion area is detected in the motion detection section 408 but the proportion of the motion area in the entire image is high, the white balance adjustment section 410 receives the input of the flash captured image $I_2$, executes white balance adjustment according to preset parameters, and outputs this adjusted image via the output switching section 411.

The construction shown in FIG. 10 is shown to be divided into individual processing sections for the convenience of description of its function, but actual processing can be executed by the processor in the DSP in accordance with a program which executes processing according to each of the above-mentioned processing flows.

According to the present embodiment, it is possible to achieve white balance adjustment which takes the components of ambient light into greater account.

Embodiment 2

As Embodiment 2 of the present invention, similarly to the above description, the following description refers to a construction which adopts a technique different from that of Embodiment 1 as the processing of Step S111 of FIG. 2, i.e., a pixel value correction method for a motion section, in an image processing method and an image processing device both of which execute optimum white balance adjustment processing for image capture under environments in which ambient light and flash light are mixed. The present method enables, for example, high speed processing of high resolution images.

In the above-mentioned embodiment 1, reference has been made to a construction capable of reducing the difference in color temperature between flash light and ambient light. The construction is summarized as follows: first, only flash light components are extracted from a difference image between an image taken with flash and an image taken without flash, and after that, this difference image and the image taken without flash are independently subjected to color conversion and are re-synthesized to reduce the difference in color temperature between ambient light and flash light.

According to this construction, although it is necessary to continuously capture a plurality of images, it is possible to cope with even the case where a subject or the like moves during that time. Namely, three images are continuously captured in the order of a flash image, a no flash-assisted image and a flash image, and a motion section of the subject is detected from the difference between the two no flash-assisted images, and as to each pixel contained in the motion section, interpolation processing is performed on the ratio of a reflected flash light component to a reflected ambient light component, from data in pixels other than the motion section, by using a radial basis function.

Namely, in Embodiment 1, the processing of Step S111 shown in FIG. 1, i.e., the pixel value correction processing of the motion section in the white balance adjusted image R, is executed in accordance with the processing flow shown in FIG. 6.

However, the above-mentioned motion section compensation method in some cases needs large memory sizes and high calculation costs. In particular, the method has the problem that higher resolutions of images to be corrected invoke greater increases in the necessary memory sizes and calculation costs.

Embodiment 2 solves the above-mentioned problem, and provides a construction example in which during image capture which is performed with flash, it is possible to solve unnaturalness due to the difference in color temperature between ambient light and flash light, and further, even if an image shake is detected, it is possible to perform processing optimally and efficiently without failure, and even if the resolution of an objective image is high, it is possible to perform processing efficiently at high speed.

An image processing device according to Embodiment 2 has a construction similar to the construction described previously in Embodiment 1 with reference to FIG. 1. Embodiment 2 is distinctive in the processing of the digital signal processing section (DSP) 106. Details of image processing according to Embodiment 2 will be described below.

The image processing is realized in such a manner that, in the DSP 106, the arithmetic unit sequentially executes operations written in predetermined program codes, on a stream of input image signals. In the following, the order in which individual processing steps of the program are executed will be described with reference to a flowchart. However, the present invention may be constructed not in the form of a program which will be described in the present embodiment, but by incorporating a hardware circuit which realizes processing equivalent to functions which will be described below.

The basic processing of the procedure of white balance (WB) correction processing in the present embodiment is executed in accordance with the flowchart shown in FIG. 2 mentioned above in Embodiment 1. Namely, three images are continuously captured in the order of a flash image, a no flash-assisted image and a flash image, and white balance adjustment is performed on the basis of these images.

In the present embodiment, the pixel value correction processing of the motion section in Step S111 shown in FIG. 2 can be executed far more efficiently at far higher speeds. During the processing of high resolution image data in particular, appropriate pixel value correction processing can be performed at high speed even in the case of an apparatus having a small memory capacity.

The case where the white balance adjustment processing based on the above-mentioned plurality of images is performed in Step S110 shown in FIG. 2 means the case where it is determined that an image shake due to a motion of the subject itself has occurred and the image shake is correctable. As to the image area of the image shake due to the motion of the subject itself, i.e., the motion section area, in the white balance adjusted image R generated in Step S110, pixel value correction processing is executed in Step S111. Namely, exceptional processing is performed on the pixel values of the motion section detected in Step S107, thereby modifying the white balance adjusted image R. As modification processing, there is, for example, a method of inputting the pixel values of the flash image $I_2$ corresponding to the section in which the motion is detected, referring to the pixel values of a section in which a motion is absent, in the white balance adjusted image R, determining the pixel values of the section in which the motion is detected, and synthesizing a final image.

Details of pixel value correction processing according to the present embodiment will be described below.

FIG. 11 is a schematic view showing one example of data which is acquired as the result of motion detection processing executed in Step S107 of FIG. 2.

In FIG. 11, the section determined to be moving in Step S107 of the flow shown in FIG. 2 is called a motion-presence section pixel area 550, while the section determined to be not moving is called a motion absence section pixel area 551.

The image obtained in Step S204 mentioned previously with reference to FIG. 3, i.e., the constituent pixels of the motion absence section pixel area 551 of the white balance adjusted image R, can be said to be pixels obtained by correctly subjecting the image $I_2$ taken with flash and stored in the memory in Steps S103 and S104 shown in FIG. 2 to color conversion to reduce the difference in color between flash light and ambient light. On the other hand, as to the constituent pixels of the motion-presence section pixel area 550 of the white balance adjusted image R, since the motion of the subject exerts an influence on the pixel values, it can be said that there is a high possibility that color conversion is not correctly effected.

Accordingly, as to the pixels of the motion-presence section pixel area 550, color conversion is directly applied to the flash image $I_2$ to perform the processing of finding the final white balance adjusted image R.

In Embodiment 1, the processing of Step S111 shown in FIG. 1, i.e., the pixel value correction processing of the motion section of the white balance adjusted image R, is executed as the interpolation processing using the radial basis function in accordance with the processing flow shown in FIG. 6.

In the present embodiment, the pixel value correction processing of the motion section of the white balance adjusted image R is executed in a sequence different from Embodiment 1. The sequence of the pixel value correction processing of the motion section according to the present embodiment 2 will be described below with reference to the flowchart shown in FIG. 12.

FIG. 12 is a flowchart showing the processing of Step S111 shown in FIG. 2, i.e., the details of the pixel value correction processing of the motion section of the white balance adjusted image R. The processing of each step will be described below.

First, in Step S501, an image difference d is found on the basis of the following expression (Expression 21) using the white balance adjusted image R generated in accordance with Step S110 shown in FIG. 2, i.e., the processing flow of FIG. 3, and the image $I_2$ taken with flash and stored in the memory in Steps S103 and S104 shown in FIG. 2:

$$d(x,y) = R(x,y) - I_2(x,y) \quad \text{(Expression 21)}$$

In this expression, $d(x, y)$, $R(x, y)$ and $I_2(x, y)$ are vectors corresponding to the colors of the respective images at the pixel position $(x, y)$. The above expression is executed as a vector calculation.

In the expression (Expression 21), the image difference d between each pixel value in the white balance adjusted image R and in the flash image $I_2$ is found, but instead of the difference between each pixel value in the white balance adjusted image R and in the flash image $I_2$, the ratio of each pixel value of the white balance adjusted image R to the corresponding one of the flash image $I_2$, i.e., the image ratio d, may be calculated and adopted, as given by the following expression (Expression 22):

$$d(x,y) = R(x,y) - (I_2(x,y) + e) \quad \text{(Expression 22)}$$

In the above expression (Expression 22), "e" is a vector having elements to which fully small fixed values are respectively set, for example, a floor value. The sign "/" in (Expression 22) represents the calculation of dividing the elements of a vector by the respective elements of a vector and setting the results as the respective elements of a vector. "e" is used for the purpose of preventing $d(x, y)$ from becoming unable to be calculated when the elements of $I_2(x, y)$ become 0s.

If the image difference or the image ratio $d(x, y)$ between the white balance adjusted image R and the flash image $I_2$ is correctly found with respect to the entire image, it is possible to calculate the final white balance adjusted image R on the basis of the flash image $I_2$. Namely, it is possible to calculate $R(x, y) = d(x, y) + I_2(x, y)$ or $R(x, y) = (I_2(x, y) + e)*d(x, y)$. Incidentally, the sign "*" represents the calculation of multiplying the elements of a vector by the respective elements of a vector and setting the results as the respective elements of a vector.

However, there is a possibility that the motion-presence section pixel area 550 appears as a motion image, so that if the image difference or the image ratio $d(x, y)$ calculated from the above expression (Expression 21) or (Expression 22) is applied to the pixel area 550 without modification, an optimum color cannot be realized.

For this reason, in the present embodiment, final pixel values relative to the motion-presence section pixel area 550, i.e., the final white balance adjusted image R, is calculated by performing smooth interpolation by using the image difference or the image ratio $d(x, y)$ found from the motion absence section pixel area 551. Otherwise, the final white balance adjusted image R is calculated by performing smooth interpolation calculation using interpolation filtering processing with the image ratio $d(x, y)$. The interpolation filtering processing can be realized by, for example, a method which, as will be described below, interpolates pixel values gradually from the periphery of the area 550 in accordance with the transition state of pixel values actually observed in the pixel area 550 or pixel values at the periphery of the motion-presence section pixel area 550, and further, performs low-pass filtering processing. Incidentally, the interpolation filtering processing of the present invention is not limited to this method.

According to the present method, even as to the motion-presence section pixel area 550, it is possible to generate an image having a color similar to the final white balance adjusted image R while retaining the texture of the flash image $I_2$ of the motion-presence section pixel area 550.

FIG. 13 is a view for describing the interpolation processing for finding final corrected pixel values relative to the motion-presence section pixel area 550 by using the above-mentioned (Expression 21), i.e., the expression for calculating the image difference d between each pixel value in the white balance adjusted image R and in the flash image $I_2$.

In FIG. 13, for ease of explanation, data are shown to be one-dimensionally arranged and the processing will be described on the basis of this illustration, but actually, the processing is executed on a two-dimensional plane. In each of FIGS. 13A to 13C, the horizontal axis represents pixel position, while the vertical axis represents pixel value (luminance or R, G and B values).

FIG. 13A shows the transition of pixel values of a white balance adjusted image R 560 and a flash image $I_2$ 561 in the motion absence section pixel area 551 and the motion-presence section pixel area 550.

FIG. 13B shows a value 562 of the image difference d of a section in the motion absence section pixel area 551 which is close to the motion-presence section pixel area 550. Namely, FIG. 13B shows the value 562 of the above-mentioned (Expression 21), i.e., the image difference d between each pixel value in the white balance adjusted image R and in the flash image $I_2$.

The dashed line shown in the motion absence section pixel area 551 shown in FIG. 13B represents an estimated value 563 of the image difference d in the motion-presence section pixel area 550 which is obtained by smoothly interpolating the value 562 of the image difference d. A calculation processing method for the estimated value 563 of the image difference d will be described later.

FIG. 13C is a view in which the result obtained by adding the estimated image difference d563 in the motion-presence section pixel area 550 shown in FIG. 13B to the value of the flash image $I_2$ 561 in the motion-presence section pixel area 550 shown in FIG. 13A is shown by a dotted line as a final white balance adjusted image R 564 in the motion-presence section pixel area 550.

This white balance adjusted image R 564 shown by the dotted line in the motion-presence section pixel area 550 in FIG. 13C and the white balance adjusted image R 560 in the motion absence section pixel area 551 are outputted as the final white balance adjusted image R. The final output image becomes an image in which the white balance adjusted image R 564 shown by the dotted line in the motion-presence section pixel area 550 shown in FIG. 13C and the white balance adjusted image R 560 in the motion absence section pixel area 551 are smoothly connected. This output image is an image in which the texture of the flash image $I_2$ 561 in the motion-presence section pixel area 550 is retained.

It is to be noted that even if not the image difference d given by the above-mentioned expression (Expression 21) but the image ratio d using the above-mentioned expression (Expression 22) is applied as d(x, y), a correction method similar to the above-mentioned method can be executed. Namely, the image ratio d is used instead of the image difference d shown in FIG. 13B, and similarly to the dotted line shown in the motion absence section pixel area 551 shown in FIG. 13B, the values of the image ratios d are smoothly interpolated in the motion-presence section pixel area 550, thereby calculating estimated values of the image ratios d in the motion-presence section pixel area 550. After that, the image ratios d are multiplied by the pixels of the flash image $I_2$ 561 in the motion-presence section pixel area 550, whereby the white balance adjusted image R of the motion-presence section pixel area 550 can be calculated.

Details of the interpolation method using the image difference or image ratio d between each pixel value in the white balance adjusted image R and in the flash image $I_2$ will be described below.

After the execution of Step S501 in the flow shown in FIG. 12, an initial value of the image difference or image ratio d(x, y) relative to each pixel of the motion-presence section pixel area 550 is found in Step S502 as preprocessing for interpolation. In the following description, reference is made to a method of finding the image difference d(x, y), but similar techniques can be applied to the case where the image ratio d(x, y) is to be found.

First, a mask image M having pixels each expressed as either one of two values is prepared, and M(x, y)=1 is set as to each pixel of the motion absence section pixel area 551, while M(x, y)=0 is set as to each pixel of the motion-presence section pixel area 550.

Each pixel of the image is checked to select a pixel (surrounded by 8 or 4 in the vicinity of pixels) which neighbors the pixels of M(x, y)=1, i.e., the motion absence section pixel area 551, from among the pixels of M(x, y)=0, i.e., the pixels of the motion-presence section pixel area 550.

Then, the average of the image differences d(x, y) of the pixels of M(x, y)=1 which neighbor the pixel of interest is calculated. This average value is set as an initial value of the image difference d(x, y) at the position of the pixel of interest.

Specific processing will be described below with reference to FIG. 14. For example, in the case of an image having the motion-presence section pixel area 550 and the motion absence section pixel area 551 as shown in FIG. 14, the initial value of the image difference d(x, y) of a pixel 581 in the motion-presence section pixel area 550 which neighbors the motion absence section pixel area 551 is set as the average value of pixels 582, 583 and 584 of the motion absence section pixel area 551 which neighbor the pixel 581.

Initial values relative to the pixels of the motion-presence section pixel area 550 which neighbor the motion absence section pixel area 551 are determined by a similar technique. Then, as to the pixel whose initial value has been newly set, the value of M(x, y) of the mask image is changed to a 1. Subsequently, after initial values have been set as to all pixels (each surrounded by 8 or 4 in the vicinity of pixels) that neighbor the pixels of M(x, y)=1, from among the pixels of M(x, y)=0, i.e., the pixels contained in the motion-presence section pixel area 550, M(x, y)=1 is set as to the pixels whose initial values have been newly set. Namely, the initial values of the image differences d(x, y) of the motion-presence section pixel area 550 are sequentially determined from the peripheral section toward the central section of the motion-presence section pixel area 550 shown in FIG. 14. This processing is repeatedly performed until all the pixels are set to M(x, y)=1.

Through this processing, the initial values of the image differences d(x, y) of all the pixels contained in the motion-presence section pixel area 550 are determined. This processing is the processing of Step S502 of the flow shown in FIG. 12

After the initial values of the image differences d(x, y) in the motion-presence section pixel area 550 have been found, the processing of Step S503 in the flow shown in FIG. 12 is executed.

In Step S503, smoothing filtering is performed on the image differences d of only the pixels of the motion-presence section pixel area 550. The smoothing filtering may make use of, for example, moving average filtering which averages pixel values contained in the vicinity of a square of n×n. From this smoothing processing, it is possible to obtain the effect of smoothly connecting only the values of the image differences d of the motion-presence section pixel area 550 while fixing the values of the image differences d of the motion absence section pixel area 551.

In this smoothing processing executed in Step S503, how each color component of the image difference d(x, y) has varied in each pixel through this smoothing filtering is checked, and the maximum value of the variation of each color component of the image difference d(x, y) (the pixel value variation maximum value) is stored in the memory.

Then, in Step S504, it is determined whether the maximum value of the variation of each color component of the image difference d(x, y) (the pixel value variation maximum value) which has been stored in the smoothing processing of Step S502 is greater than a preset threshold. If the pixel value variation maximum value is smaller, the process proceeds to Step S506, and the smoothing processing is completed.

If the maximum value of the variation of each color component of the image difference d(x, y) (the pixel value variation maximum value) which has been stored in the smoothing processing of Step S502 is greater than the preset threshold, it is determined that the image differences d of the motion-presence section pixel area 550 have not yet been smoothly interpolated, and the process proceeds to Step S505.

In Step S505, it is determined whether the number of times by which the smoothing filtering has so far been performed on the pixels of the motion-presence section pixel area 550 of the image difference d is greater than a preset threshold, and if the number of times is greater, the process proceeds to Step S506. If the number of times is smaller, the process returns to Step S503, and the smoothing filtering is again performed to again execute the smoothing processing of the motion-presence section pixel area 550.

In the case where the number of times by which the smoothing filtering has been performed on the pixels of the motion-presence section pixel area 550 of the image difference d is greater than the preset threshold, even if the smoothing filtering is repeatedly executed, no variations of the image differences d can be obtained. Accordingly, the predetermined maximum number of times of execution of the smoothing processing is determined as a threshold in advance, and if this threshold is reached, the smoothing processing is brought to an end at this point of time, and the process proceeds to the next step.

In Step S506, the image differences d in the motion-presence section pixel area 550 which have been obtained in the above-mentioned smoothing processing are determined as the estimated image differences d 563. Namely, the image differences d are determined as the estimated image differences d 563 in the motion-presence section pixel area 550 which are shown in FIG. 13B.

Then, in Step S507, the image differences d calculated from the above-mentioned processing and the flash image $I_2$ are used to generate the final white balance adjusted image R of the motion-presence section pixel area 550.

Namely, the final white balance adjusted image R of the motion-presence section pixel area 550 shown in FIG. 13C is generated. The result obtained by adding the estimated image differences d 563 in the motion-presence section pixel area 550 shown in FIG. 13B to the values of the flash image $I_2$ 561 in the motion-presence section pixel area 550 shown in FIG. 13A is set as the final white balance adjusted image R 564 in the motion-presence section pixel area 550.

The above-mentioned processing example is an example which uses the white balance adjusted image R found in accordance with the above-mentioned expression (Expression 21) and the image difference d of each pixel value of the flash image $I_2$. However, in the case where the white balance adjusted image R found in accordance with the above-mentioned expression (Expression 22) and the image difference d of each pixel value of the flash image $I_2$ are used, in Step S507, the image ratio d in the motion-presence section pixel area 550 and the elements of each pixel of the flash image $I_2$ are multiplied to generate the final white balance adjusted image R.

Through the above-mentioned processing, the final output image R can be generated.

The construction of a motion-section corrected pixel value calculation section in the present embodiment will be described below with reference to FIG. 15.

The motion-section corrected pixel value calculation section in the present embodiment is set to correspond to the motion-section corrected pixel value calculation section 310 shown in FIG. 8 mentioned previously in Embodiment 1 or the motion-section corrected pixel value calculation section 409 shown in FIG. 10.

The construction shown in FIG. 15 will be described. A motion-section corrected pixel value calculation section 710 has an image difference (image ratio) calculation section 711, a motion-presence-pixel-area image difference (image ratio) d initial value calculation section 712, a smoothing processing section 713, and a motion-section final corrected pixel value calculation section 714.

The image difference (image ratio) calculation section 711 receives the input of the motion-absence-section-pixel-area white balance adjusted image R 701 and the input of each image data of the flash image $I_2$, and calculates the image differences d or the image ratios d in a motion absence section pixel area in accordance with the above-mentioned expression (Expression 21) or (Expression 22). This processing corresponds to "d" shown in FIG. 13A.

The motion-presence-pixel-area image difference (image ratio) d initial value calculation section 712 sets the initial values of the image differences (image ratios) d in a motion-presence section pixel area. As described previously with reference to FIG. 14, this processing first sets as the initial values the average value of the image differences (image ratios) d of in the vicinity of pixels of the motion absence pixel area, which pixels are positioned in the section of the motion-presence pixel area which neighbors the motion absence pixel area, and then executes the processing of sequentially determining the initial values of the image differences (image ratios) d toward the inside of the motion-presence pixel area.

The smoothing processing section 713 executes smoothing processing using, for example, smoothing filtering, on the basis of the initial values of the motion-presence-pixel-area image difference (image ratio) d which have been set in the motion-presence-pixel-area image difference (image ratio) d initial value calculation section 712, and determines the estimated values d of the image differences (image ratios) in the motion-presence pixel area. Namely, the estimated image difference d563 in the motion-presence section pixel area 550 shown in FIG. 13B is determined.

The motion-section final corrected pixel value calculation section 714 receives the inputs of the estimated values d of the image differences (image ratios) smoothed in the smoothing processing section 713 and the flash image $I_2$, and generates the final white balance adjusted image R of the motion-presence section pixel area 550. Namely, the final white balance adjusted image R of the motion-presence section pixel area 550 shown in FIG. 13C is generated.

The result obtained by adding the estimated image differences d 563 in the motion-presence section pixel area 550 shown in FIG. 13B to the values of the flash image $I_2$ 561 in the motion-presence section pixel area 550 shown in FIG. 13A is set and outputted as the final white balance adjusted image R 564 of the motion-presence section pixel area 550.

In the case where the white balance adjusted image R found in accordance with the expression (Expression 22) and the image difference d of each pixel value of the flash image $I_2$ are used, in Step S507, the image ratio d in the motion-presence section pixel area 550 and the elements of each pixel of the flash image $I_2$ are multiplied to generate and output the final white balance adjusted image R.

As described above, according to the pixel value correction processing of the present embodiment, it is possible to perform appropriate color conversion on the motion-presence section pixel area by means of simple processing using smoothing filtering.

In the present embodiment, reference has been made to an example in which white balance adjustment processing is performed. However, the above-described technique can be used to solve not only white balance adjustment processing but also general data processing problems.

Namely, the processing of the present invention is useful in the case where, as shown in FIG. 13, certain data are defined in a certain area (the area 551 of FIG. 13) but data are to be defined in the other area (the area 550 of FIG. 13).

It is assumed that an area indicated by the area 550 shown in FIG. 13 are given and reference data 561 are given in a data area 551 adjacent to the area. At this time, interpolation data (the interpolation data 564 of FIG. 13) having the same characteristics (the texture of an image) as the reference data 561 can be generated.

This data processing can be applied to not only the white balance adjustment processing of image data in the above-mentioned embodiment but also general data processing. Namely, the present embodiment is not limited to the problem of white balance adjustment.

Embodiment 3

Embodiment 3 of the present invention will be described below with reference to a construction which adopts a technique different from those of Embodiments 1 and 2 as the processing of Step S111 in the flow of FIG. 2, i.e., a pixel value correction processing method for a motion section, in an image processing method and an image processing device both of which, similarly to the above-mentioned method and apparatus, execute optimum white balance adjustment processing for image capture under environments in which ambient light and flash light are mixed.

In Embodiment 1, reference has been made to a construction which detects a motion section of a subject from the difference between two no flash-assisted images, and as to pixels contained in the motion section, performs interpolation processing on the ratio of a reflected flash light component to a reflected ambient light component, from data in pixels other than the motion section, by using a radial basis function. In Embodiment 2, reference has been made to a construction which performs pixel value correction on a motion section by processing simplified by a smoothing filter.

Embodiment 3 provides a construction example in which sets a filter whose weight is dynamically determined according to image data of the flash image $I_2$ and performs pixel value correction on motion-presence pixels by using the set filter.

An image processing device of Embodiment 3 has a construction similar to the construction described previously with reference to FIG. 1, and filter setting processing according to image data of the flash image $I_2$ and pixel value correction processing using the filter in Embodiment 3 are executed in the digital signal processing section (DSP) 106. Details of image processing according to Embodiment 3 will be described below.

The image processing is realized in such a manner that the arithmetic unit sequentially executes operations written in predetermined program codes, on a stream of input image signals in the inside of the DSP 106. In the following, the order in which individual processing steps of the program are executed will be described with reference to a flowchart. However, the present invention may be constructed not in the form of a program which will be described in the present embodiment, but by incorporating a hardware circuit which realizes processing equivalent to functions which will be described below.

The basic sequence of the procedure of white balance (WB) correction processing in the present embodiment is the processing according to the flowchart shown in FIG. 2, similarly to Embodiments 1 and 2 mentioned previously. Namely, three images are continuously captured in the order of a flash image, a no flash-assisted image and a flash image, and white balance adjustment is performed on the basis of these images.

In the present embodiment, the pixel value correction processing of the motion section in Step S111 shown in FIG. 2 can be executed far more efficiently with far higher accuracy. The case where the white balance adjustment processing based on the above-mentioned plurality of images is performed in Step S110 shown in FIG. 2 means the case where it is determined that an image shake due to a motion of a subject itself has occurred and the image shake is correctable. As to the image area of the image shake due to the motion of the subject itself, i.e., the motion section area, in the white balance adjusted image R generated in Step S110, pixel value correction processing is executed in Step S111. Namely, exceptional processing is performed on the pixel values of the motion section detected in Step S107, thereby modifying the white balance adjusted image R. As modification processing, there is, for example, a method of inputting the pixel values of the flash image $I_2$ corresponding to the section in which the motion is detected, referring to the pixel values of a section in which a motion is absent, in the white balance adjusted image R, determining the pixel values of the section in which the motion is detected, and synthesizing a final image.

Details of pixel value correction processing according to the present embodiment will be described below.

As described in the previous embodiments, data which is acquired as the result of motion detection processing executed in Step S107 of FIG. 2 is data corresponding to the schematic view shown in FIG. 16.

In FIG. 16, the section determined to be moving in Step S107 of the flow shown in FIG. 2 is the motion-presence section pixel area 550, while the section determined to be not moving is the motion absence section pixel area 551.

The image obtained in Step S204 mentioned previously with reference to FIG. 3, i.e., the constituent pixels of the motion absence section pixel area 551 of the white balance adjusted image R, can be said to be pixels obtained by correctly subjecting the image $I_2$ taken with flash and stored in the memory in Steps S103 and S104 shown in FIG. 2 to color conversion to reduce the difference in color between flash light and ambient light. On the other hand, as to the constituent pixels of the motion-presence section pixel area 550 of the white balance adjusted image R, since the motion of the subject exerts an influence on the pixel values, it can be said that there is a high possibility that color conversion is not correctly effected.

Accordingly, as to the pixels of the motion-presence section pixel area 550, color conversion is directly applied to the flash image $I_2$ to perform the processing of finding the final white balance adjusted image R.

In Embodiment 1, the processing of Step S111 shown in FIG. 1, i.e., the pixel value correction processing of the motion section of the white balance adjusted image R, is executed as the interpolation processing using the radial basis function in accordance with the processing flow shown in FIG. 6. In Embodiment 2, correction processing using smoothing filtering is executed in accordance with the processing flow shown in FIG. 12.

In the present embodiment, the pixel value correction processing of the motion section of the white balance adjusted image R is executed in a sequence different from Embodiments 1 and 2. The sequence of the pixel value correction processing of the motion section according to the present embodiment 3 will be described below with reference to the flowchart shown in FIG. 16.

FIG. 16 is a flowchart showing the processing of Step S111 shown in FIG. 2, i.e., a detailed sequence in which the pixel value correction processing of the motion section of the white balance adjusted image R is executed in accordance with the present embodiment 3. The processing of each step will be described below.

First, in Step S601, the image difference d is found on the basis of the following expression (Expression 31) using the white balance adjusted image R generated in accordance with Step S110 shown in FIG. 2, i.e., the processing flow of FIG. 3, and the image $I_2$ taken with flash and stored in the memory in Steps S103 and S104 shown in FIG. 2:

$$d(x,y)=R(x,y)-I_2(x,y) \quad \text{(Expression 31)}$$

In this expression, d(x, y), R(x, y) and $I_2$(x, y) are vectors corresponding to the colors of the respective images at the pixel position (x, y). The above expression is executed as a vector calculation.

In the expression (Expression 31), the image difference d between each pixel value in the white balance adjusted image R and in the flash image $I_2$ is found, but instead of the difference between each pixel value in the white balance adjusted image R and in the flash image $I_2$, the ratio of each pixel value of the white balance adjusted image R to the corresponding one of the flash image $I_2$, i.e., the image ratio d, may be calculated and adopted, as given by the following expression (Expression 32):

$$d(x,y)=R(x,y)-(I_2(x,y)+e) \quad \text{(Expression 32)}$$

In the above expression (Expression 32), "e" is a vector having elements to which fully small fixed values are respectively set, for example, a floor value. The sign "/" in (Expression 32) represents the calculation of dividing the elements of a vector by the respective elements of a vector and setting the results as the respective elements of a vector. "e" is used for the purpose of preventing d(x, y) from becoming unable to be calculated when the elements of $I_2$(x, y) become 0s.

If the image difference or the image ratio d(x, y) between the white balance adjusted image R and the flash image $I_2$ is correctly found with respect to the entire image, it is possible to calculate the final white balance adjusted image R on the basis of the flash image $I_2$. Namely, it is possible to calculate R(x, y)=d(x, y)+$I_2$(x, y) or R(x, y)=($I_2$(x, y)+e)*d(x, y). Incidentally, the sign "*" represents the calculation of multiplying the elements of a vector by the respective elements of a vector and setting the results as the respective elements of a vector.

However, there is a possibility that the motion-presence section pixel area 550 appears as a motion image, so that if the image difference or the image ratio d(x, y) calculated from the above expression (Expression 31) or (Expression 32) is applied to the pixel area 550 without modification, an optimum color cannot be realized.

For this reason, in the present embodiment, final pixel values relative to the motion-presence section pixel area 550, i.e., the final white balance adjusted image R, is calculated by performing interpolation using the image difference or the image ratio d(x, y) found from the motion absence section pixel area 551. The image difference or the image ratio d(x, y) is used to perform pixel value correction of the motion-presence section 550.

According to the present method, even as to the motion-presence section pixel area 550, it is possible to generate an image having a color similar to the final white balance adjusted image R while retaining the texture of the flash image $I_2$ of the motion-presence section pixel area 550.

FIG. 18 is a view for describing the interpolation processing for finding final corrected pixel values relative to the motion-presence section pixel area 550 by using the above-mentioned (Expression 31), i.e., the expression for calculating the image difference d between each pixel value in the white balance adjusted image R and in the flash image $I_2$.

In FIG. 18, for ease of explanation, data are shown to be one-dimensionally arranged and the processing will be described on the basis of this illustration, but actually, the processing is executed on a two-dimensional plane. In each of FIGS. 18A to 18C, the horizontal axis represents pixel position, while the vertical axis represents pixel value (luminance or R, G and B values).

FIG. 18A shows the transition of pixel values of a white balance adjusted image R 860 and a flash image $I_2$ 861 in the motion absence section pixel area 551 and the motion-presence section pixel area 550.

FIG. 18B shows a value 862 of the image difference d of a section in the motion absence section pixel area 551 which is close to the motion-presence section pixel area 550. Namely, FIG. 18B shows the value 862 of the image difference d between each pixel value in the white balance adjusted image R and in the flash image $I_2$, which value 862 is calculated by using the above-mentioned (Expression 31).

The dashed line shown in the motion absence section pixel area 550 shown in FIG. 18B represents a value estimated on the basis of an image difference d value 862a and an image difference d value 862b of the motion absence section pixel area 551 close to the motion-presence section pixel area 550, i.e., an estimated value 863 of the image difference d in the motion-presence section pixel area 550 which is obtained by smoothly interpolating the values 862a and 862b of the image difference d of the motion absence section pixel area 551.

The estimated value 863 of the image difference d in the motion-presence section pixel area 550 is an estimated value determined by executing the following steps (1) and (2):

(1) a step of setting an initial image difference d; and (2) a step of correcting the initial image difference d by means of a filter whose weight is dynamically determined according to image data of the flash image $I_2$. A calculation processing method for the estimated value 863 of the image difference d in the motion-presence section pixel area 550 will be described later.

FIG. 18C is a view in which the result obtained by adding the estimated image difference d 863 in the motion-presence section pixel area 550 shown in FIG. 18B to the value of the flash image $I_2$ 861 in the motion-presence section pixel area 550 shown in FIG. 18A is shown by a dotted line as a final white balance adjusted image R 864 in the motion-presence section pixel area 550.

This white balance adjusted image R 864 shown by the dotted line in the motion-presence section pixel area 550 in FIG. 18C and the white balance adjusted image R 860 in the motion absence section pixel area 551 are outputted as the final white balance adjusted image R. The final output image becomes an image in which the white balance adjusted image R 864 shown by the dotted line in the motion-presence section pixel area 550 shown in FIG. 18C and the white balance adjusted image R 860 in the motion absence section pixel area 551 are smoothly connected. This output image is an image in which the texture of the flash image $I_2$ 861 in the motion-presence section pixel area 550 is retained.

It is to be noted that even if not the image difference d given by the above-mentioned expression (Expression 31) but the image ratio d using the above-mentioned expression (Expression 32) is applied as d(x, y), a correction method similar to the above-mentioned method can be executed. Namely, the image ratio d is used instead of the image difference d shown in FIG. 18B, and similarly to the dotted line shown in the motion absence section pixel area 551 shown in FIG. 18B, the values of the image ratios d are smoothly interpolated in the motion-presence section pixel area 550, thereby calculating estimated values of the image ratios d in the motion-presence section pixel area 550. After that, the image ratios d are multiplied by the pixels of the flash image $I_2$ 861 in the motion-presence section pixel area 550, i.e., not addition processing but multiplication processing is performed, whereby the white balance adjusted image R of the motion-presence section pixel area 550 can be calculated.

Details of the interpolation method using the image difference or image ratio d between each pixel value in the white balance adjusted image R and in the flash image $I_2$ will be described below.

As described above, the estimated value 863 of the image difference d in the motion-presence section pixel area 550 is determined by executing the following steps (1) and (2):

(1) the step of setting the initial image difference d; and (2) the step of correcting the initial image difference d by means of the filter whose weight is dynamically determined according to image data of the flash image $I_2$.

First, the processing of setting the initial value of the image difference d in the motion-presence section pixel area 550 will be described below.

After the execution of Step S601 in the flow shown in FIG. 17, an initial value of the image difference or image ratio d(x, y) relative to each pixel of the motion-presence section pixel area 550 is found in Step S602. In the following description, reference is made to a method of finding the image difference d(x, y), but similar techniques can be applied to the case where the image ratio d(x, y) is to be found.

First, a mask image M having pixels each expressed as either one of two values is prepared, and M(x, y)=1 is set as to each pixel (x, y) of the motion absence section pixel area 551, while M(x, y)=0 is set as to each pixel (x, y) of the motion-presence section pixel area 550.

Each pixel of the image is checked to select a pixel (surrounded by 8 or 4 in the vicinity of pixels) which neighbors the pixels of M(x, y)=1, i.e., the motion absence section pixel area 551, from among the pixels of M(x, y)=0, i.e., the pixels of the motion-presence section pixel area 550.

Then, the average of the image differences d(x, y) of the pixels of M(x, y)=1 which neighbor the pixel of interest is calculated. This average value is set as an initial value of the image difference d(x, y) at the position (x, y) of the pixel of interest.

Specific processing will be described below with reference to FIG. 16. For example, in the case of an image having the motion-presence section pixel area 550 and the motion absence section pixel area 551 as shown in FIG. 16, the initial value of the image difference d(x, y) of a pixel 821 in the motion-presence section pixel area 550 which neighbors the motion absence section pixel area 551 is set as the average value of pixels 822, 823 and 824 of the motion absence section pixel area 551 which neighbor the pixel 821.

Initial values relative to the pixels of the motion-presence section pixel area 550 which neighbor the motion absence section pixel area 551 are determined by a similar technique. Then, as to the pixel whose initial value has been newly set, the value of M(x, y) of the mask image is changed to a 1. Subsequently, after initial values have been set as to all pixels (each surrounded by 8 or 4 in the vicinity of pixels) that neighbor the pixels of M(x, y)=1, from among the pixels of M(x, y)=0, i.e., the pixels contained in the motion-presence section pixel area 550, M(x, y)=1 is set as to the pixels whose initial values have been newly set. Namely, the initial values of the image differences d(x, y) of the motion-presence section pixel area 550 are sequentially determined from the peripheral section toward the central section of the motion-presence section pixel area 550 shown in FIG. 16. This processing is repeatedly performed until all the pixels are set to M(x, y)=1.

Through this processing, the initial values of the image differences d(x, y) of all the pixels contained in the motion-presence section pixel area 550 are determined. This processing is the processing of Step S602 of the flow shown in FIG. 17.

After the initial values of the image differences d(x, y) in the motion-presence section pixel area 550 have been found through the above-mentioned processing, the processing of Steps S603 to S606 in the flow shown in FIG. 16 is executed. This processing is the above-mentioned processing:

(2) the step of correcting the initial image difference d by means of the filter whose weight is dynamically determined according to image data of the flash image $I_2$.

In Step S603, corrected values d' of the initial image differences d relative to only the pixels of the motion-presence section pixel area 550 from among image differences d are calculated by filtering processing using a filter.

In the present embodiment, the filter applied to the filtering processing for calculating the corrected values d' of the initial image differences d is not the smoothing filter applied to Embodiment 2 but a filter whose weight is dynamically determined according to the image data of the flash image $I_2$.

For example, the following expression is used as a calculation expression for finding an updated pixel value of the image difference d(x, y) at each pixel position (x, y) in the motion-presence section pixel area 550 by means of filtering processing corresponding to one pixel value correction process:

$$d'(x, y, ch) = \frac{1}{\sum_{i,j} w(|I_2(x, y, ch) - I_2(i, j, ch)|)} \sum_{i,j} \{w(|I_2(x, y, ch) - I_2(i, j, ch)|)d(i, j, ch)\}$$

(Expression 33)

In the above expression (Expression 33), d(x, y, ch) and $I_2$(y, y, ch) respectively represent a difference image d of each channel [ch] at the pixel position (x, y) and the pixel value of the flash image $I_2$. The term "channel" means each channel for a color image, specifically, each of red, green and blue (RGB) channels. In addition, d'(x, y, ch) represent a new pixel value, i.e., an updated pixel value, of the difference image d of each channel [ch] at the pixel position (x, y).

In addition, i and j of the above expression (Expression 33) represent the positions of reference pixels which are used for calculating the updated value d' of the pixel difference value d at the pixel position (x, y). The ranges of the values of i and j are x−k≦i≦x+k and y−k≦j≦y+k, respectively, where k is a natural number, and a comparatively small value of approximately 1 to 3 is set as k.

In the case of k=1, the reference pixels which are used for calculating the updated value d' of the pixel difference value d at the pixel position (x, y) are only pixels in the vicinity of the pixel position (x, y). In the case of k=3, the reference pixels which are used for calculating the updated value d' of the pixel difference value d at the pixel position (x, y) are set as an area which contains three pixels arranged on each of the right, left, top and bottom sides surrounding the pixel position (x, y). The value of k is a preset value.

In the above expression (Expression 33), the function w(x) is a weighting function, for example, a function expressed by the following expression (Expression 34):

$$w(x) = \exp\left(-\frac{x^2}{2\sigma^2}\right) \quad \text{(Expression 34)}$$

In the above expression (Expression 34), a is a parameter which uses a preset value.

The value of the image difference d(x, y) at the pixel position (x, y) in the motion-presence section pixel area 550 is calculated from the above expression (Expression 33) by using the weighting function w(x) shown in the above expression (Expression 34).

As shown in the flow of FIG. 17, the processing of updating the value of the image difference d(x, y) at the pixel position (x, y) in the motion-presence section pixel area 550 by using the above expression (Expression 33), i.e., filtering processing, is repeatedly executed until a predetermined condition (a condition to be defined in Step S604 or S605) is satisfied. Namely, in the next filtering processing, the updated pixel value d'(x, y, ch) calculated from the above expression (Expression 33) is set as the value of d(x, y, ch) of the expression (Expression 33), and the processing of calculating a new updated pixel value d'(x, y, ch) is repeatedly executed.

The pixel value updating (filtering processing) by the above expression (Expression 33) is repeatedly executed to correct the value of the image difference d(x, y) at the pixel position (x, y) in the motion-presence section pixel area 550, whereby the value of the image difference d(x, y) at the pixel position (x, y) in the motion-presence section pixel area 550 is corrected without changing the value of the image difference d(x, y) of the motion absence section pixel area 551. Accordingly, it is possible to obtain the effect of smoothing the value of the image difference d(x, y) at the pixel position (x, y) in the motion-presence section pixel area 550 in accordance with the texture and edges of the flash image $I_2$ 861.

How each color component (each channel) of the value of the image difference d(x, y) at the pixel position (x, y) in the motion-presence section pixel area 550 has varied in this filtering processing is checked, and the maximum value of the variation of each color component is stored.

Then, in Step S604 of the flow shown in FIG. 17, a comparison is made between the maximum value of the variation of each color component (each channel) of the value of the image difference d(x, y) and a preset threshold, by the pixel value updating (filtering processing) using the above expression (Expression 33). Namely, if a difference d'–d between the updated value d' obtained by one filtering processing (the pixel value updating processing using Expression 33) and the pixel value d before updating is smaller than the preset threshold, it is determined that even if the filtering processing (the pixel value updating processing using Expression 33) is repeatedly executed, the amount of variation of the pixel value is small and the continuation of the processing only provides a small effect. Accordingly, the process brings the pixel value updating processing to an end, and proceeds to Step S606.

Namely, in Step S604, if it is determined that "maximum value of pixel value variation amount>threshold" is not satisfied, the process proceeds to Step S606, and executes the processing of determining an image difference (image ratio) d estimated value relative to the motion-presence section pixel area 550.

In Step S604, if it is determined that "maximum value of pixel value variation amount>threshold" is satisfied, it is determined that the image difference d(x, y) at the pixel position (x, y) in the motion-presence section pixel area 550 has not yet been smoothly corrected, and the process proceeds to Step S605.

In Step S605, it is determined whether the number of times by which the pixel value updating processing (filtering processing) has been executed in Step S603 by using the above-mentioned expression (Expression 33) is greater than a preset threshold number. If "number of times of execution of pixel value updating processing (filtering processing)>threshold number" is satisfied, the process proceeds to Step S606.

If "number of times of execution of pixel value updating processing (filtering processing)>threshold number" is not satisfied, the process returns to Step S603 and repeatedly executes the processing (filtering processing) of correcting the image difference d(x, y) at the pixel position (x, y) in the motion-presence section pixel area 550 in accordance with the above-mentioned expression (Expression 33).

If it is determined in Step S604 that "maximum value of pixel value variation amount>threshold" is not satisfied, or if it is determined in Step S605 that "number of times of execution of pixel value updating processing (filtering processing)> threshold number" is satisfied, the processing (filtering processing) of correcting the image difference d(x, y) at the pixel position (x, y) in the motion-presence section pixel area 550 in accordance with the above-mentioned expression (Expression 33) is completed, and the process proceeds to Step S606 and executes the processing of determining an estimated value of the image difference (image ratio) d relative to the motion-presence section pixel area 550.

In Step S606, the image difference d in the motion-presence section pixel area 550 which has been found in the above-mentioned filtering processing is determined as an estimated image difference d. The image difference d(x, y) at the pixel position (x, y) in the motion-presence section pixel area 550 which has been calculated by this processing corresponds to the estimated image difference d 863 in the motion-presence section pixel area 550 shown in FIG. 18B.

Then, in Step S607, the processing of adding together the values (the estimated image differences d 863 shown in FIG. 18B) of the image differences d(x, y) at the pixel positions (x, y) in the motion-presence section pixel area 550 which value have been calculated by the filtering processing using the above-mentioned expression (Expression 33) and the flash image $I_2$ (the flash captured image $I_2$ 861 shown in FIG. 18A) is executed to generate the white balance adjusted image R in the motion-presence section pixel area 550. Namely, from $$R = I_2 + d,$$

the pixel values of the white balance adjusted image R in the motion-presence section pixel area 550 are calculated.

This result is the white balance adjusted image R 864 shown by a dashed line in the motion-presence section pixel area 550 of FIG. 18C. A final corrected image, i.e., the white balance adjusted image R, is an image in which the white balance adjusted image R 860 in the motion absence section pixel area 551 and the white balance adjusted image R 864 shown by the dashed line in the motion-presence section pixel area 550 are connected.

As shown in FIG. 18C, the final white balance adjusted image R is an image in which the white balance adjusted image R 864 shown by the dashed line in the motion-presence section pixel area 550 and the white balance adjusted image R 860 in the motion absence section pixel area 551 are smoothly connected. Further, this output image is an image in which the texture of the flash image $I_2$ 861 in the motion-presence section pixel area 550 is retained.

It is to be noted that even if not the image difference d given by the above-mentioned expression (Expression 31) but the image ratio d using the above-mentioned expression (Expression 32) is used, a correction method similar to the above-mentioned method can be executed. In this case, in Step S607, the processing of multiplying the values of the image ratios d(x, y) at the pixel positions (x, y) in the motion-presence section pixel area 550 which value are calculated by filtering processing using the image ratios d by the flash image $I_2$ is executed to generate the white balance adjusted image R in the motion-presence section pixel area 550. Namely, from $$R = I_2 \times d,$$

the pixel values of the white balance adjusted image R in the motion-presence section pixel area 550 are calculated.

Namely, the image ratio d is used instead of the image difference d shown in FIG. 18B, and similarly to the dashed line shown in the motion absence section pixel area 551 shown in FIG. 18B, the values of the image ratios d are smoothly interpolated in the motion-presence section pixel area 550, thereby calculating estimated values of the image ratios d in the motion-presence section pixel area 550. After that, the image ratios d are multiplied by the pixels of the flash image $I_2$ 561 in the motion-presence section pixel area 550, whereby the white balance adjusted image R of the motion-presence section pixel area 550 can be calculated.

The construction of a motion-section corrected pixel value calculation section in the present embodiment will be described below with reference to FIG. 19.

The motion-section corrected pixel value calculation section in the present embodiment is set to correspond to the motion-section corrected pixel value calculation section 310 shown in FIG. 8 mentioned previously in Embodiment 1 or the motion-section corrected pixel value calculation section 409 shown in FIG. 10.

The construction shown in FIG. 19 will be described. A motion-section corrected pixel value calculation section 910 has an image difference (image ratio) calculation section 911, a motion-presence-pixel-area image difference (image ratio) d initial value calculation section 912, a filtering processing section 913, and a motion-section final corrected pixel value calculation section 914.

The image difference (image ratio) calculation section 911 receives the input of a motion-absence-section-pixel-area white balance adjusted image R 901 and the input of each image data of the flash image $I_2$ which is stored in a flash image $I_2$ storing frame memory 902, and calculates the image differences d or the image ratios d in a motion absence section pixel area in accordance with the above-mentioned expression (Expression 31) or (Expression 32). This processing corresponds to the image difference d 862 in the motion absence section pixel area 551 which is shown in FIG. 18B.

The motion-presence-pixel-area image difference (image ratio) d initial value calculation section 912 sets the initial values of the image differences (image ratios) d in a motion-presence section pixel area. As described previously with reference to FIG. 16, this processing first sets as the initial values the average value of the image differences (image ratios) d of in the vicinity of pixels of the motion absence pixel area, which pixels are positioned in the section of the motion-presence pixel area which neighbors the motion absence pixel area, and then executes the processing of sequentially determining the initial values of the image differences (image ratios) d toward the inside of the motion-presence pixel area.

The filtering processing section 913 executes the filtering processing of updating the initial values of the motion-presence-pixel-area image differences (image ratios) d which have been set in the motion-presence-pixel-area image difference (image ratio) d initial value calculation section 912, in accordance with the above-mentioned expression (Expression 33). This filtering processing is filtering processing using a filter generated on the basis of the flash image $I_2$, i.e., filtering processing which performs updating in accordance with the above-mentioned expression (Expression 33).

The filtering processing section 913, as described with reference to the flow shown in FIG. 17, brings the filtering processing using the expression (Expression 33) to an end on the condition that the maximum variation of the pixel values by one filtering processing is smaller than a preset threshold or the number of times of filtering processing is greater than a preset threshold number, and determines the estimated values d of the image differences (the image ratios) in the motion-presence pixel area. Namely, the estimated image difference d 863 in the motion-presence section pixel area 550 shown in FIG. 18B is determined.

The motion-section final corrected pixel value calculation section 914 receives the inputs of the estimated values d of the image differences (image ratios) subjected to the filtering processing in the filtering processing section 913 and the flash image $I_2$ from the image $I_2$ storing frame memory 902, and generates the final white balance adjusted image R of the motion-presence section pixel area 550. Namely, the final white balance adjusted image R of the motion-presence section pixel area 550 shown in FIG. 18C is generated.

The result obtained by adding the estimated image differences d 863 in the motion-presence section pixel area 550 shown in FIG. 18B to the values of the flash captured image $I_2$ 861 in the motion-presence section pixel area 550 shown in FIG. 18A is set and outputted as the final white balance adjusted image R 864 of the motion-presence section pixel area 550 shown in FIG. 18C.

In the case where the white balance adjusted image R found in accordance with the expression (Expression 32) and the image difference d of each pixel value of the flash captured image $I_2$ are used, the image ratio d in the motion-presence section pixel area 550 and the elements of each pixel of the flash captured image $I_2$ are multiplied to generate and output the final white balance adjusted image R.

As described above, according to the pixel value correction processing of the present embodiment, it is possible to perform appropriate color conversion on the motion-presence section pixel area by means of processing using a filter, whereby the corrected pixel values in the motion-presence section pixel area become pixel values which retain the texture of the flash captured image $I_2$ and a far more natural image can be generated.

When processing using the smoothing filter according to the second embodiment is executed, it is difficult to perform pixel correction corresponding to the image differences or the image ratios of an original image, and the fuzziness of edge sections and the blur of colors may occur according to the kind of image. However, the present embodiment adopts a construction which sets, in accordance with Expression 33, a pixel value conversion expression using a coefficient determined to take into account the pixel values of a second image, i.e., the flash image $I_2$, and performs the filtering processing. Accordingly, pixel value correction which reflects the texture of the flash image $I_2$ is performed and the fuzziness of edge sections, the blur of colors and the like are solved even in the motion-presence area, whereby it is possible to generate an image which reflects the texture of the flash image $I_2$.

In the present embodiment, reference has been made to an example in which white balance adjustment processing is executed, but the above-mentioned technique according to the present invention can be applied to not only white balance adjustment processing but also the case where a section of an image is to be modified to become similar to the feature of another image, in, for example, image processing which modifies the pixel values of a section of a certain image. Namely, a pixel value conversion expression using a coefficient determined by using the feature of a second image is set in accordance with Expression 33, and filtering processing is performed to modify the pixel values of a section of a first image, whereby it is possible to generate an image which has the feature of the second image while retaining the color of the first image.

Embodiment 4

Each of the above-mentioned Embodiments 1 to 3 has a construction which continuously captures three images, i.e., a no flash-assisted image, a flash image and a no flash-assisted image, and generates one output image. In each of the above-mentioned embodiments, it is assumed that these three images have the same resolution. However, since it is expected that processing is executed on an image having a resolution of, for example, several million pixels, image data for three images need to be stored in order to execute this processing, and further, a memory having a large capacity capable of storing various processing image data becomes necessary. Accordingly, with the increase of the number of pixels, the amount of calculations to be executed becomes huge.

In the apparatus construction shown in FIG. 1, if, for example, a CCD (Charge Coupled Device) is used as the solid state image pickup element 103, it is difficult to continuously capture an image of several million pixels at high speed. General digital cameras have the function of, reading an image of low resolution from the solid state image pickup element 103 at high speed and successively displaying the image on a camera-attached display, at intervals of, for example, 1/30 second during image capture, The present embodiment provides a construction example capable of solving the difference in color temperature between ambient light and flash light efficiently at high speed by using an image of low resolution captured in this manner.

A block diagram showing an image processing device and an image pickup apparatus according to the present embodiment is similar to FIG. 1, and the description of the block diagram is similar to the previous description and is omitted herein.

FIG. 20 is a flowchart for describing the processing procedure of the present embodiment. Each step of the flowchart shown in FIG. 20 will be described below.

First, in Step S701, image capture is performed without flash by using an aperture and a shutter speed which are set in advance, and in Step S702, a low resolution image $I_{1L}$ based on the image taken in Step S701 is stored in the memory. The low resolution image $I_{1L}$ is an image having a resolution lower than the resolution of the original captured image of the solid state image pickup element 103 (refer to FIG. 1). Various methods for generating the low resolution image $I_{1L}$ from a picked-up high resolution image are available. For example, there are a method of simply sub sampling pixels and a method of finding the average of a plurality of in the vicinity of pixels and forming one new pixel. As mentioned above, general digital cameras have the function of displaying an image picked up by the solid state image pickup element 103 during image capture on a low resolution display at a speed of, for example, 30 frames per second, and the method used at this time can be applied without modification.

When the no flash-assisted low resolution image $I_{1L}$ based on the image taken in Step S701 is to be stored in the memory, the storing processing can be executed as low resolution image data storing processing, so that the amount of data to be stored in the memory is small and the processing time required to store the data in the memory is reduced. Accordingly, the process can proceed to the next step at high speed.

Then, in Step S703, an image is taken with flash, and in Step S704, two images, i.e., a flash-assisted high resolution image $I_{2H}$ based on the image taken in Step S703 and a flash-assisted low resolution image $I_{2L}$, are stored in the memory. The flash-assisted low resolution image $I_{2L}$ is a low resolution image having the same resolution as the no flash-assisted low resolution image $I_{1L}$, and is found by the same method as the above-mentioned one. The flash-assisted high resolution image $I_{2H}$ is an image which has the desired resolution to be finally outputted and is higher in resolution than the no flash-assisted low resolution image $I_{1L}$ and the flash-assisted low resolution image $I_{2L}$.

Then, in Step S705, an image is again taken without flash, and in Step S706, a no flash-assisted low resolution image $I_{3L}$ based on the image taken in Step S705 is stored in the memory. The no flash-assisted low resolution image $I_{3L}$ is an image having the same resolution as the no flash-assisted low resolution image $I_{1L}$ and the flash-assisted low resolution image $I_{2L}$, and is found by the same method as the above-mentioned one.

The next processing of Steps S707 to S713 is completely the same as the processing of Steps S107 to S113 of the flowchart of FIG. 2 mentioned in the previous embodiment, and the description thereof is omitted.

However, target image data to be processed in the processing of Steps S707 to S713 are low resolution images, i.e., the no flash-assisted low resolution image $I_{1L}$, the flash-assisted low resolution image $I_{2L}$ and the no flash-assisted low resolution image $I_{3L}$. The white balance adjusted image R is generated on the basis of these low resolution images. As to a motion section, the white balance adjusted image R is generated which has corrected pixel values calculated by the processing using the Radial Basis Function (radial basis function) mentioned previously in Embodiment 1, the processing based on the smoothing processing using the smoothing filter mentioned previously in Embodiment 2, the processing using the filter for which a weight based on a flash captured image is set as mentioned in Embodiment 3, or the like.

Finally, in Step S714, a high resolution final image $R_H$ is generated on the basis of the white balance adjusted image R generated on the basis of the low resolution images, the flash-assisted low resolution image $I_{2L}$ and the flash-assisted high resolution image $I_{2H}$.

First, pixel values at pixel positions $I_{2L}(x', y')$ and $R(x', y')$ relative to the respective positions $(x', y')$ of the flash-assisted low resolution image $I_{2L}$ and the white balance adjusted image R are found with respect to each pixel $I_{2H}(x, y)$ of the flash-assisted high resolution image $I_{2H}$.

Incidentally, x' and y' are not necessarily integers. As the method of finding pixel values at $(x', y')$, generally widely used image interpolation techniques such as nearest in the vicinity of methods, bilinear methods and bicubic methods are employed.

Then, the ratio of the pixel value of the pixel $R(x', y')$ of the white balance adjusted image R generated on the basis of the low resolution images to the pixel value of the corresponding pixel $I_{2L}(x', y')$ of the flash-assisted low resolution image $I_{2L}$ is found.

With respect to this pixel value ratio based on the low resolution image data:

$$R(x',y'):I_{2L}(x',y'),$$

a pixel value ratio based on the high resolution image data is set:

$$R_H(x,y):I_{2H}(x,y).$$

Since each pixel value of the flash-assisted high resolution image $I_{2H}$ is known, the pixel $I_{2H}(x, y)$ and the pixel value ratio based on the low resolution image data: $R(x', y'):I_{2L}(x', y')$ are multiplied to calculate the pixel $R_H(x, y)$ of a high resolution final image $R_H$.

This calculation is performed on all the pixels of the flash-assisted high resolution image $I_{2H}$ to generate the final high resolution white balance adjusted image $R_H$. Namely, conversion information for converting the flash-assisted low resolution image $I_{2L}$ to the white balance adjusted image R is acquired from the low resolution images, and on the basis of this conversion information, the processing of converting each pixel value of the high resolution image, i.e., the flash-assisted high resolution image $I_{2H}$, is executed to generate the high resolution white balance adjusted image $R_H$.

According to this processing method, the target image data processed in the processing of Steps S707 to S713 are the low resolution images, i.e., the no flash-assisted low resolution image $I_{1L}$, the flash-assisted low resolution image $I_{2L}$ and the no flash-assisted low resolution image $I_{3L}$, and Steps S707 to S713 are executed as the processing of generating the white balance adjusted image R based on the low resolution images. Accordingly, the number of pixels is reduced and the amounts of calculations are also reduced, whereby high speed processing becomes possible. As to correction processing for a motion section as well, it is possible to achieve high speed processing in any processing such as the processing using the Radial Basis Function (radial basis function) mentioned previously in Embodiment 1, or the processing based on the smoothing processing using the smoothing filter mentioned previously in Embodiment 2, or the processing using the filter in which a weight based on a flash captured image is set as mentioned in Embodiment 3.

In addition, since only the low resolution image data of each of the two no flash-assisted captured image data needs to be stored in the memory, the present embodiment can also be applied to apparatuses and models having small memory capacities.

Accordingly, the processing of the present embodiment can also be executed in models and apparatuses which use processors having comparatively low processing capabilities and have small memory capacities, and enable these models and apparatuses to output finally obtained image data as high resolution white balance adjusted image data.

The present invention has been described above in detail with reference to particular embodiments. However, it is obvious that those skilled in the art can make modifications and substitutions without departing from the spirit of the present invention. Namely, the foregoing is illustrative of the present invention and is not to be construed as limiting the present invention. The spirit of the present invention is to be understood from the appended claims. Incidentally, in each of the above-mentioned embodiments, the term "flash" has been used to describe an illuminating device which emits light in the case of a dark subject, but this device is also called a strobe. Accordingly, the present invention is not limited to flashes and can be generally applied to illuminating devices which emit light in the case of dark subjects.

The sequence of processing mentioned hereinabove can be executed by hardware, software or a complex construction of both hardware and software. In the case where processing using software is to be executed, a program which records a processing sequence may be installed in an executable state in a memory of a computer incorporated in dedicated hardware, or a program may be installed in an executable state in a general-purpose computer capable of executing various kinds of processing.

For example, the program can be recorded in advance on hard disks or ROMs (Read Only Memories) which serve as recording media. Otherwise, the program can be temporarily or permanently stored (recorded) in removable recording media such as flexible discs, CD-ROMs (Compact Disc Read Only Memories), MO (Magneto-optical) discs, DVDs (Digital Versatile Discs), magnetic discs and semiconductor memories. These removable recording media can be provided as so-called package software.

The program is not only installed into the computer from the above-mentioned type of recording medium, but also may be wirelessly transmitted from a download site to the computer or may be wire-transmitted to the computer via a network such as a LAN (Local Area Network) or the Internet. The computer receives the program transmitted in this manner, and can install the program into a recording medium such as an internal hard disk.

It is to be noted that the various kinds of processing described in the specification are not only executed on a time-series basis according to the description, but may also be executed in parallel or individually according to the processing capability or requirements of an apparatus which executes processing. In addition, the term "system" used herein means a logical collection construction of a plurality of devices, and is not limited to a construction in which individual constituent devices are incorporated in the same housing.

INDUSTRIAL APPLICABILITY

As described hereinabove, according to the preferred embodiment of the present invention, it is possible to efficiently execute correction processing of the pixel values of a particular area such as a motion-presence area on the basis of pixel values of a motion absence area, for example, white balance adjusted image data, and flash image data of the particular area such as the motion-presence area. Accordingly, it is possible to generate an image smoothly connected to the white balance adjusted image data, and it is also possible to generate an image which reflects texture information on the flash image data of the motion-presence area. Accordingly, the present invention can be applied to digital cameras which capture images having motion, and the like.

According to the preferred embodiment of the present invention, in pixel value correction processing for a motion-presence area, after initial values of the difference or the ratio between white balance adjusted image data and flash image data are set in the motion-presence area, smoothing is performed by a smoothing filter and estimated values of the image difference or the image ratio in the motion-presence area are calculated to execute pixel value correction of the motion-presence area on the basis of the estimated values, whereby high speed processing using reduced amount of calculation is realized. Accordingly, the present invention can be applied to digital cameras which capture images having motion, and the like.

Furthermore, according to the pixel value correction processing described as the third embodiment of the present invention, it is possible to perform appropriate color conversion of a motion-presence section pixel area by means of processing using a filter, and corrected pixel values relative to the motion-presence section pixel area become pixel values which retain the texture of a flash captured image $I_2$, whereby it is possible to generate a far more natural image. When processing using a smoothing filter is executed, it is difficult to perform pixel correction corresponding to the image difference or the image ratio of an original image, and the fuzziness of edge sections and the blur of colors may occur according to the kind of image. However, according to the pixel value correction processing described as the third embodiment, there is provided a construction which performs filtering processing according to a pixel value conversion expression using a coefficient determined to take into account the pixel values of the flash captured image $I_2$. Accordingly, pixel value correction which reflects the texture of the flash captured image $I_2$ is performed and the fuzziness of edge sections, the blur of colors and the like are solved even in the motion-presence area, whereby it is possible to generate an image which reflects the texture of the flash captured image $I_2$.

Furthermore, according to the present invention, after white balance adjustment using low resolution images and pixel value correction of a motion-presence section have been executed, it is possible to generate a high resolution corrected image on the basis of the correspondence of corrected image data to low resolution image data, whereby high speed processing can be achieved with a small memory amount and a high resolution corrected image can be finally acquired. Accordingly, the present invention is suitable for digital cameras having limited memory amounts.

BRIEF DESCRIPTION OF THE DRAWINGS

FIG. 2 is a flowchart for describing the procedure of an image processing method of the present invention;

FIG. 3 is a flowchart for describing the procedure of white balance adjustment processing based on a plurality of image data in the image processing method of the present invention;

FIG. 5 is a view for describing motion section detection processing based on a plurality of image data in image processing of the present invention;

FIG. 6 is a flowchart for describing pixel value adjustment processing for a motion section in the image processing of the present invention;

FIG. 7 is a view for describing pixel value adjustment processing for a motion section in the image processing of the present invention;

FIG. 20 is a flowchart for describing processing in a fourth embodiment of the present invention.

EXPLANATIONS OF NUMERALS

Figure 1:
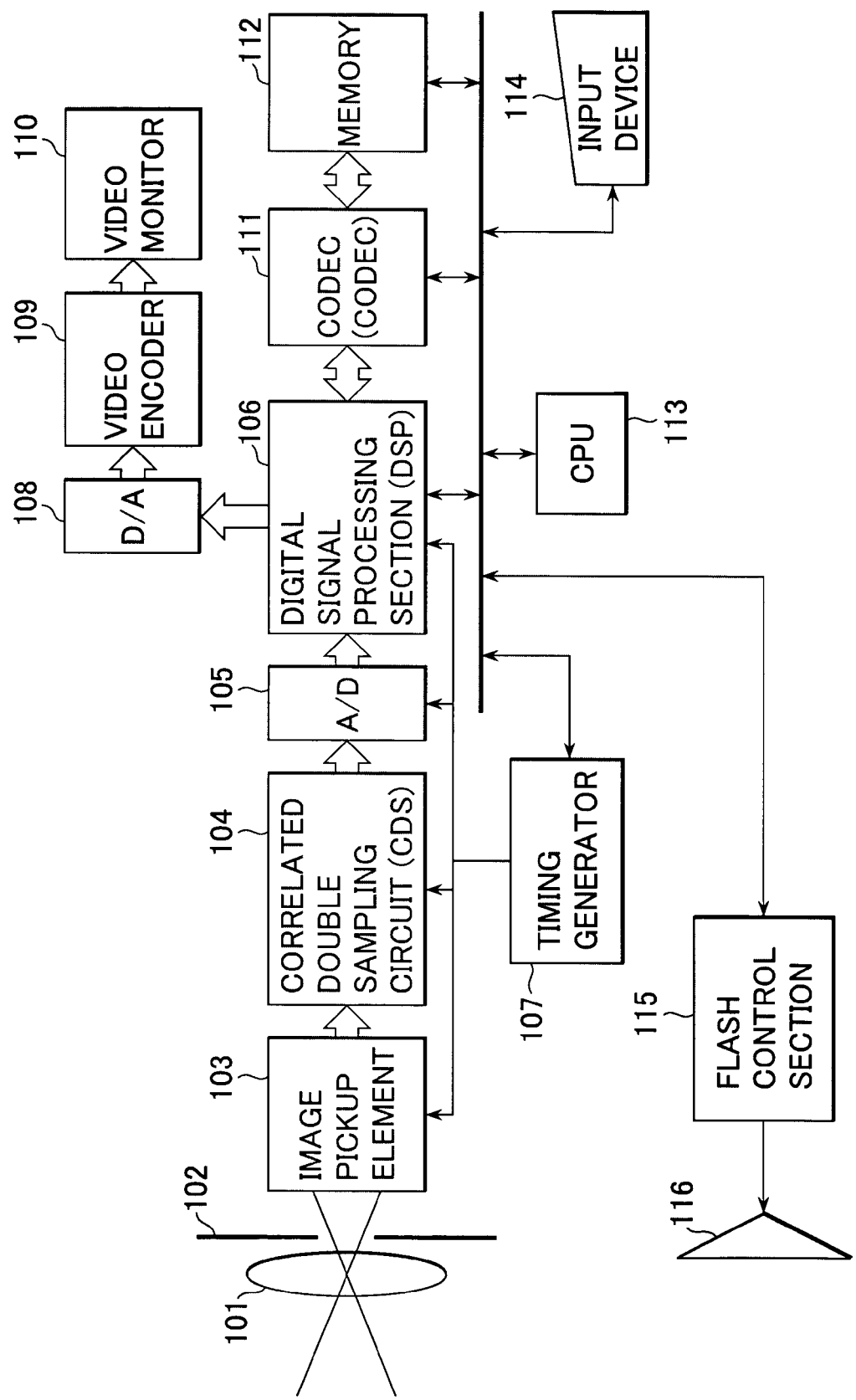
FIG. 1 is a view showing the construction of an image processing device of the present invention.
Figure 4A:
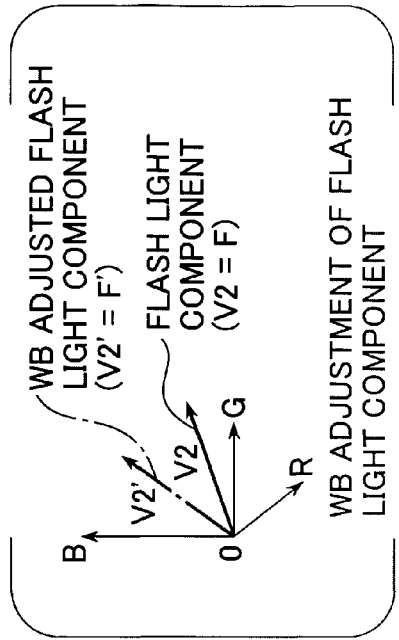
FIG. 4 is a view for describing the principle of the white balance adjustment processing based on a plurality of image data in the image processing method of the present invention.
Figure 4B:
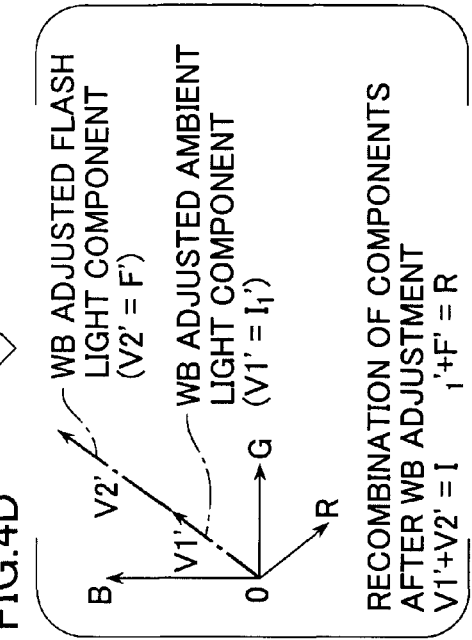
Figure 4C:
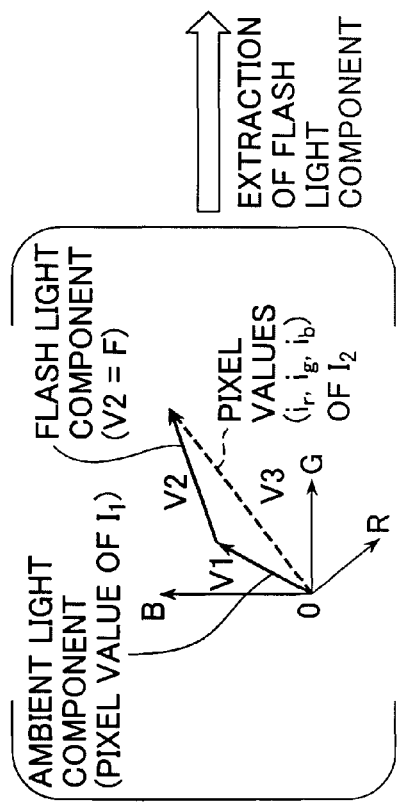
Figure 4D:
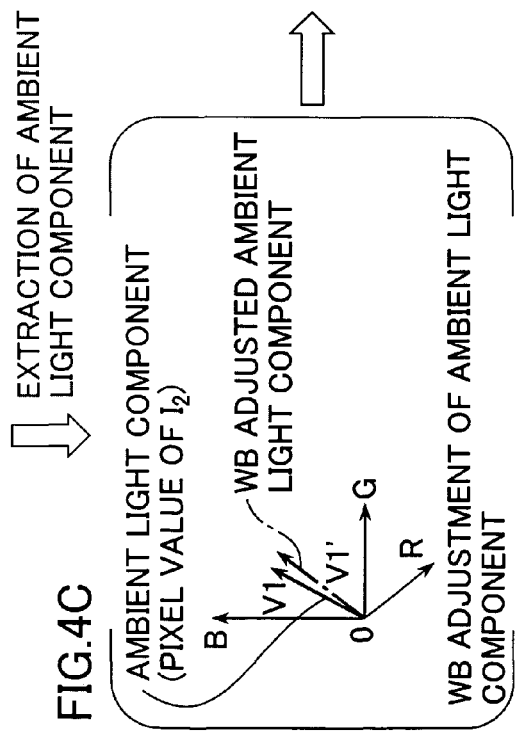
Figure 8:
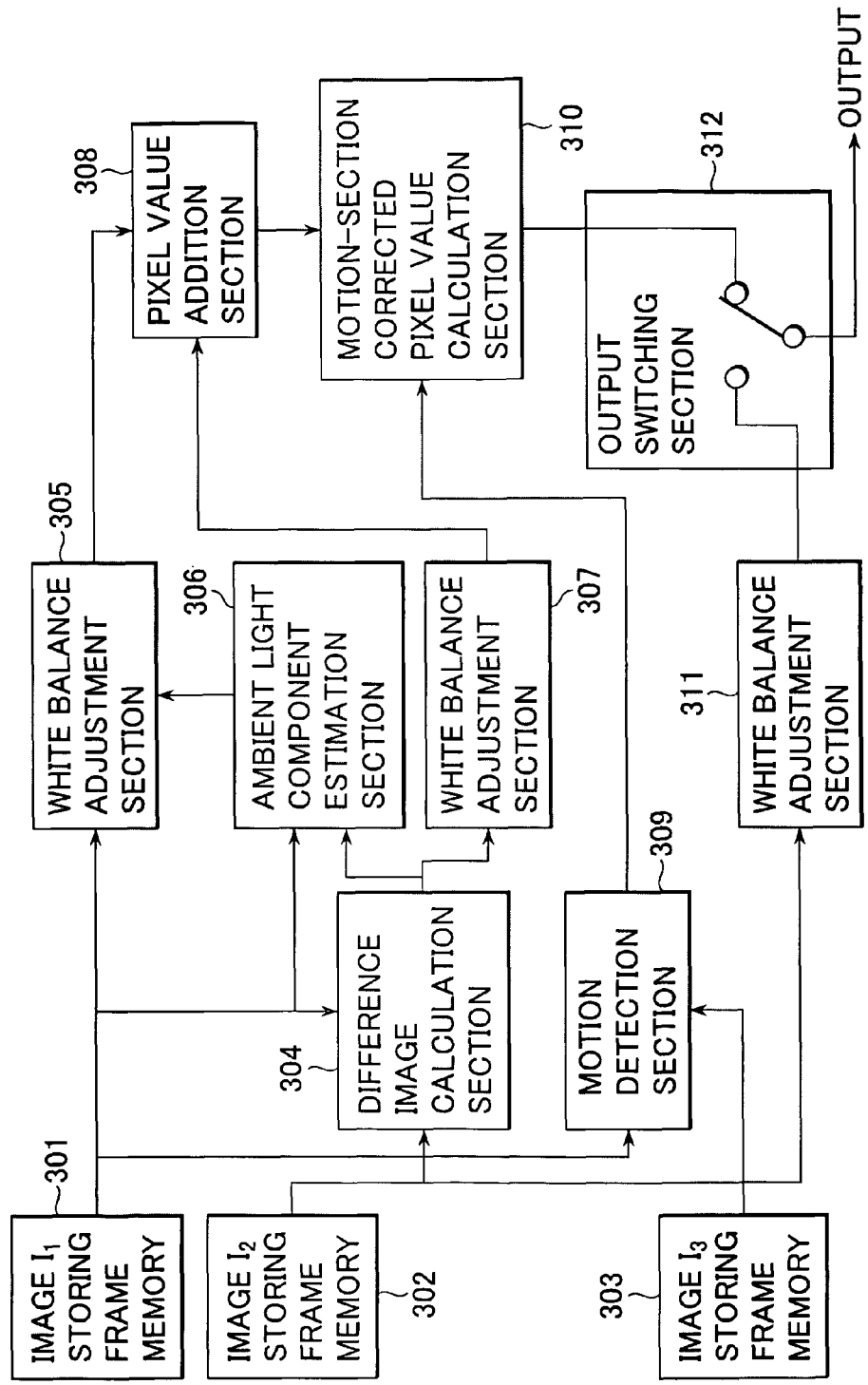
FIG. 8 is a view for describing a mechanism which executes pixel value adjustment processing based on a plurality of image data in the image processing of the present invention.
Figure 9:
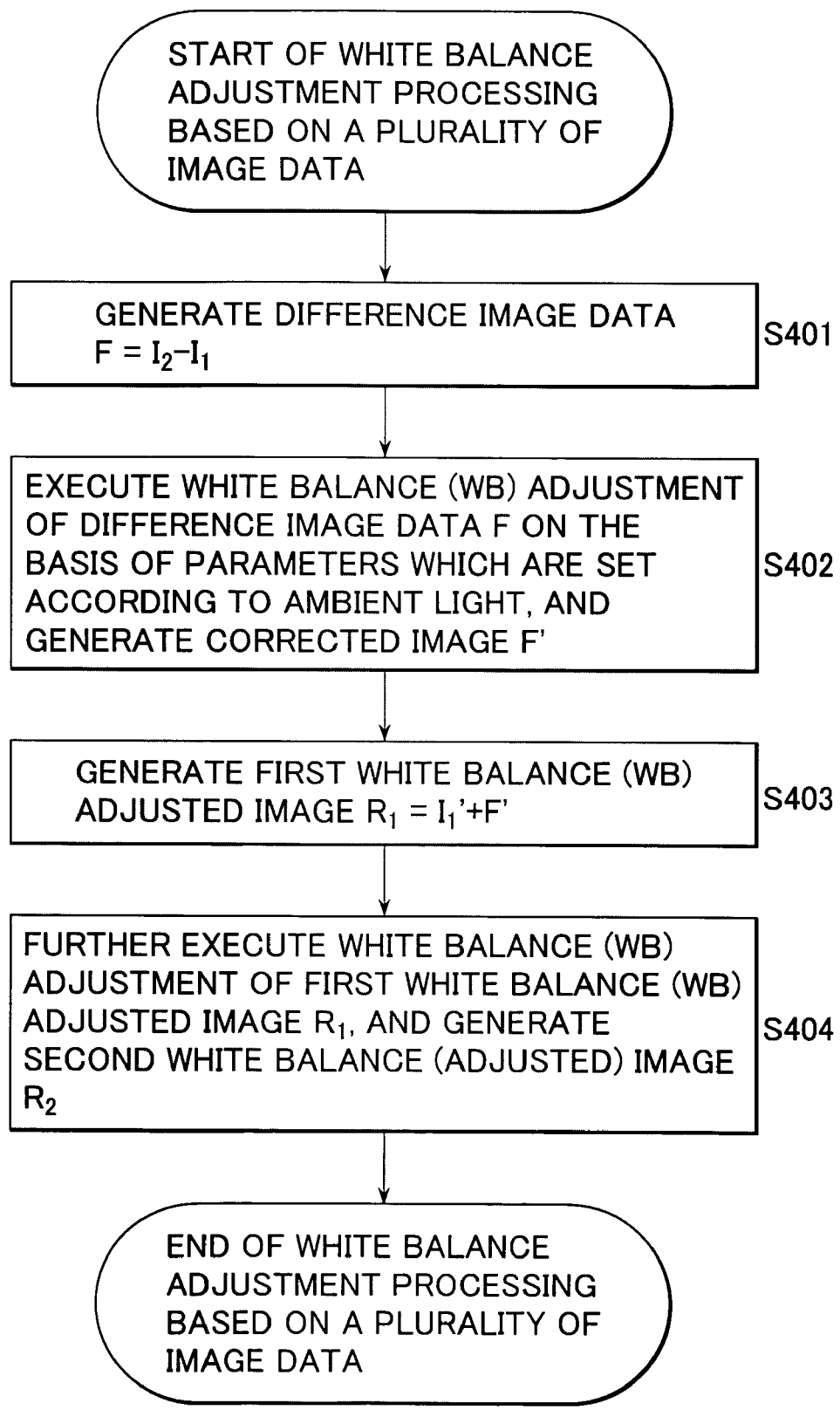
FIG. 9 is a flowchart for describing the procedure of white balance adjustment processing based on a plurality of image data in the image processing method of the present invention.
Figure 10:
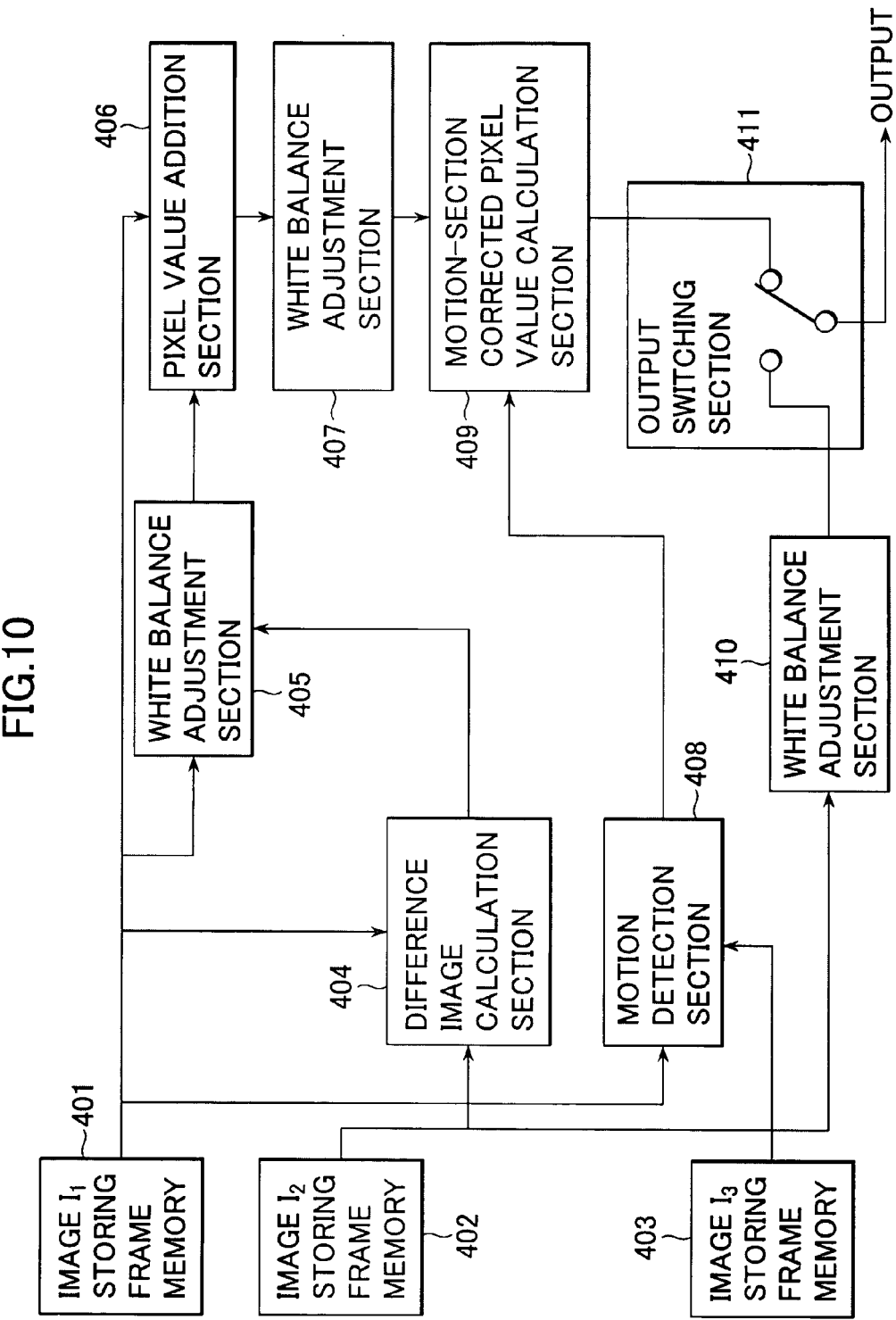
FIG. 10 is a view for describing a mechanism which executes pixel value adjustment processing based on a plurality of image data in the image processing of the present invention.
Figure 11:
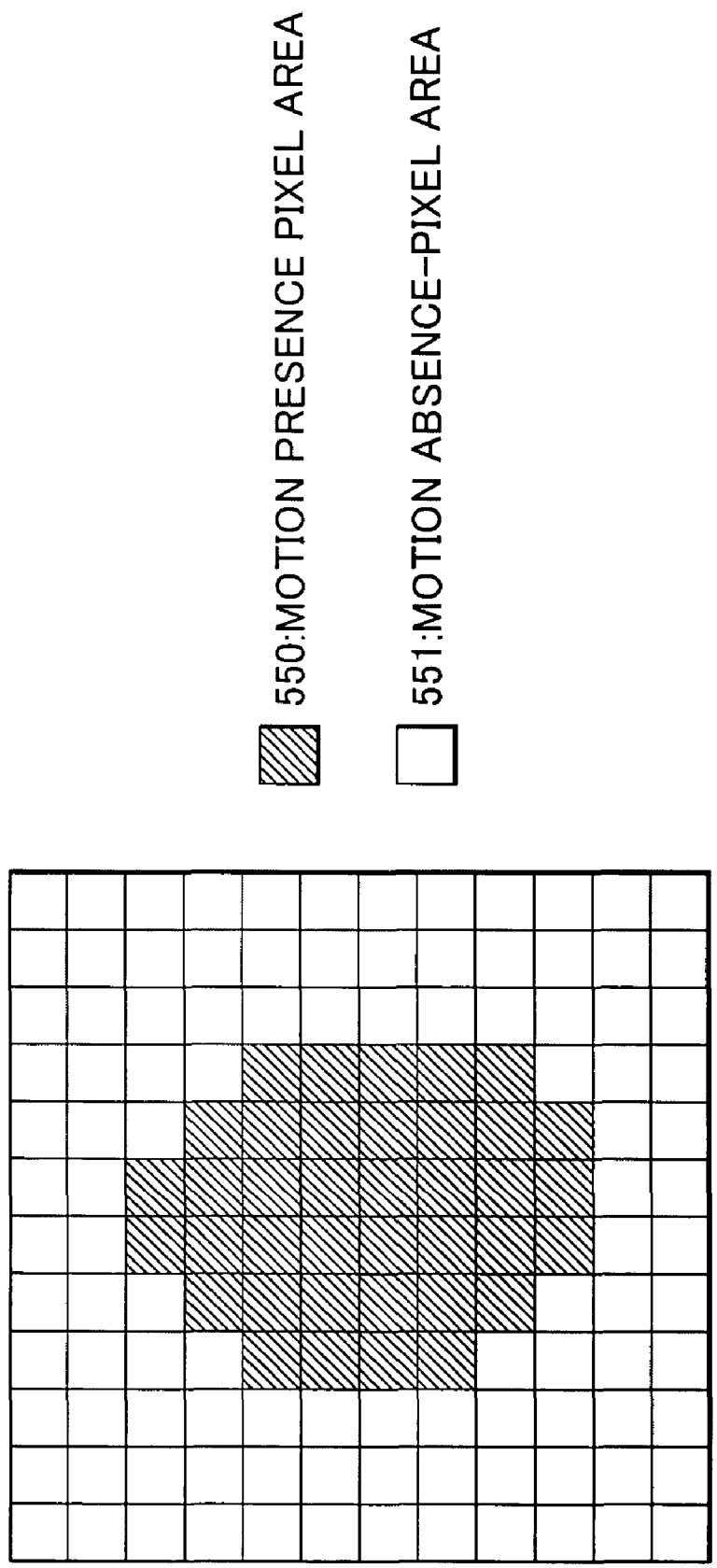
FIG. 11 is a view for describing pixel value adjustment processing for a motion section in the image processing of the present invention.
Figure 12:
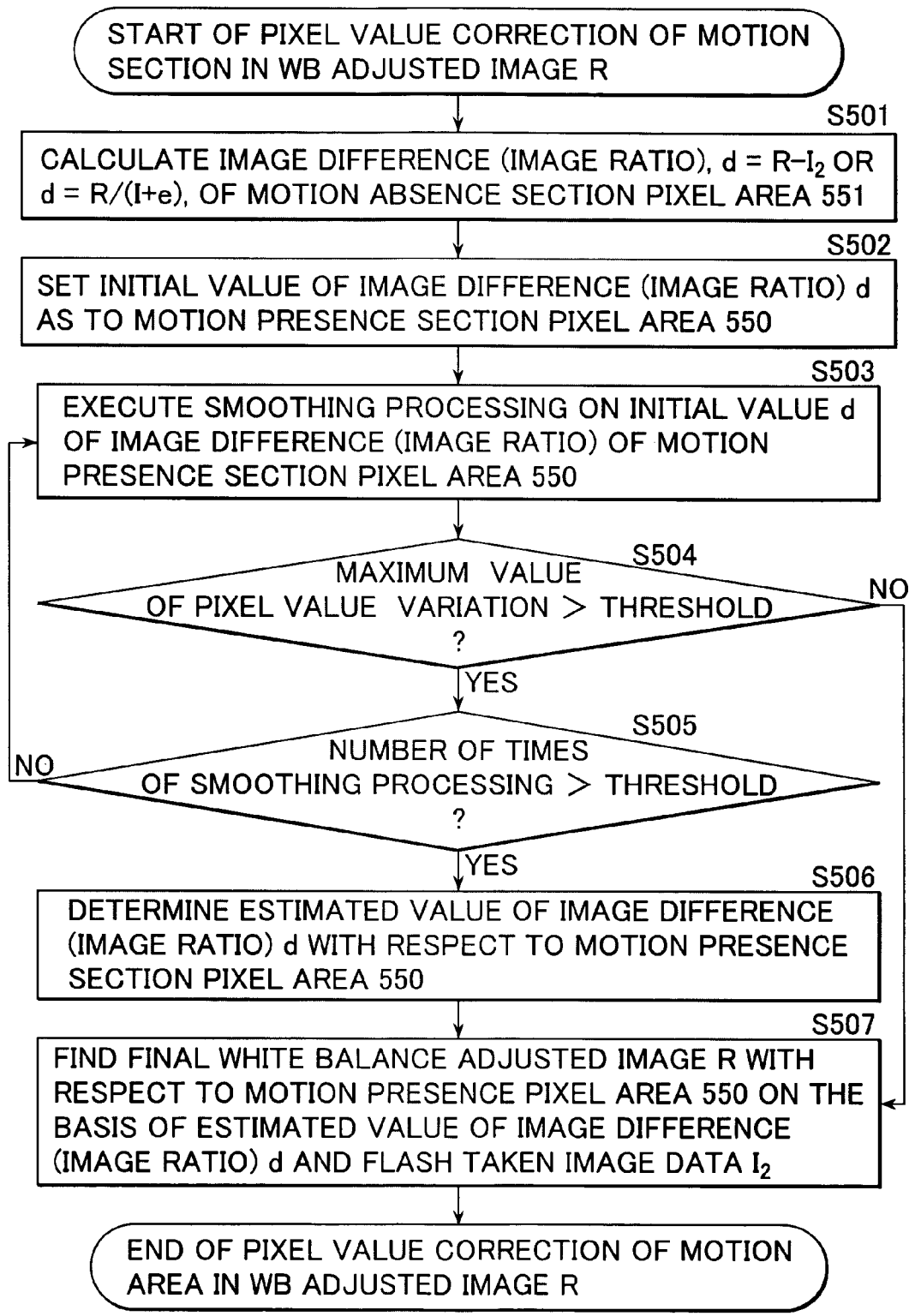
FIG. 12 is a flowchart for describing pixel value adjustment processing for a motion section in a second embodiment of the present invention.
Figure 13:
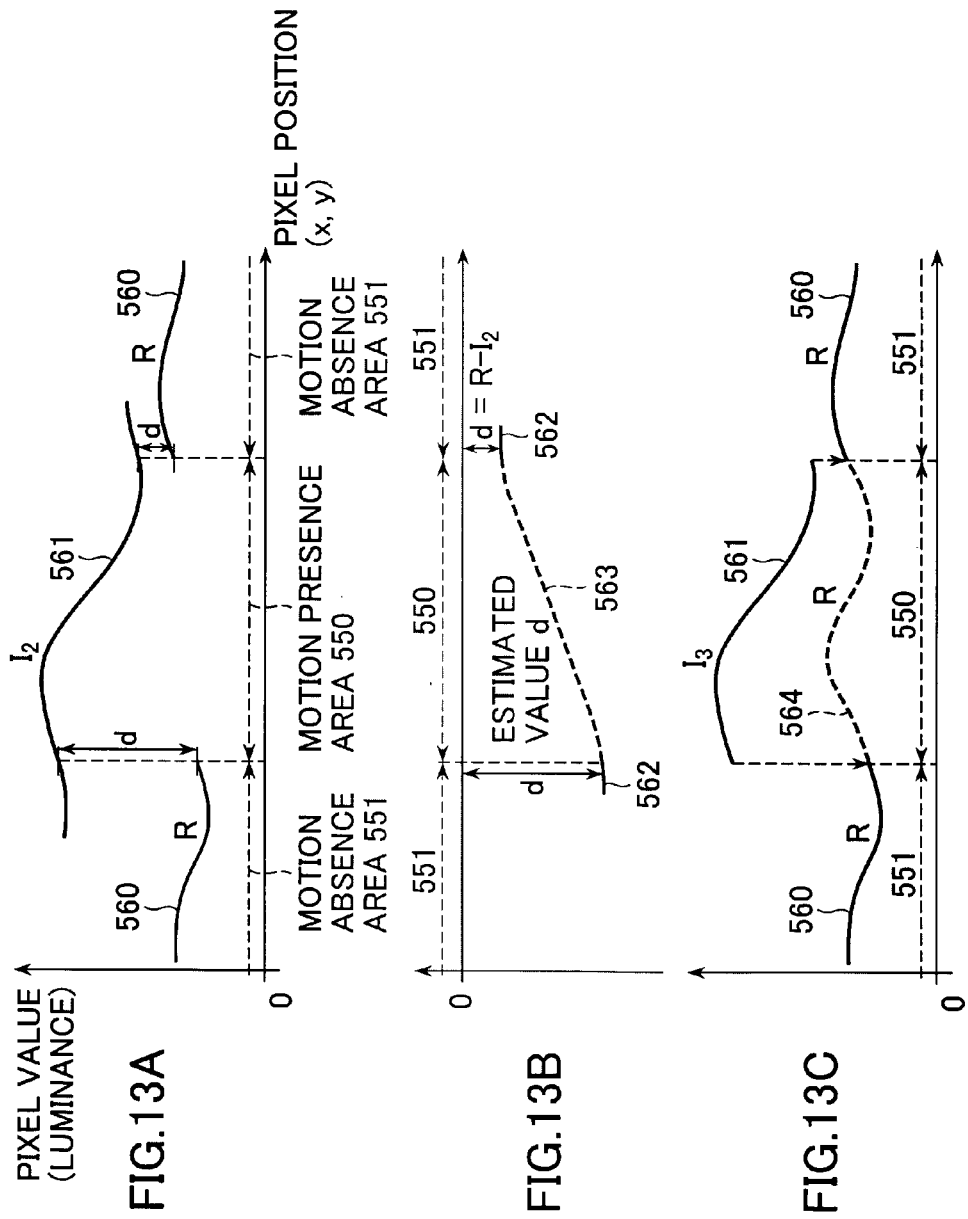
FIG. 13 is a view for describing the pixel value adjustment processing for the motion section in the second embodiment of the present invention.
Figure 14:
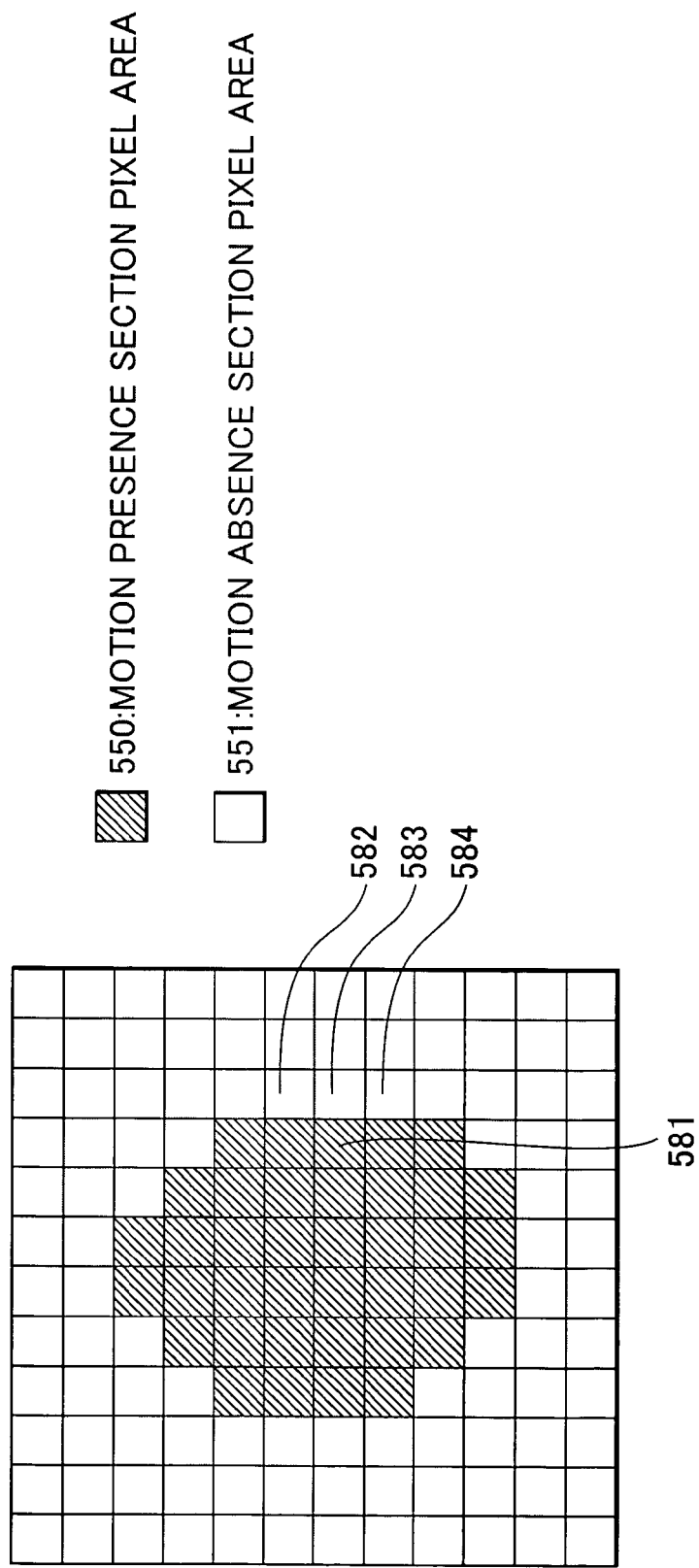
FIG. 14 is a view for describing an initial-value setting method for an image difference d, which method is executed in the pixel value adjustment processing for the motion section in the second embodiment of the present invention.
Figure 15:
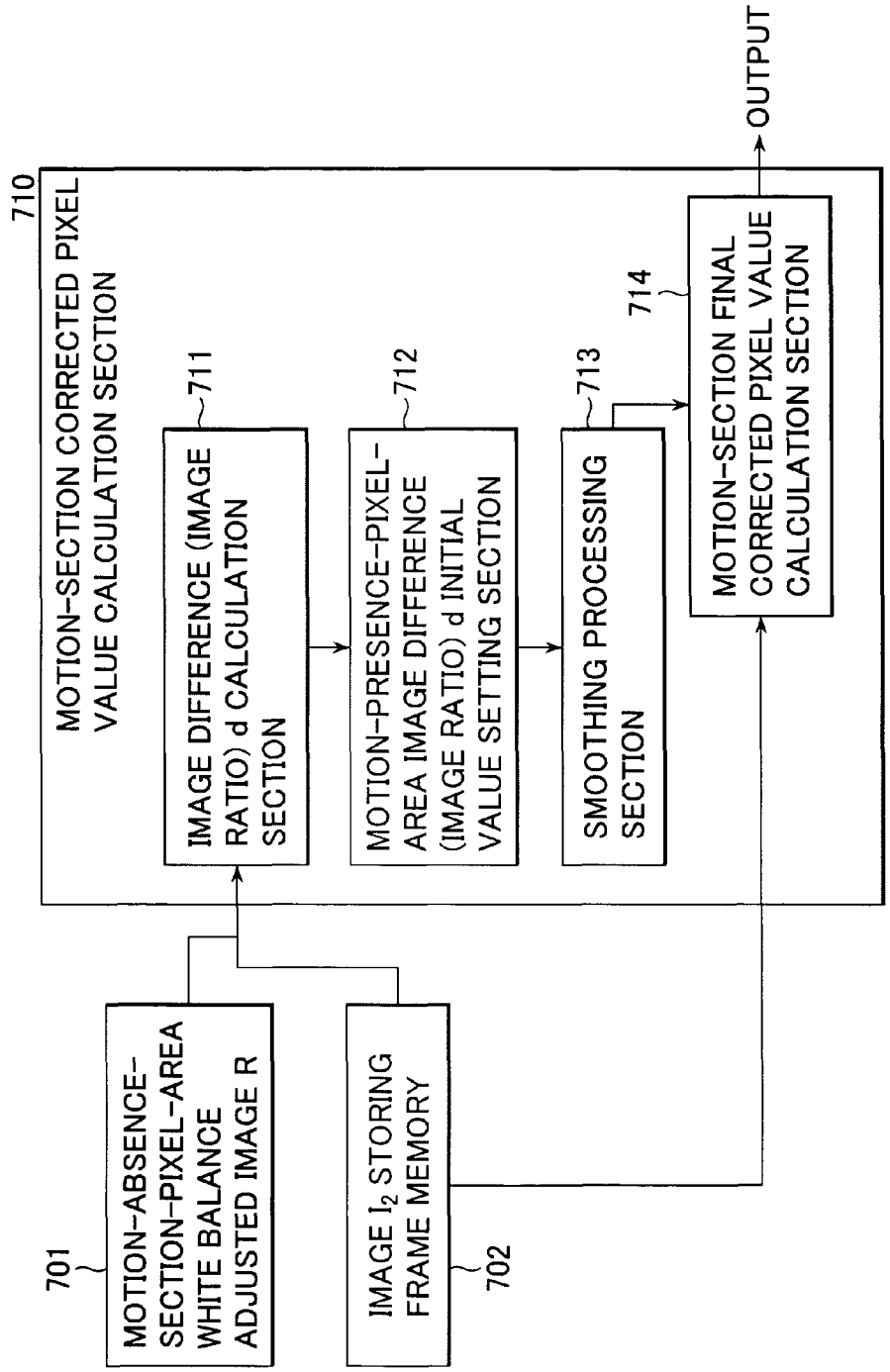
FIG. 15 is a view for describing the construction and the processing of a motion-section corrected pixel value calculation section in the second embodiment of the present invention.
Figure 16:
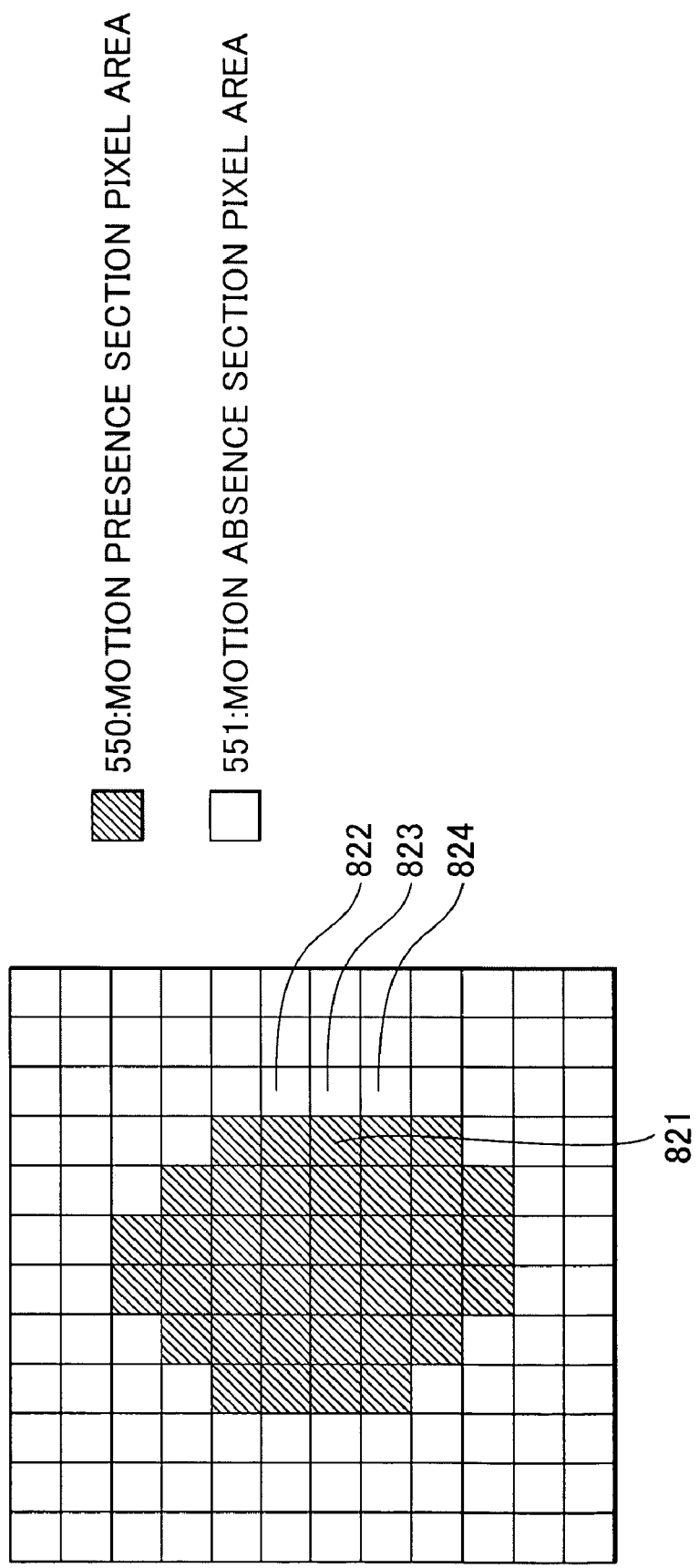
FIG. 16 is a view for describing pixel value adjustment processing for a motion section as well as a method of setting an initial value of an image difference d in a third embodiment of the present invention.
Figure 17:
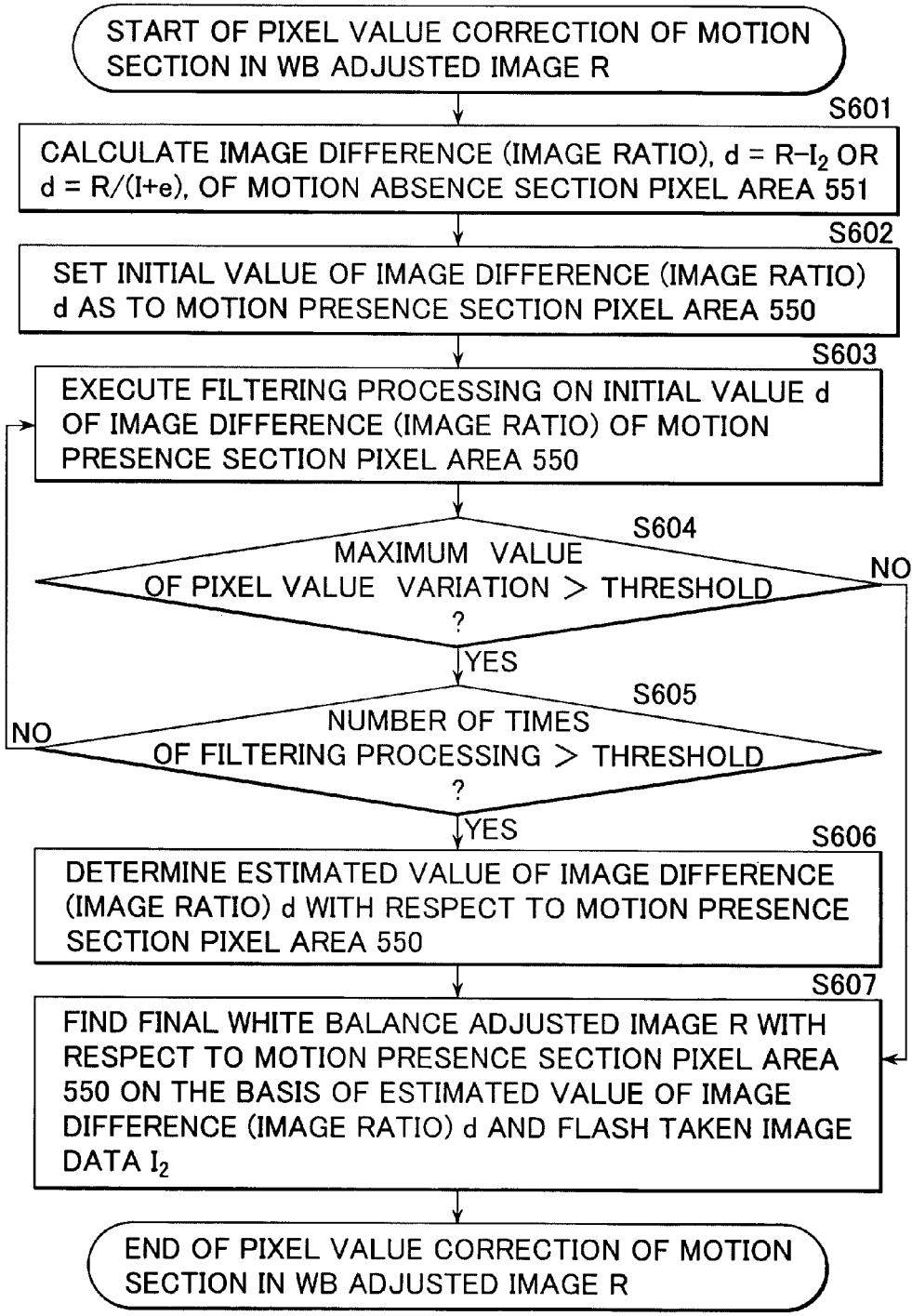
FIG. 17 is a flowchart for describing the pixel value adjustment processing for the motion section in the third embodiment of the present invention.
Figure 18A:
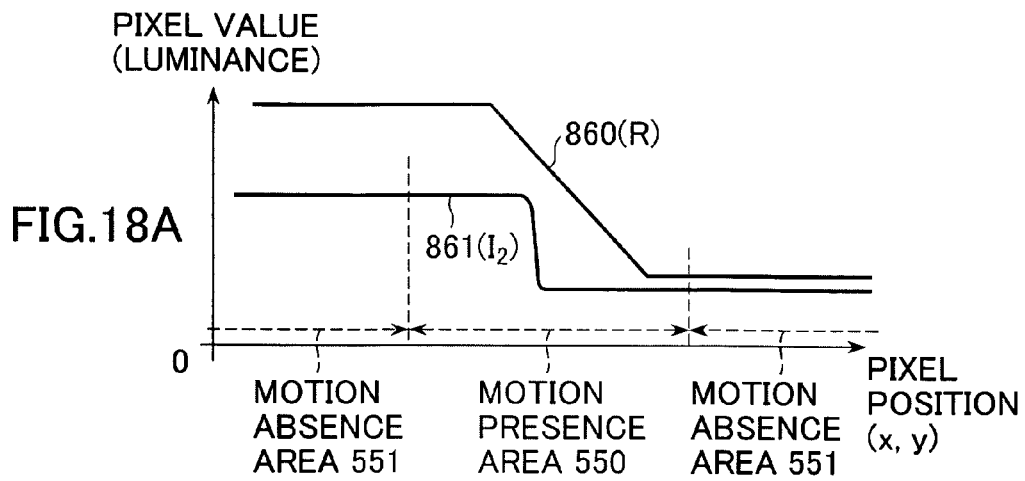
FIG. 18 is a view for describing the pixel value adjustment processing for the motion section in the third embodiment of the present invention.
Figure 18B:
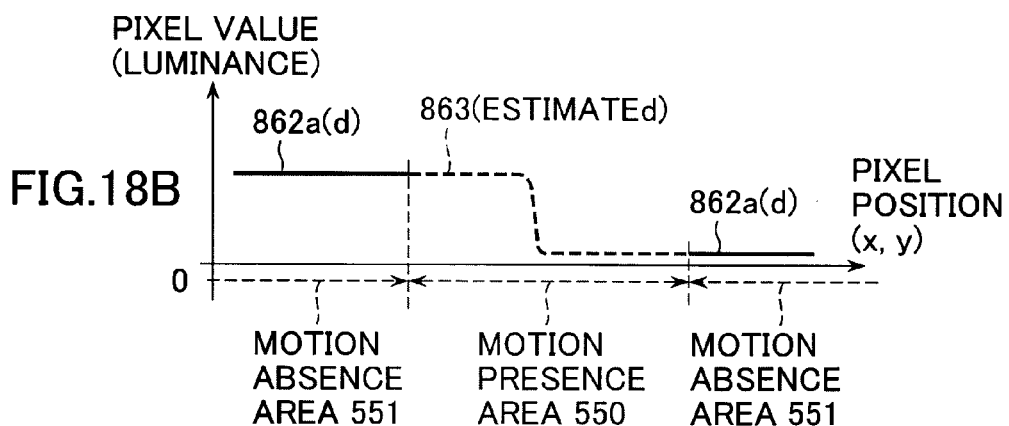
Figure 18C:
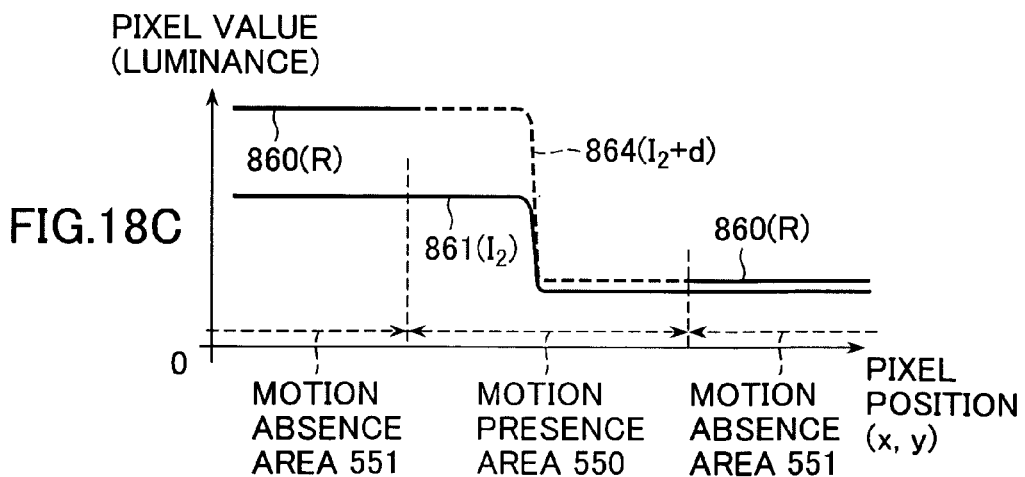
Figure 19:
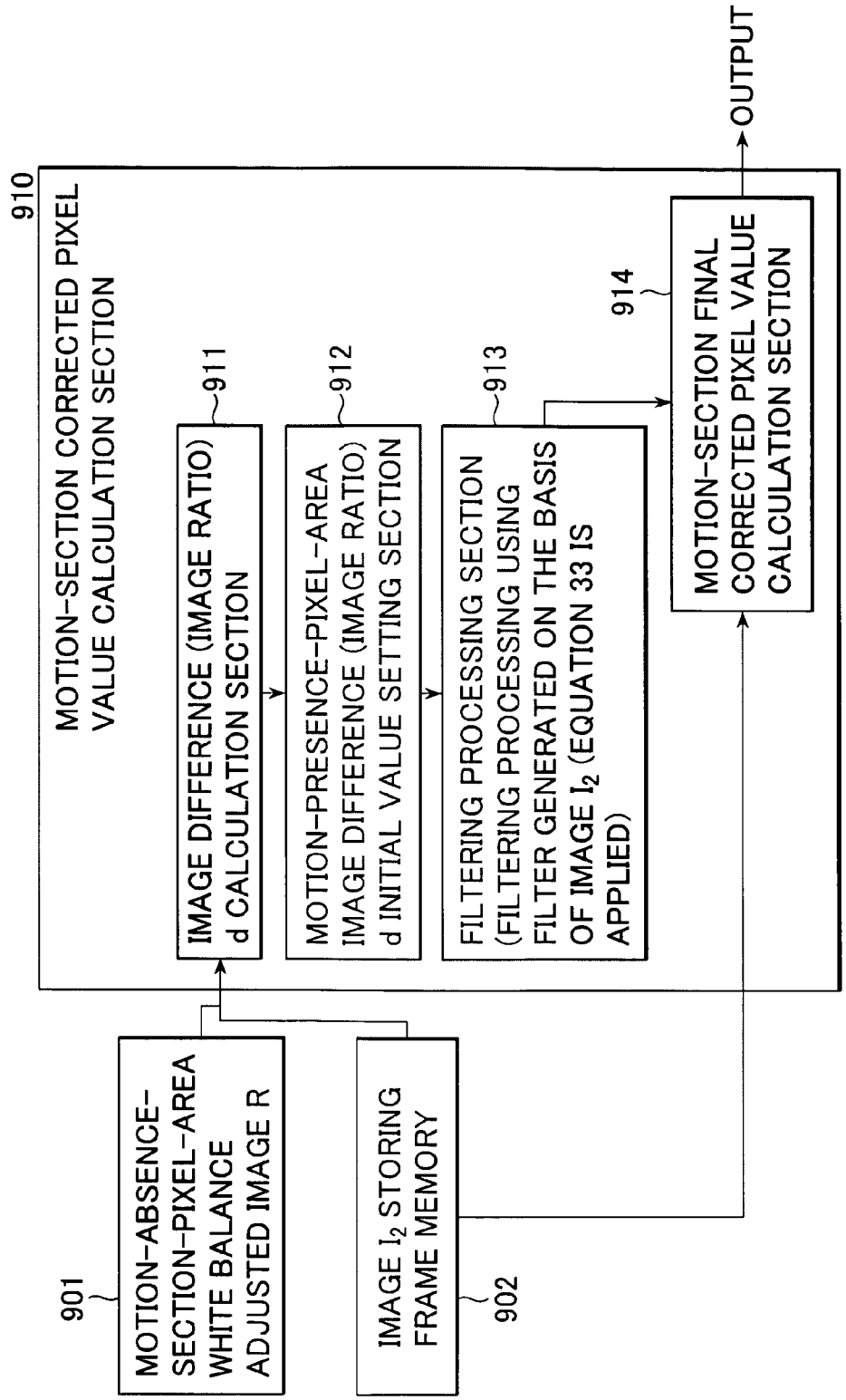
FIG. 19 is a view for describing the construction and the processing of a motion-section corrected pixel value calculation section in the third embodiment of the present invention.

101 LENS
102 DIAPHRAGM
103 IMAGE PICKUP ELEMENT
104 CORRELATED DOUBLE SAMPLING CIRCUIT (CDS)
105 A/D CONVERTER
106 DIGITAL SIGNAL PROCESSING SECTION (DSP)
107 TIMING GENERATOR
108 D/A CONVERTER
109 VIDEO ENCODER
110 VIDEO MONITOR
111 CODEC(CODEC)
112 MEMORY
113 CPU
114 INPUT DEVICE
115 FLASH CONTROL SECTION
116 FLASH DEVICE
200 BALL
210 AREA
250 INNER BOUNDARY PIXEL OF MOTION PRESENCE SECTION
251 OUTER BOUNDARY PIXEL OF MOTION PRESENCE SECTION
252 NON-INNER-BOUNDARY PIXEL OF MOTION PRESENCE SECTION
253 NON-OUTER-BOUNDARY PIXEL OF MOTION ABSENCE SECTION
254 PIXEL a
255 NEIGHBORING PIXEL OF a
301, 302, 303 MEMORIES
304 DIFFERENCE IMAGE CALCULATION SECTION
305 WHITE BALANCE ADJUSTMENT SECTION
306 AMBIENT LIGHT COMPONENT ESTIMATION SECTION

307 WHITE BALANCE ADJUSTMENT SECTION
308 PIXEL VALUE ADDITION SECTION
309 MOTION DETECTION SECTION
310 MOTION-SECTION CORRECTED PIXEL VALUE CALCULATION SECTION
311 WHITE BALANCE ADJUSTMENT SECTION
312 OUTPUT SWITCHING SECTION
401, 402, 403 FRAME MEMORIES
404 DIFFERENCE IMAGE CALCULATION SECTION
405 WHITE BALANCE ADJUSTMENT SECTION
406 PIXEL VALUE ADDITION SECTION
407 WHITE BALANCE ADJUSTMENT SECTION
408 MOTION DETECTION SECTION
409 MOTION-SECTION CORRECTED PIXEL VALUE CALCULATION SECTION
410 WHITE BALANCE ADJUSTMENT SECTION
411 OUTPUT SWITCHING SECTION
550 MOTION PRESENCE SECTION PIXEL AREA
551 MOTION ABSENCE SECTION PIXEL AREA
560 WHITE BALANCE ADJUSTED IMAGE R
561 FLASH IMAGE $I_2$
564 WHITE BALANCE ADJUSTED IMAGE R
581 PIXEL IN MOTION PRESENCE SECTION PIXEL AREA
582 to 584 PIXELS OF MOTION ABSENCE SECTION PIXEL AREA
701 MOTION-ABSENCE-SECTION-PIXEL-AREA WHITE BALANCE ADJUSTED IMAGE R
702 IMAGE $I_2$ STORING FRAME MEMORY
710 MOTION SECTION CORRECTED PIXEL VALUE CALCULATION SECTION
711 IMAGE DIFFERENCE (IMAGE RATIO) d CALCULATION SECTION
712 MOTION-PRESENCE-PIXEL-AREA IMAGE DIFFERENCE (IMAGE RATIO) d INITIAL VALUE SETTING SECTION
713 SMOOTHING PROCESSING SECTION
714 MOTION-SECTION FINAL CORRECTED PIXEL VALUE CALCULATION SECTION
821 PIXEL IN MOTION PRESENCE SECTION PIXEL AREA
822 to 824 PIXELS OF MOTION ABSENCE SECTION PIXEL AREA
860 WHITE BALANCE ADJUSTED IMAGE R
861 FLASH IMAGE $I_2$
862 IMAGE DIFFERENCE d OF SECTION IN MOTION-PRESENCE SECTION PIXEL AREA
863 ESTIMATED VALUE OF IMAGE DIFFERENCE d IN MOTION-PRESENCE SECTION PIXEL AREA
864 WHITE BALANCE ADJUSTED IMAGE R
901 MOTION-ABSENCE-SECTION-PIXEL-AREA WHITE BALANCE ADJUSTED IMAGE R
902 IMAGE $I_2$ STORING FRAME MEMORY
910 MOTION-SECTION CORRECTED PIXEL VALUE CALCULATION SECTION
911 IMAGE DIFFERENCE (IMAGE RATIO) d CALCULATION SECTION
912 MOTION-PRESENCE-PIXEL-AREA IMAGE DIFFERENCE (IMAGE RATIO) d INITIAL VALUE SETTING SECTION
913 FILTERING PROCESSING SECTION
914 MOTION-SECTION FINAL CORRECTED PIXEL VALUE CALCULATION SECTION

The invention claimed is:

1. An image processing method comprising:
calculating, by an image processing apparatus, an image difference or an image ratio based on corresponding pixel values of first image data subjected to a predetermined white balance adjustment based on a flash-assisted image capturing, and second image data comprising a flash-assisted image;
calculating, by the image processing apparatus, an estimated value based on the image difference or the image ratio of a particular area of image data; and
generating, by the image processing apparatus, a corrected image of the particular area based on the estimated value and the second image data.

2. The image processing method according to claim 1, wherein the image difference d(x, y) comprises a vector calculated as:

$$d(x,y)=A(x,y)-B(x,y)$$

where A(x, y) denotes a pixel value vector of each pixel (x, y) of the first image data and B(x, y) denotes a pixel value vector of the corresponding pixel (x, y) of the second image data; and
the image ratio d(x, y) is:

$$d(x,y)=A(x,y)/(B(x,y)+e)$$

where e is a fixed value.

3. The image processing method according to claim 1, wherein:
the first image data comprises a white balance adjusted image R subjected to pixel value adjustment on the basis of a no flash-assisted captured image and a flash-assisted captured image;
the second image data comprises a flash-assisted image $I_2$, and the particular area comprises a motion-presence area in which a motion of a subject is detected;
the image difference d(x, y) comprises a vector calculated as:

$$d(x,y)=R(x,y)-I_2(x,y)$$

where R(x, y) denotes a pixel value vector of each pixel (x, y) of the white balance adjusted image R, and $I_2(x, y)$ denotes a pixel value vector of the corresponding pixel (x, y) of the flash-assisted image $I_2$;
the image ratio d(x, y) is:

$$d(x,y)=R(x,y)/(I_2(x,y)+e)$$

where e is a fixed value; and
generating the corrected image comprises generating a corrected image of the motion-presence area on the basis of the estimated values and the flash-assisted image $I_2$.

4. The image processing method according to claim 1, wherein calculating the estimated value further comprises:
setting an initial value of image difference or image ratio of the particular area of the image data on the basis of an image difference or an image ratio determined in an area in the vicinity of the particular area; and
executing a smoothing process based on a smoothing filter applied against the initial value.

5. The image processing method according to claim 4, wherein setting the initial value comprises setting an initial value of an initial-value-setting target pixel on the basis of an image difference or an image ratio of a pixel in the vicinity of the initial-value-setting target pixel for which the image-difference or the image-ratio is already set.

6. The image processing method according to claim 5, wherein setting the initial value comprises applying a mask image in order to discriminate between the initial-value-setting target pixel and the pixel for which the image difference or the image ratio is already set.

7. The image processing method according to claim 1, wherein:
  generating the corrected image further comprises generating the corrected image of the particular area on the basis of the estimated values and the second image data; and
  if using the image difference, generating the corrected-image comprises adding the estimated value of the image difference of the particular area to the second image data in the particular area; and
  if using the image ratio, generating the corrected-image comprises multiplying the estimated value of the image difference of the particular area by the second image data in the particular area.

8. The image processing method according to claim 1, wherein:
  the first image data comprises a white balance adjusted image R subjected to pixel value adjustment on the basis of a no flash-assisted captured image and a flash-assisted captured image;
  the second image data comprises a flash-assisted image $I_2$;
  the particular area comprises a motion-presence area in which a motion of a subject is detected; and
  if using the image difference, generating the corrected-image comprises adding the estimated value of the image difference in the particular area to the flash-assisted image $I_2$ in the motion-presence area; and
  if using the image ratio, generating the corrected image multiplying the estimated value of the image ratio in the particular area by the flash-assisted c image $I_2$ in the motion-presence area.

9. The image processing method according to claim 1, wherein calculating the estimated-value further comprises:
  setting an initial value of image difference or image ratio of the particular area of the image data on the basis of image difference or image ratio determined in an area in the vicinity of the particular area; and
  filtering by executing pixel value conversion processing according to a pixel value conversion expression corresponding to filtering processing using a filter whose weight is set on the basis of the second image data against the initial value, and correcting the image difference or the image ratio of the particular area.

10. The image processing method according to claim 9, wherein setting the initial-value further comprises setting an initial value of an initial-value-setting target pixel on the basis of an image difference or an image ratio of a pixel in the vicinity of the initial-value-setting target pixel for which the image-difference or the image-ratio is already set.

11. The image processing method according to claim 9, wherein setting the initial value further comprises applying a mask image in order to discriminate between the initial-value-setting target pixel and the pixel for which the image difference or the image ratio is already set.

12. The image processing method according to claim 9, wherein:
  the first image data comprises a white balance adjusted image R subjected to pixel value adjustment on the basis of a no flash-assisted captured image and a flash-assisted captured image;
  the second image data comprises a flash-assisted image $I_2$;
  the particular area comprises a motion-presence area in which a motion of a subject is detected; and
  filtering comprises executing pixel value correction processing using an expression containing a function whose weight is set according to the pixel values of pixels constituting image data of the flash-assisted image $I_2$.

13. The image processing method according to claim 9, wherein:
  filtering comprises executing pixel value correction process using the following conversion expression:

$$d'(x, y, ch) = \frac{1}{\sum_{i,j} w(|I_2(x, y, ch) - I_2(i, j, ch)|)} \sum_{i,j} \{w(|I_2(x, y, ch) - I_2(i, j, ch)|) d(i, j, ch)\}$$

where $d(x, y, ch)$ and $I_2(y, y, ch)$ are a value corresponding to a difference image or image ratio d of each channel [ch] at a pixel position (x, y), and a pixel value of the flash-assisted image $I_2$, respectively; $d'(x, y, ch)$ is an updated pixel value of the image difference d of the channel [ch] at the pixel position (x, y); i and j are reference pixel positions which are used for calculating the updated value d' of the value d at the pixel position (x, y); if k denotes an arbitrary natural number, $x-k \leq i \leq x+k$ and $y-k \leq j \leq y+k$, and $w(x)$ is a weighting function which sets a weight according to the pixel values of pixels constituting image data of the flash-assisted image $I_2$.

14. The image processing method according to claim 13, wherein the weighting function $w(x)$ in the conversion expression is a function expressed by the following expression:

$$w(x) = \exp\left(-\frac{x^2}{2\sigma^2}\right).$$

15. The image processing method according to claim 13, wherein the reference pixel positions i, j which are used for calculating the updated value d' of the value of the pixel position (x, y) in the above conversion expression are $x-k \leq i \leq x+k$ and $y-k \leq j \leq y+k$, where k is an arbitrary natural number and k is any of 1, 2 and 3.

16. The image processing method according to claim 1, further comprising:
  storing in memory no flash-assisted low resolution image data $I_{1L}$ based on a no flash-assisted image;
  storing in memory flash-assisted high resolution image data $I_{1L}$ based on a flash-assisted image and flash resolution image data $I_{2L}$,
  storing in memory no flash-assisted low resolution image data $I_{3L}$ based on a no flash-assisted image; and
  detecting a motion-presence area on the basis of the no flash-assisted low resolution image data $I_{1L}$ and the no flash-assisted low resolution image data $I_{3L}$; wherein:
  the no flash-assisted low resolution image data $I_{1L}$ is set as the first image data and the flash-assisted low resolution image data $I_{2L}$ is set as the second image data to calculate the estimated values and generate a white balance adjusted image R including white balance adjustment processing and pixel value correction processing for a motion area; and
  generation the corrected-image further comprises generating a high resolution final corrected image $R_H$ on the basis of corresponding pixel values of the pixel value adjusted image R, the flash-assisted high resolution image data $I_{2H}$ and the flash-assisted low resolution image data $I_{2L}$.

17. The image processing method according to claim 16, wherein generating the corrected-image generation further comprises:
- acquiring pixel value conversion information on the corresponding pixels of the pixel value adjusted image R relative to the flash-assisted low resolution image data $I_{2L}$; and
- executing pixel value conversion of the flash-assisted high resolution image data $I_{2H}$.

18. An image processing apparatus comprising:
- a calculating unit for calculating an image difference or an image ratio based on corresponding pixel values of first image data subjected to a predetermined white balance adjustment based on a flash-assisted image capturing, and second image data comprising a flash-assisted image;
- an estimation unit for calculating an estimated value based on the image difference or the image ratio of a particular area of image data; and
- a generating unit for generating a corrected image of the particular area based on the estimated value of the image difference or the image ratio of the particular area and the second image data.

19. The image processing apparatus according to claim 18, wherein the estimation unit further comprises:
- an initial-value setting unit for setting an initial value of image difference or image ratio of the particular area of the image data on the basis of an image difference or an image ratio determined in an area in the vicinity of the particular area; and
- a smoothing process execution unit for executing a smoothing process based on a smoothing filter applied against the initial value set by the initial-value setting unit.

20. The image processing apparatus according to claim 18, wherein the estimation unit further comprises:
- an initial value setting unit of setting an initial value of image difference or image ratio of the particular area of the image data on the basis of image difference or image ratio determined in an area in the vicinity of the particular area; and
- a filtering unit for executing pixel value conversion processing according to a pixel value conversion expression corresponding to filtering processing using a filter whose weight is set on the basis of the second image data against the initial-value, and correcting the image difference or the image ratio of the particular area.

21. A non-transitory computer-readable medium storing a set of instructions that, when executed by a processor, perform a method comprising:
- calculating an image difference or an image ratio based on corresponding pixel values of first image data subjected to a predetermined white balance adjustment based on a flash-assisted image capturing, and second image data comprising a flash-assisted image;
- calculating an estimated value based on the image difference or the image ratio of a particular area of image data; and
- generating a corrected image of the particular area based on the estimated value of the image difference or the image ratio of the particular area and the second image data.

22. The medium according to claim 21, the method further comprising:
- storing in memory no flash-assisted low resolution image data $I_{1L}$ based on a no flash-assisted image;
- storing in memory flash-assisted high resolution image data $I_{2H}$ based on a flash-assisted image and flash resolution image data $I_{2L}$;
- storing in memory no flash-assisted low resolution image data $I_{3L}$ based on a no flash-assisted image; and
- detecting a motion-presence area on the basis of the no flash-assisted low resolution image data $I_{1L}$ and the no flash-assisted low resolution image data $I_{3L}$; wherein
- the no flash-assisted low resolution image data $I_{1L}$ is set as the first image data and the flash-assisted low resolution image data $I_{2L}$ is set as the second image data to calculate the estimated values and generate a white balance adjusted image R including white balance adjustment processing and pixel value correction processing for a motion area; and
- in the corrected-image generation step, a high resolution final corrected image $R_H$ is generated on the basis of corresponding pixel values of the pixel value adjusted image R, the flash-assisted resolution image data $I_{2H}$ and the flash-assisted low resolution image data $I_{2L}$.

* * * * *